(12) United States Patent
Oh

(10) Patent No.: US 9,815,617 B2
(45) Date of Patent: *Nov. 14, 2017

(54) BEVERAGE BREWING SYSTEM

(71) Applicant: TOUCH COFFEE & BEVERAGES, LLC, City of Industry, CA (US)

(72) Inventor: Sung I. Oh, West Covina, CA (US)

(73) Assignee: Touch Coffee & Beverages, LLC, City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,412

(22) Filed: Oct. 27, 2016

(65) Prior Publication Data
US 2017/0166392 A1    Jun. 15, 2017

Related U.S. Application Data

(63) Continuation of application No. 14/866,732, filed on Sep. 25, 2015, now Pat. No. 9,481,508, which is a
(Continued)

(51) Int. Cl.
*B65D 85/804* (2006.01)
*A47J 31/06* (2006.01)
(Continued)

(52) U.S. Cl.
CPC ...... *B65D 85/8043* (2013.01); *A47J 31/0673* (2013.01); *A47J 31/407* (2013.01); *A47J 31/4492* (2013.01)

(58) Field of Classification Search
CPC . B65D 85/8043; A47J 31/4492; A47J 31/407; A47J 31/0673
See application file for complete search history.

(56) References Cited

U.S. PATENT DOCUMENTS

D195,601 S    7/1963 Bostrom
3,403,617 A    10/1968 Lampe
(Continued)

FOREIGN PATENT DOCUMENTS

CA    2010954    8/1991
DE    102009048233 A1    8/2010
(Continued)

OTHER PUBLICATIONS

U.S. Appl. No. 15/336,438, filed Oct. 27, 2016.
(Continued)

*Primary Examiner* — Erik Kashnikow
*Assistant Examiner* — Chaim Smith
(74) *Attorney, Agent, or Firm* — Henricks, Slavin & Holmes LLP

(57) ABSTRACT

A beverage cartridge system is adapted to brew a beverage through a brewer having a holder adapted to receive the cartridge system. The holder may have a deep well with one or more needles therewithin to pierce through the bottom of the cartridge system when inserted into the well. The cartridge system may include a short cup and a tall cup, where the tall cup is taller than the short cup to pack more beverage grind. The cartridge system may include a filter within an outer cup. The bottom of the filter may be deep enough to be juxtaposed to the bottom of the cup. The filter may be formed from a material that is substantially resistant to piercing by the needle within the holder such that when the outlet needle pierces through the bottom of the cup, the outlet needle raises the filter at a point of contact, and the filter substantially resists the outlet needle from piercing through the filter during a brewing process.

27 Claims, 48 Drawing Sheets

Related U.S. Application Data continuation of application No. 14/542,398, filed on Nov. 14, 2014, now Pat. No. 9,149,151, which is a continuation of application No. PCT/US2013/047408, filed on Jun. 24, 2013.

(60) Provisional application No. 61/852,470, filed on Mar. 15, 2013, provisional application No. 61/850,862, filed on Feb. 25, 2013, provisional application No. 61/849,236, filed on Jan. 22, 2013, provisional application No. 61/690,275, filed on Jun. 22, 2012.

(51) Int. Cl.
*A47J 31/40* (2006.01)
*A47J 31/44* (2006.01)

(56) References Cited

U.S. PATENT DOCUMENTS

| | | |
|---|---|---|
| 3,450,024 A | 6/1969 | Martin |
| 3,478,670 A | 11/1969 | Fuqua |
| 3,478,673 A | 11/1969 | Burney |
| 4,646,626 A | 3/1987 | Baecchi et al. |
| 4,716,536 A | 12/1987 | Blanchard |
| 4,859,337 A | 8/1989 | Woltermann |
| 5,242,702 A | 9/1993 | Fond |
| 5,325,765 A | 7/1994 | Sylvan et al. |
| 5,398,596 A | 3/1995 | Fond et al. |
| 5,605,710 A | 2/1997 | Pridonoff et al. |
| D395,822 S | 7/1998 | Keal et al. |
| 5,778,765 A | 7/1998 | Klawuhn et al. |
| 5,794,519 A | 8/1998 | Fischer |
| 5,806,409 A | 9/1998 | Johnson et al. |
| 5,840,189 A | 11/1998 | Sylvan et al. |
| 5,895,672 A | 4/1999 | Cooper |
| 5,897,899 A | 4/1999 | Fond et al. |
| 6,000,317 A | 12/1999 | Van Der Meer |
| 6,079,315 A | 6/2000 | Beaulieu et al. |
| 6,082,247 A | 7/2000 | Beaulicu |
| 6,138,508 A | 10/2000 | Hannan et al. |
| 6,142,063 A | 11/2000 | Beaulieu et al. |
| 6,182,554 B1 | 2/2001 | Beaulieu et al. |
| 6,186,051 B1 | 2/2001 | Aarts |
| 6,189,438 B1 | 2/2001 | Bielfeldt et al. |
| D452,434 S | 12/2001 | Sweeney |
| 6,440,256 B1 | 8/2002 | Gordon et al. |
| 6,490,966 B2 | 12/2002 | Mariller et al. |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,662,955 B1 | 12/2003 | Lassota |
| 6,666,130 B2 | 12/2003 | Taylor et al. |
| 6,672,200 B2 | 1/2004 | Duffy et al. |
| 6,708,600 B2 | 3/2004 | Winkler et al. |
| 6,758,130 B2 | 7/2004 | Sargent et al. |
| 6,759,072 B1 | 7/2004 | Gutwein et al. |
| 6,857,353 B2 | 2/2005 | Kollep et al. |
| D502,362 S | 3/2005 | Lazaris et al. |
| 6,990,891 B2 | 1/2006 | Tebo, Jr. |
| 7,021,197 B2 | 4/2006 | Chen et al. |
| 7,032,818 B2 | 4/2006 | Thomas et al. |
| 7,063,238 B2 | 6/2006 | Hale |
| 7,081,263 B2 | 7/2006 | Albrecht |
| 7,093,533 B2 | 8/2006 | Tebo, Jr. et al. |
| 7,165,488 B2 | 1/2007 | Bragg et al. |
| 7,210,401 B1 | 5/2007 | Rolfes et al. |
| D550,497 S | 9/2007 | Argabrite |
| D550,499 S | 9/2007 | Argabrite |
| 7,311,037 B2 | 12/2007 | Albrecht |
| 7,318,372 B2 | 1/2008 | Cooke |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,438,941 B2 | 10/2008 | Gutwein et al. |
| 7,469,628 B2 | 12/2008 | Mandralis et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,569,243 B2 | 8/2009 | Yoakim et al. |
| 7,594,470 B2 | 9/2009 | Scarchilli et al. |
| 7,607,385 B2 | 10/2009 | Halliday et al. |
| 7,640,845 B2 | 1/2010 | Woodnorth et al. |
| 7,654,191 B2 | 2/2010 | Greenwald et al. |
| 7,685,930 B2 | 3/2010 | Mandralis et al. |
| 7,704,386 B2 | 4/2010 | Ventura |
| 7,770,512 B2 | 8/2010 | Albrecht |
| 7,798,055 B2 | 9/2010 | Mandralis et al. |
| D628,444 S | 12/2010 | Snider |
| D628,445 S | 12/2010 | Snider |
| 7,856,920 B2 | 12/2010 | Schmed et al. |
| D637,484 S | 5/2011 | Winkler |
| 7,947,316 B2 | 5/2011 | Kirschner et al. |
| 7,964,230 B2 | 6/2011 | Kirschner et al. |
| D647,398 S | 10/2011 | Winkler |
| D647,399 S | 10/2011 | Winkler |
| 8,039,036 B2 | 10/2011 | Knitel et al. |
| 8,151,694 B2 | 4/2012 | Jacobs et al. |
| 8,168,247 B2 | 5/2012 | Halliday et al. |
| 8,182,854 B2 | 5/2012 | Fujii et al. |
| 8,221,813 B2 | 7/2012 | Boul |
| 8,291,812 B2 | 10/2012 | Rivera |
| 8,361,527 B2 | 1/2013 | Winkler et al. |
| 8,495,949 B2 | 7/2013 | Tinkler et al. |
| 8,516,948 B2 | 8/2013 | Zimmerman et al. |
| 8,522,669 B1 | 9/2013 | Rolfes et al. |
| 8,573,114 B2 | 11/2013 | Huang et al. |
| 8,609,170 B2 | 12/2013 | Tinkler et al. |
| 8,900,648 B2 | 12/2014 | Bunke et al. |
| 8,916,215 B2 | 12/2014 | Yoakim et al. |
| 9,144,343 B2 | 9/2015 | Oh |
| 9,149,149 B2 | 10/2015 | Oh |
| 9,149,150 B2 | 10/2015 | Oh |
| 9,149,151 B2 | 10/2015 | Oh |
| 9,232,871 B2 | 1/2016 | Rivera |
| 9,463,921 B2 | 10/2016 | Oh |
| 9,481,508 B2 | 11/2016 | Oh |
| 2002/0048621 A1 | 4/2002 | Boyd et al. |
| 2002/0148356 A1 | 10/2002 | Lazaris et al. |
| 2003/0033938 A1 | 2/2003 | Halliday et al. |
| 2004/0031394 A1 | 2/2004 | Yoakim et al. |
| 2004/0177764 A1 | 9/2004 | Halliday et al. |
| 2005/0051478 A1 | 3/2005 | Karanikos et al. |
| 2005/0066819 A1 | 3/2005 | Cooke |
| 2005/0223904 A1 | 10/2005 | Laigneau et al. |
| 2005/0249052 A1 | 11/2005 | Benedetti et al. |
| 2005/0287251 A1 | 12/2005 | Lazaris et al. |
| 2006/0000851 A1 | 1/2006 | Girard et al. |
| 2006/0144241 A1 | 7/2006 | Fukagawa et al. |
| 2006/0144244 A1 | 7/2006 | Girard et al. |
| 2006/0174773 A1 | 8/2006 | Taylor |
| 2006/0288776 A1 | 12/2006 | Pelovitz |
| 2006/0292012 A1 | 12/2006 | Brudevold et al. |
| 2007/0056994 A1 | 3/2007 | Woodnorth et al. |
| 2007/0214966 A1 | 9/2007 | Bishop et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2008/0178660 A1 | 7/2008 | Bolt et al. |
| 2008/0187638 A1 | 8/2008 | Hansen |
| 2009/0199721 A1 | 8/2009 | Hausslein |
| 2010/0024658 A1 | 2/2010 | Jacobs et al. |
| 2010/0147157 A1 | 6/2010 | Tanner et al. |
| 2010/0206177 A1 | 8/2010 | Ricotti |
| 2010/0288131 A1 | 11/2010 | Kilber et al. |
| 2010/0303964 A1 | 12/2010 | Beaulieu et al. |
| 2011/0076361 A1 | 3/2011 | Peterson et al. |
| 2011/0100228 A1 | 5/2011 | Rivera |
| 2011/0111098 A1 | 5/2011 | Ricotti |
| 2011/0151075 A1 | 6/2011 | Peterson |
| 2011/0200726 A1 | 8/2011 | Tinkler et al. |

(56) References Cited

U.S. PATENT DOCUMENTS

| | | |
|---|---|---|
| 2011/0226343 A1 | 9/2011 | Novak et al. |
| 2011/0274802 A1 | 11/2011 | Rivera |
| 2012/0058226 A1 | 3/2012 | Winkler et al. |
| 2012/0070542 A1 | 3/2012 | Camera et al. |
| 2012/0201933 A1 | 8/2012 | Dran et al. |
| 2012/0207896 A1 | 8/2012 | Rivera |
| 2012/0231126 A1 | 9/2012 | Lo Faro et al. |
| 2012/0276264 A1 | 11/2012 | Rivera |
| 2012/0312174 A1 | 12/2012 | Lambert |
| 2012/0321756 A1 | 12/2012 | Estabrook et al. |
| 2013/0004629 A1 | 1/2013 | Clark et al. |
| 2013/0014648 A1 | 1/2013 | Rognon et al. |
| 2013/0017303 A1 | 1/2013 | Vu |
| 2013/0045308 A1 | 2/2013 | Gorbatenko |
| 2013/0068108 A1 | 3/2013 | Rivera |
| 2013/0101716 A1 | 4/2013 | Beaulieu et al. |
| 2013/0171311 A1 | 7/2013 | Clark |
| 2013/0209636 A1 | 8/2013 | Cominelli et al. |
| 2013/0340626 A1 | 12/2013 | Oh |
| 2013/0344205 A1 | 12/2013 | Oh |
| 2014/0124435 A1 | 5/2014 | Jackson |
| 2014/0202338 A1 | 7/2014 | Remo et al. |
| 2015/0064324 A1 | 3/2015 | Oh |
| 2015/0072049 A1 | 3/2015 | Oh |
| 2015/0079244 A1 | 3/2015 | Oh |
| 2015/0104550 A1 | 4/2015 | Oh |
| 2015/0257582 A1 | 9/2015 | Oh |
| 2016/0015205 A1 | 1/2016 | Oh |
| 2016/0016726 A1 | 1/2016 | Oh |

FOREIGN PATENT DOCUMENTS

| | | |
|---|---|---|
| EP | 0756844 | 5/1999 |
| EP | 1541070 | 11/2006 |
| EP | 1774878 B1 | 1/2008 |
| EP | 2757055 | 7/2014 |
| WO | WO 02074144 A2 | 9/2002 |
| WO | WO 03026470 A2 | 4/2003 |
| WO | WO 2010021532 A1 | 2/2010 |
| WO | WO 2013192625 A1 | 7/2013 |
| WO | WO 2013153473 A1 | 10/2013 |

OTHER PUBLICATIONS

Answer and Counterclaim by Touch Coffee & Beverages LLC dated Feb. 17, 2016.
Motion for Preliminary Injunction by Touch Coffee & Beverages, LLC dated Feb. 17, 2016.
Amended Answer and Counterclaim by Touch Coffee & Beverages LLC dated Mar. 28, 2016.
Opposition to Motion for Preliminary Injunction [Redacted] dated Apr. 1, 2016.
Declaration of Professor Alexander H. Slocum on Non-Infringement and Invalidity of Touch's Patents dated Apr. 1, 2016.
Declaration of Mark Wood in Support of Keurig's Opposition to Touch's Motion for Preliminary Injunction [Redacted] dated Apr. 1, 2016.
Declaration of Hunter D. Keeton in Support of Keurig's Opposition to Touch's Motion for Preliminary Injunction [Redacted] dated Apr. 1, 2016.
Touch's Reply in Support of Motion for Preliminary Injunction [Redacted] dated Apr. 8, 2016.
Declaration of David E. Wheeler in Support of Touch's Motion for Preliminary Injunction dated Apr. 8, 2016.
Declaration of Peter Wied in Support of Reply in Support of Touch's Motion for Preliminary Injunction [Redacted] dated Apr. 8, 2016.
Touch's Reply in Support of Motion for Preliminary Injunction [Redacted] dated Apr. 11, 2016.
Declaration of David E. Wheeler in Support of Touch's Motion for Preliminary Injunction dated Apr. 11, 2016.
Declaration of Peter Wied in Support of Reply in Support of Touch's Motion for Preliminary Injunction [Redacted] dated Apr. 11, 2016.
Keurig's Sur-Reply in Opposition to Touch's Motion for Preliminary Injunction dated Apr. 15, 2016.
Supplemental Declaration of Professor Alexander H. Slocum in Opposition to Touch's Motion for Preliminary Injunction dated Apr. 15, 2016.
Supplemental Declaration of Hunter D. Keeton in Support of Keurig's Opposition to Touch's Motion for Preliminary Injunction dated Apr. 15, 2016.
Transcript of Telephone Conference held on May 11, 2016, before Judge Denise J. Casper, dated May 19, 2016.
Petition for Inter Partes Review of U.S. Pat. No. 9,144,343 (IPR2016-01390).
Declaration of Paul Phillips, Exhibit-1012 of the Petition for Inter Partes Review of U.S. Pat. No. 9,144,343 (IPR2016-01390).
Curriculum vitae of Paul A. Phillips, Exhibit-1017 of the Petition for Inter Partes Review of U.S. Pat. No. 9,144,343 (IPR2016-01390).
Petition for Inter Partes Review of U.S. Pat. No. 9,149,149 (IPR2016-01392).
Declaration of Paul Phillips, Exhibit-1012 of the Petition for Inter Partes Review of U.S. Pat. No. 9,149,149 (IPR2016-01392).
Curriculum vitae of Paul A. Phillips, Exhibit-1017 of the Petition for Inter Partes Review of U.S. Pat. No. 9,149,149 (IPR2016-01392).
Petition for Inter Partes Review of U.S. Pat. No. 9,149,149 (IPR2016-01396).
Declaration of Paul Phillips, Exhibit-1112 of the Petition for Inter Partes Review of U.S. Pat. No. 9,149,149 (IPR2016-01396).
Curriculum vitae of Paul A. Phillips, Exhibit-1117 of the Petition for Inter Partes Review of U.S. Pat. No. 9,149,149 (IPR2016-01396).
Curriculum vitae of David Elmer Wheeler, Exhibit 2001 of the Preliminary Response for Inter Partes Review of U.S. Pat. No. 9,144,343 (IPR2016-01394).
Keurig's Recall Notice, Exhibit 2005 of the Preliminary Response for Inter Partes Review of U.S. Pat. No. 9,144,343 (IPR2016-01390).
Starbucks Coffee's Press Release Dated Aug. 29, 2011, Exhibit 2006 of the Preliminary Response for Inter Partes Review of U.S. Pat. No. 9,144,343 (IPR2016-01390).
2010 GMCR Annual Report, Exhibit 2007 of the Preliminary Response for Inter Partes Review of U.S. Pat. No. 9,144,343 (IPR2016-01390).
"Starbucks Stores to Start Selling K-Cup Single-Serve Pods" Article, Exhibit 2008 of the Preliminary Response for Inter Partes Review of U.S. Pat. No. 9,144,343 (IPR2016-01390).
Keurig's Amendment After Final Action Dated Jun. 12, 2012, Exhibit 2010 of the Preliminary Response for Inter Partes Review of U.S. Pat. No. 9,144,343 (IPR2016-01390).
Declaration of David E. Wheeler, Exhibit 2011 of the Preliminary Response for Inter Partes Review of U.S. Pat. No. 9,144,343 (IPR2016-01390).
PTAB's Decision Denying Institution of IPR for Inter Partes Review of U.S. Pat. No. 9,144,343 (IPR2016-01390) dated Jan. 4, 2017.
Preliminary Response for Inter Partes Review of U.S. Pat. No. 9,149,149 (IPR2016-01392) dated Oct. 12, 2016.
Declaration of David E. Wheeler, Exhibit 2011 of the Preliminary Response for Inter Partes Review of U.S. Pat. No. 9,149,149 (IPR2016-01392).
PTAB's Decision Denying Institution of IPR for Inter Partes Review of U.S. Pat. No. 9,149,149 (IPR2016-01392) dated Jan. 4, 2017.
Preliminary Response for Inter Partes Review of U.S. Pat. No. 9,149,151 (IPR2016-01394) dated Oct. 20, 2016.
Declaration of David E. Wheeler, Exhibit 2011 of the Preliminary Response for Inter Partes Review of U.S. Pat. No. 9,149,151 (IPR2016-01394).
PTAB's Decision Regarding Institution of IPR for Inter Partes Review of U.S. Pat. No. 9,149,151 (IPR2016-01394) dated Jan. 4, 2017.
Touch's Request for Adverse Judgement for Inter Partes Review of U.S. Pat. No. 9,149,151 (IPR2016-01394) dated Mar. 17, 2017.
PTAB's Decision Regarding Judgement and Final Written Decision for Inter Partes Review of U.S. Pat. No. 9,149,151 (IPR2016-01394) dated Mar. 24, 2017.

(56) References Cited

OTHER PUBLICATIONS

Preliminary Response for Inter Partes Review of U.S. Pat. No. 9,149,150 (IPR2016-01395) dated Oct. 13, 2016.
Declaration of David E. Wheeler, Exhibit 2011 of the Preliminary Response for Inter Partes Review of U.S. Pat. No. 9,149,150 (IPR2016-01395).
PTAB's Decision Denying Institution of IPR for Inter Partes Review of U.S. Pat. No. 9,149,150 (IPR2016-01395) dated Jan. 4, 2017.
Preliminary Response for Inter Partes Review of U.S. Pat. No. 9,149,149 (IPR2016-01396) dated Oct. 14, 2016.
Declaration of David E. Wheeler, Exhibit 2011 of the Preliminary Response for Inter Partes Review of U.S. Pat. No. 9,149,149 (IPR2016-01396).
PTAB's Decision Denying Institution of IPR for Inter Partes Review of U.S. Pat. No. 9,149,149 (IPR2016-01396) dated Jan. 4, 2017.
Touch's Opening Claim Construction Brief dated Dec. 12, 2016.
Declaration of Sang N. Dang in Support of Touch's Opening Claim Construction Brief dated Dec. 12, 2016.
Amendment under 37 CFR §1.312 filed with USPTO on May 26, 2015 in the prosecution history of the U.S. Pat. No. 9,149,150 Patent, Exhibit 7 of the Declaration of Sang N. Dang in Support of Touch's Opening Claim Construction Brief dated Dec. 12, 2016.
Response to Rule 312 Communication issued by USPTO on Jun. 19, 2015 in the prosecution history of the U.S. Pat. No. 9,149,150 Patent, Exhibit 8 of the Declaration of Sang N. Dang in Support of Touch's Opening Claim Construction Brief dated Dec. 12, 2016.
Keurig's Opening Claim Construction Brief dated Dec. 12, 2016.
Declaration of Christopher W. Henry in Support of Keurig's Opening Claim Construction Brief dated Dec. 12, 2016.
Touch's Responsive Claim Construction Brief [Redacted] dated Jan. 13, 2017.
Keurig's Responsive Claim Construction Brief dated Jan. 13, 2017.
Joint Claim Construction and Prehearing Statement dated Jan. 23, 2017.
PCT International Search Report and Written Opinion dated Nov. 8, 2013 for PCT App. Ser. No. PCT/US2013/047408.
Petition for Inter Partes Review of U.S. Pat. No. 9,149,150 (IPR2016-01395).
Declaration of Paul Phillips, Exhibit-1012 of the Petition for Inter Partes Review of U.S. Pat. No. 9,149,150 (IPR2016-01395).
Curriculum vitae of Paul A. Phillips, Exhibit-1017 of the Petition for Inter Partes Review of U.S. Pat. No. 9,149,150 (IPR2016-01395).
Petition for Inter Partes Review of U.S. Pat. No. 9,149,151 (IPR2016-01394).
Declaration of Paul Phillips, Exhibit-1012 of the Petition for Inter Partes Review of U.S. Pat. No. 9,149,151 (IPR2016-01394).
Curriculum vitae of Paul A. Phillips, Exhibit-1017 of the Petition for Inter Partes Review of U.S. Pat. No. 9,149,151 (IPR2016-01394).
Preliminary Response for Inter Partes Review of U.S. Pat. No. 9,144,343 (IPR2016-01390) dated Oct. 12, 2016.
Curriculum vitae of David Elmer Wheeler, Exhibit 2001 of the Preliminary Response for Inter Partes Review of U.S. Pat. No. 9,144,343 (IPR2016-01390).
Keurig 2.0 K-Cup Carton Box image, Exhibit 2002 of the Preliminary Response for Inter Partes Review of U.S. Pat. No. 9,144,343 (IPR2016-01390).
Barista Prima Coffeehouse Photograph, Exhibit 2003 of the Preliminary Response for Inter Partes Review of U.S. Pat. No. 9,144,343 (IPR2016-01390).
"Keurig Recalls MINI Plus Brewing Systems Due to Burn Hazard" Article, Exhibit 2004 of the Preliminary Response for Inter Partes Review of U.S. Pat. No. 9,144,343 (IPR2016-01390).

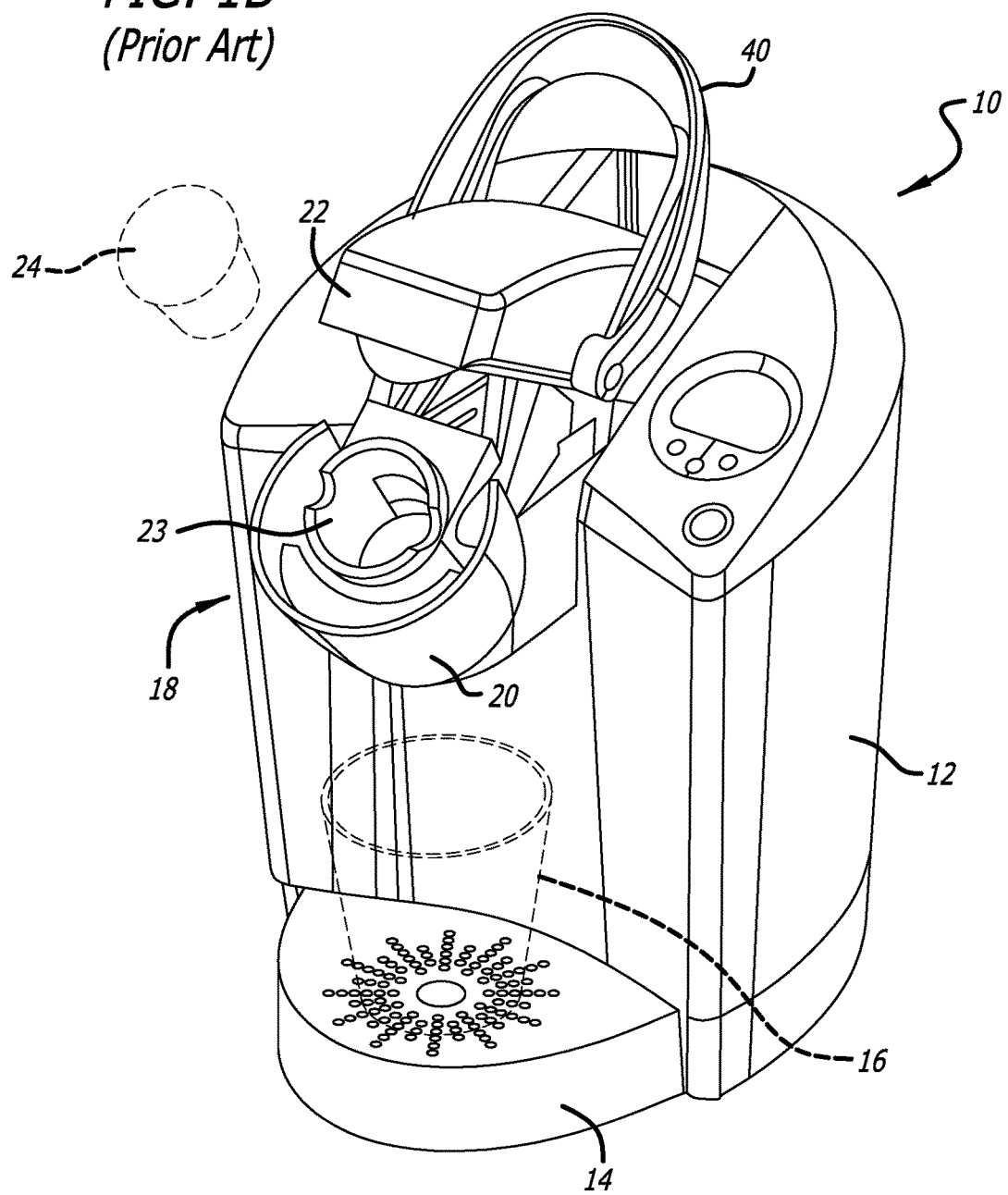

BEVERAGE BREWING SYSTEM

CROSS-REFERENCE TO RELATED APPLICATIONS

This application is a continuation of U.S. application Ser. No. 14/866,732, filed Sep. 25, 2015, which is a continuation of U.S. application Ser. No. 14/542,398, filed Nov. 14, 2014, now U.S. Pat. No. 9,149,151, which is a continuation of International Application Serial No. PCT/US2013/047408, filed Jun. 24, 2013, which claims priority to U.S. Provisional Application Ser. Nos.: (1) 61/690,275, filed Jun. 22, 2012; (2) 61/849,236, filed Jan. 22, 2013; (3) 61/850,862, filed Feb. 25, 2013; and (4) 61/852,470, filed Mar. 15, 2013, each of which are incorporated by reference.

BACKGROUND OF THE INVENTION

1. Field of the Invention

This invention is directed a beverage brewing system, and in particular, to a brewing system for making hot beverages such as coffee, tea, coco, milk, and soup.

2. Background of the Invention

There are many ways to brew coffee including drip and French press methods. Recently, brewing coffee through a single-serve cartridge has become popular for its convenience and a variety of coffee flavors which are offered. Single-serve cartridges are packed with premeasured coffee grind which can be inserted into a brewer to inject hot water into the cartridge to brew the coffee. Like any other beverages, one of the important criteria for a success of the beverage is its taste, and coffee is no different. In this regard, the Coffee Brewing Center (CBC) during the 1960's, led by Dr. Earl Lockhart, has done a lot of research in understanding the physics and science behind what constitutes a good tasting coffee. The CBC has come up with what is called the "Coffee Brewing Control Chart" like the one shown in FIG. 1, which provides a graphical representation of strength, extraction and brew formula in an easy to read format.

According to the chart shown in FIG. 1, an ideal tasting coffee is obtained when there is a good combination of strength and extraction. Strength is also referred to as total dissolved solids ("TDS"), and the ideal TDS level is 1.15%-1.35%. For example, TDS level of 1.00% means there is 1.00% of coffee concentration and the remaining 99.00% is water in the cup. According to the chart, coffee having a TDS level below 1.15% may taste weak; while coffee having a TDS level above 1.35% may taste too strong. As a reference, coffee from a traditional coffee house, such as Starbucks®, may have a TDS level from about 1.20% to about 1.35%. In practice, many consumers may find that a cup of coffee with a TDS level from about 0.80% to 1.00% to be mild and acceptable taste; while a TDS level from about 1.00% to about 1.15% to be regular strength taste; and a TDS level from about 1.15% to about 1.35% to be a strong coffee taste. The TDS level may be measured using a number of different instruments such as hydrometers, conductivity, Brix and moisture microwave. In particular, a conductivity meter measures the amount of coffee flavoring material based on its conductivity across a coffee infusion.

The chart in FIG. 1 also indicates that the ideal extraction level for coffee is 18%-22%. Extraction means amount of coffee that has dissolved from the coffee grind into the coffee drink. For example, if 10 grams of coffee grind is brewed, and after the brewing there is 8.0 grams of coffee grind left, then the extraction level is 20% because 2 grams or 20% of the coffee grind dissolved into coffee. Extractions below 16% may indicate a coffee taste that is under-developed such that it may have a weak peanut-like flavor, while extractions over 22% may indicate a coffee taste that is over-extracted so it may taste bitter.

Many hot beverages, such as coffee and tea, are now provided in single serve packs which can be inserted into a brewer to inject hot water into the pack to brew hot beverages. For instance, US. Patent Application Publication No. 2005/0051478 entitled BEVERAGE FILTER POD by Karanikos et al. (the "'0051478 Application"), which is hereby incorporated by reference, describes a beverage filter cartridge having a cup like container where the interior is divided into two chambers by a cup-shaped filter element: a first chamber inside the filter and a second chamber located between the filter bottom and the container bottom. The upper rim of the filter is joined at the upper rim of the container side wall, and the filter side wall has exterior channels that face the container side wall and lead downwardly from the peripheral juncture to the second chamber. The filter sidewall is folded to provide exterior channels. And according to the '0051478 Application, during the brewing cycle, the channels provide a passageway for beverage to permeate from the first chamber to the second chamber, and in so doing, improve the full saturation of the beverage grind in areas adjacent to the container side wall.

A beverage grind, such as grinded coffee, is poured into the first chamber, and a cover, such as an aluminum foil, is used to seal the container. An input needle can pierce through the cover to inject hot water into the first chamber to mix with the beverage grind to produce a beverage. The filter element is permeable to allow liquid beverage to pass therethrough while retaining the granular beverage grind within the filter. The beverage passes through the filter via the exterior filter channels, and into the second chamber. An output needle can pierce the bottom of the container to allow the beverage to flow out from the second chamber. While the cartridge described in the '0051478 Application is able to brew a sufficient cup of coffee, the cup size of the coffee is limited because there is a limit as to how much coffee grind the filter can hold.

To brew a bigger cup of coffee, US. Patent Application Publication No. 2010/0303964 entitled CARTRIDGE WITH FILTER GUARD by Beaulieu et al. (the "'0303964 Application"), which is hereby incorporated by reference, discloses a more elongated filter compared to the filter disclosed in the '0051478 Application such that the space in the second chamber is minimized. With a bigger filter, more coffee grind may be inserted into the cartridge to brew a bigger and/or stronger cup of coffee. In order to protect the filter from the output needle piercing through the bottom of the filter, a filter guard is provided between the filter and the bottom of the cartridge so that the filter guard makes contact with the output needle to protect the filter. While providing a larger filter to hold more coffee grind somewhat enabled brewing a stronger tasting coffee or a larger cup of coffee, coffee made from the cartridge generally described in the '0303964 Application resulted in TDS levels of about 0.95%, which may be considered weak according the chart shown in FIG. 1. Accordingly, there still is a need to brew stronger tasting coffee using a single-serve cartridge.

As of 2013, the market leader of single-serve cartridge platform in North America is Green Mountain Coffee Roasters®, which sells its single-serve platform under the Keurig® brand name, collectively referred to as Keurig®. Keurig® offers over 200 varieties of single-serve cups, also known as K-Cup®, which works with several of Keurig's® brewers offered in the market today. There is estimated to be over 12 million U.S. households with Keurig® brewers in use largely due to its convenience where a single cup of coffee can be made without much of a cleanup. A good example of types of brewers offered by Keurig® is generally described in U.S. Pat. No. 7,347,138, which is incorporated by reference.

FIG. 1B is a copy of FIG. 3 of the U.S. Pat. No. 7,347,138. The brewer 10 includes a brew chamber 18 comprised of a cartridge receptacle 20 and a lid 22. The receptacle 20 has a removable holder 23 configured and dimensioned to receive a beverage filter cartridge 24. The holder 23 has a needle at the bottom to pierce through the bottom of the cartridge when the cartridge is pressed down into the holder. The cartridge 24 includes an outer container internally subdivided by a paper filter into two compartments: top and bottom compartments. The top compartment is defined by the shape of paper filter to hold coffee grind within the paper filter. The bottom compartment is a remaining empty space with enough space so that the bottom needle does not pierce the paper filter in order to prevent the coffee grind from washing out during the brewing process.

The holder 23 is removable so that it may be easily cleaned. One of the common elements of the brewers offered by Keurig® is that they all utilize essentially the same holder 23. The holder 23 is configured such that when the cartridge 24 is inserted into the holder 23, the cartridge 24 substantially fills the void within the holder 23 such that there is little gap between the holder 23 and the cartridge 24. This means that the outer shape of the cartridge 24 is constraint by the holder 23 such that cartridge 24 may not be enlarged, which means that there is a limit as to how much coffee grind that can be packed within the paper filter in the cartridge 24. As discussed above, without being able to enlarge the cartridge, only other option is to enlarge the paper filter as much as possible to hold more coffee grind to make a stronger cup of coffee, but doing so lowers the paper filter closer to the bottom needle, which increases the risk of the bottom needle piercing the paper filter. As discussed above, the cartridge disclosed in the '0303964 Application utilizes a filter guard to protect the paper filter from the bottom needle. While the cartridge disclosed in the '0303964 Application can hold more coffee grinds, there is still a limitation due to the fixed outer size of the cartridge 24. As such, there is a need to brew a stronger and bigger cup of coffee when utilizing the Keurig's® brewers.

There are many factors that can determine the taste of coffee; however, the temperature and flow rate of the water passing through the coffee grind can have significant impact on the coffee taste. In general, water temperature between 190-205° F. may be considered a desirable temperature range to brew a good balance tasting coffee. For instance, if the water temperature is below the desired temperature, the coffee may be under-extracted such that the coffee may taste sour. Conversely, if the water temperature is above the desired temperature, the coffee may be over-extracted such that the coffee may taste bitter. With regard to the flow rate, if the hot water passes through the coffee grind too quickly, then the coffee may be under-extracted; however, if the flow rate is too slow, then the coffee may be over-extracted. As such, there is a need for a brewer that can more precisely control the temperature and flow rate of the water.

Another concern is when the single-serve beverage cartridges are offered in commercial settings such as in offices and food service industry. In commercial settings, such as in the office services, the beverages may be serviced by a professional catering service that periodically restock the inventory of beverage cartridges at the offices. This, however, can be a time consuming process, since the professional catering service may need to contact the office manager prior to visiting to get an inventory of beverage cartridges it needs to restock the cartridges. This means that someone from the office may need to manually count the inventory of cartridges it has or does not have, and pass the information to the catering service. Alternatively, the catering service may need to carry the inventory with the truck and driver, and have the driver manually count the inventory, and restock the office. All of these manual operations may be an inefficient way of restocking the beverage cartridges. As such, an improved inventory management system is needed.

The single-serve beverage platform is largely a razor and razor blade business model, where the catering business may offer the brewer for free or at a low price with the understanding that the office customer will purchase the cartridges from the catering service. In certain situations, however, the office may purchase unauthorized cartridges from less expensive retailer to save costs. Unfortunately, such unauthorized purchase of the cartridges can have negative financial impact on the catering business. As such, there is a need to improve the inventory management of the cartridges.

INVENTION SUMMARY

This invention is directed to a cartridge system adapted to brew a beverage through a brewer having a brewing chamber adapted to receive the cartridge system. The brewing chamber may have a deep well with one or more needles therewithin to pierce through the bottom of the cartridge system when inserted into the well. The cartridge system may include a cup having a base and a lip, a side wall between the lip and the base defining an interior space therewithin. A filter may have a deep bowl configuration with a bottom and a side wall that tappers up to form a rim. The rim of the filter is adapted to couple adjacent to the lip of the cup, and the bottom of the filter may be deep enough to be juxtaposed to the base of the cup. The filter may be formed from a material that is substantially resistant to piercing by the needle within the brewing chamber such that the bottom needle raises the filter at a point of contact, and the filter substantially resists the bottom needle from piercing through the filter during a brewing process.

With the bottom of the filter juxtaposed to the base of the cup, the filter may substantially fill the interior space of the cup to optimize the amount of beverage grind that the cartridge system may hold. The additional space within the filter relative to traditional cups, such as K-Cup®, the heated water injected into the cartridge may have more space to circulate to evenly wash or extract the flavors from the beverage grind to provide a smoother tasting beverage.

The cartridge system may include a holder adapted to receive a first beverage cartridge and a second beverage cartridge. The second beverage cartridge may be longer along its longitudinal axis relative to the first beverage cartridge. The holder may have a side wall between a lip and a basin defining a well. The holder may also have a first needle and a second needle within the well, where the first needle is position between the lip and the second needle. The first needle may be adapted to pierce through the first beverage cartridge, and the second needle may be adapted to pierce through the second beverage cartridge.

A portion of the side wall of the second beverage cartridge may have a cavity along its longitudinal axis adapted to receive the first needle such that the first needle does not pierce through the cup. The second needle, however, may pierce through the bottom of the second beverage cartridge.

The interior space of the second beverage cartridge may be about 20% to about 40% larger than the first beverage cartridge where its outer dimensions may be substantially similar to K-Cup®. The extra space within the second beverage cartridge allows for brewing a bigger and/or stronger cup of beverage.

The cartridge system may also have a filter that divides the interior space of the cup between a first chamber and a second chamber. The first chamber may be substantially defined by the interior space of the filter, and the second chamber may be generally defined by the space between the bottom of the filter and the base of the cup. The first chamber may be packed with a first beverage grind such as coffee grind. The second chamber may be packed with a second beverage grind such as powder cream that substantially dissolve instantly as the heated beverage permeate out of the filter and into the second chamber so that the combination of the beverage and the dissolved powder cream does not clog the needle.

Another aspect of the invention is directed a brewer system adapted to brew a beverage utilizing a cartridge packed with beverage grind. The brewer system may include a pump adapted to draw the fluid from either a reservoir or a heating tank. A brewing chamber may be adapted to receive the cartridge and inject the fluid from the pump into the cartridge to brew a beverage. A tube may be may be coupled to the pump to draw the fluid from the reservoir or the heating tank. An air switch may be coupled to a portion of the tube such that atmospheric air may enter the portion of the tube through the switch so that after a predetermined amount of fluid has been pumped through the tube, the pump draws air through the portion of the tube to purge the cartridge of beverage. The reservoir or the heater tank may be adapted to hold the fluid up to a maximum fill line, and the portion of the tube that is coupled to the air switch may be routed in such a way so that the portion of the tube is located above the maximum fill to substantially prevent the water from the reservoir or the heater tank to exit through the switch.

The brewing system may include a heating member adapted to heat the fluid flowing along a pathway from a first end to a second end of the heating member. The first end of the pathway may be fluidly coupled to the pump, and the second end of the pathway may be fluidly coupled to the brewing chamber. The heating member may be a tube heater that heats the fluid passing through therein.

The brewer system may also include a heater tank having an opening to allow air to pass therethrough so that the heated fluid may be drawn through the second end of the tube within the heater tank using a vacuum pump. A temperature sensor may measure the temperature of the fluid within the heater tank. A processor may adjust the temperature of the fluid within the heater tank and adjust the speed of the pump to adjust the flow rate of the fluid through the tube such that the temperature of the fluid is substantially controlled independent of the flow rate of the fluid provided to the brewing chamber. Independently controlling the temperature and the flow rate may brew a beverage with taste that may be best suited for the beverage drinker.

The brewer system may also include a processor communicably coupled to a reader adapted to read an indication mark on the cartridge. This may allow the processor to authenticate the indication mark on the cartridge, and if the processor determines that the indication mark is not authentic, then the processor may not operate the brewing system. With the authentication system, the brewer system may only work with authorized cartridges.

The invention may also include a method of brewing a beverage from a cartridge. The method may include, not in any particular order: (1) drawing a predetermined amount of fluid through an inlet end of a tube such as through the use of a vacuum pump; (2) passing the fluid from an outlet end of the tube to a brewing chamber adapted to receive the cartridge and inject the fluid into the cartridge; and (3) drawing air into the tube between the inlet and outlet ends after the predetermined amount of fluid has passed through the outlet end of the tube. The fluid from the outlet end of the tube may be passed through a tube heater to heat the fluid, and the heated fluid then may be passed to the brewing chamber. The temperature of the fluid exiting the tube heater may be controlled or adjusted by adjusting the flow rate of the fluid passing through the tube heater.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1B shows an illustration of a prior art Keurig® brewer designed to brew a cup of coffee with a K-Cup® or the like.

DETAILED DESCRIPTION OF THE INVENTION

Figure 2:
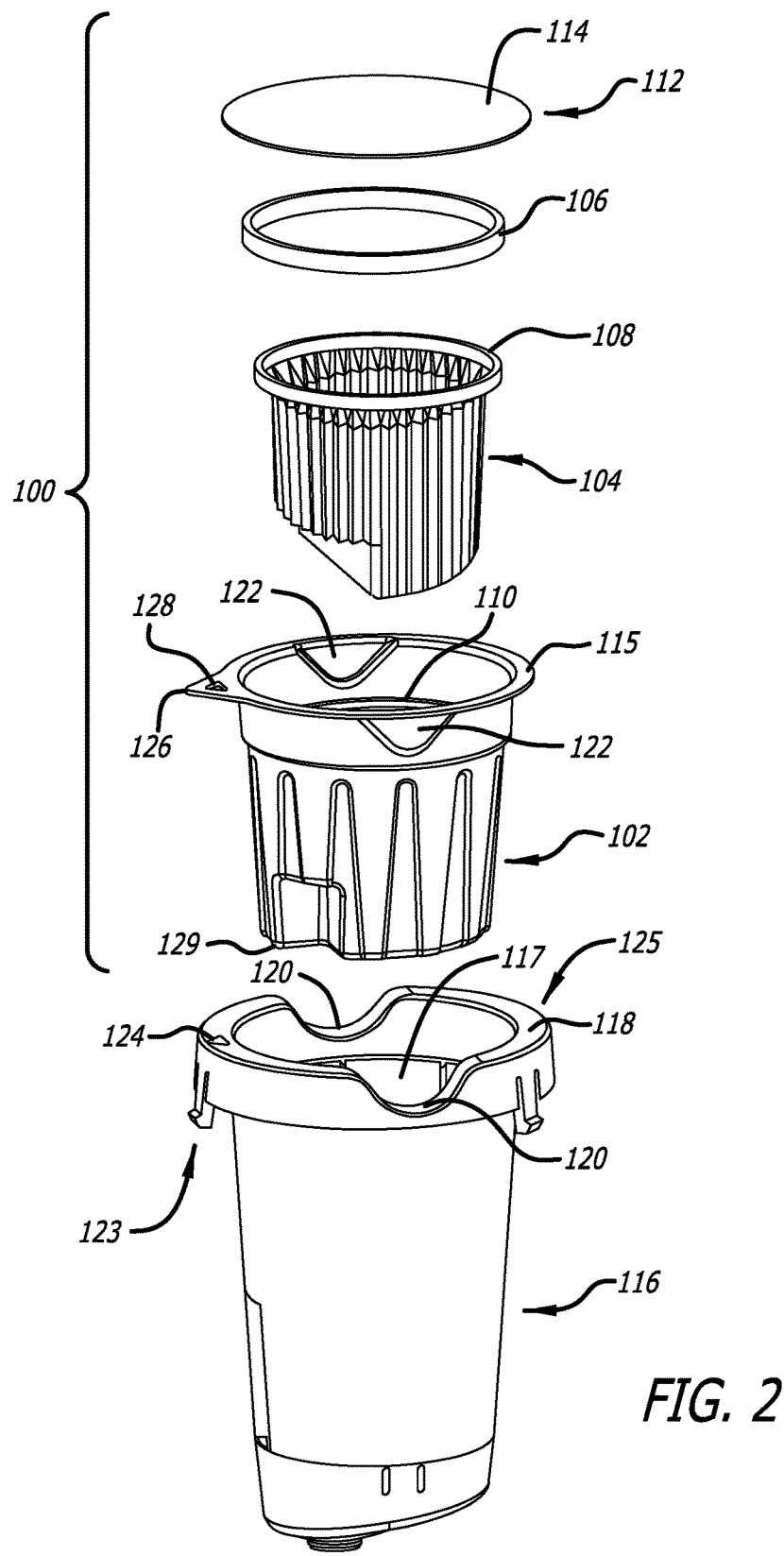
FIG. 2 shows an expanded view of a brewing system.

FIG. 2 shows an expanded view of a cartridge system 100 adapted to brew a beverage. The cartridge system may include a cup 102 adapted to house a filter 104. The filter 104 may be adapted to hold beverage grind, such as grind coffee or tea, therewithin. A ring 106 may be coupled to a rim 108 of the filter 104, and as the filter is fitted inside the cup 102, the ring 106 may releasably engage with an inner ledge 110 formed within the cup 102. With beverage grind placed inside the filter 104, a cover 112 may enclose the cup 102 by sealing around the outer circumference 114 of the cover 112 to a rim 115 of the cup 102.

FIG. 2 also shows a holder 116 having a well 117 adapted to receive the cartridge system 100. The well 117 may be defined by a lip 118 with cavities 120 adapted to receive a pair of ears 122 from the cup 102. The lip 118 may also have a pointer mark 124 to define a first orientation 123 of the holder 116, and a second orientation 125, which may be on the opposite end of the lip 118. The cup 102 may have a ledge 126 with an opening 128 with its shape being substantially similar to the pointer mark 124 on the lip 118. As such, the cup 102 may be fully inserted into the holder 116 when the pair of ears 122 generally line up with the cavities 120, and the ledge 126 with the opening 128 on the cup to indicate to the user to point the ledge 126 towards the first orientation 123 of the holder 116 such that when the cup 102 is full inserted into the holder 116, the pointer mark 124 on the lip 118 may be seen through the opening 128. The cup 102 may have a base 129 sized to fit within the well 117 of the holder.

Figure 3A:
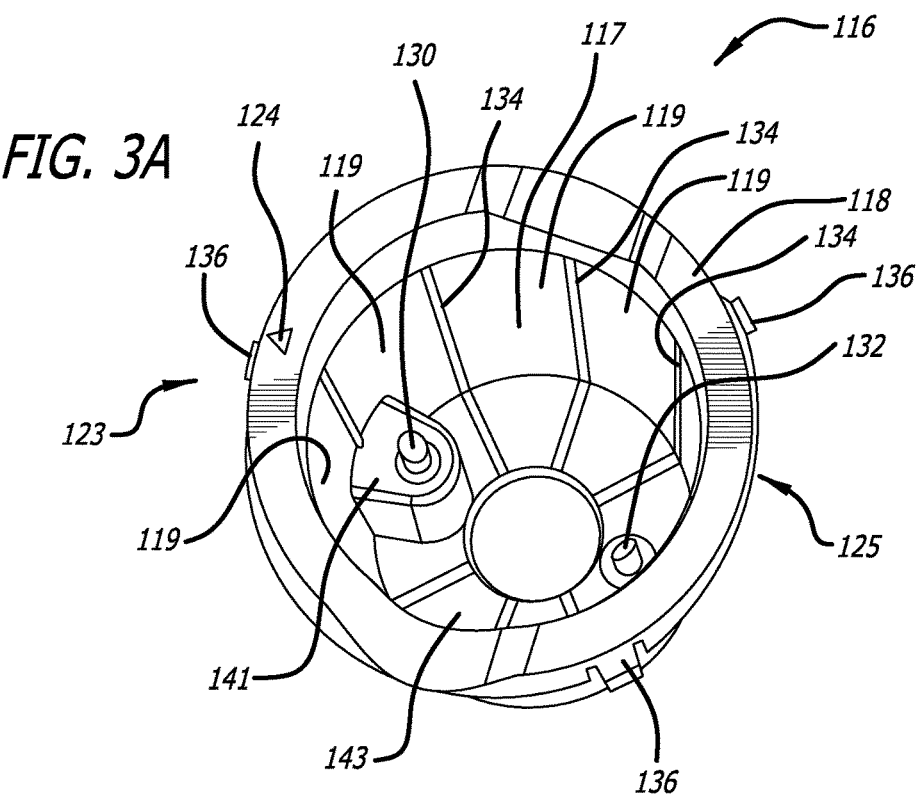
FIG. 3A shows a perspective view of a cup holder.

FIG. 3A shows a perspective interior view of the well 117 of the holder 116. Within the well, the holder 116 may have a first needle 130 and a second needle 132. The first needle 130 may be located towards the first orientation 123 of the holder 116. The holder 116 may have a stopper ledge 141 to support the first needle 130 such that the first needle 130 may be adjacent to the pointer mark 124 on the lip 118. The second needle 132 may be located towards the second orientation 125 of the holder 116, and the second needle 132 may protrude from the basin 143 of the holder. The well 117 may have one or more rib lines 134 along the longitudinal axis of the holder 116. The well 117 may have inner surface areas 119 segmented by the rib lines 134. The needle 130 may be adapted to pierce through the base 129 of the cup 102. The lip 118 may have tabs 136 adapted to engage with a brewer (not shown), which may inject hot water into the cartridge system 100.

Figure 3B:
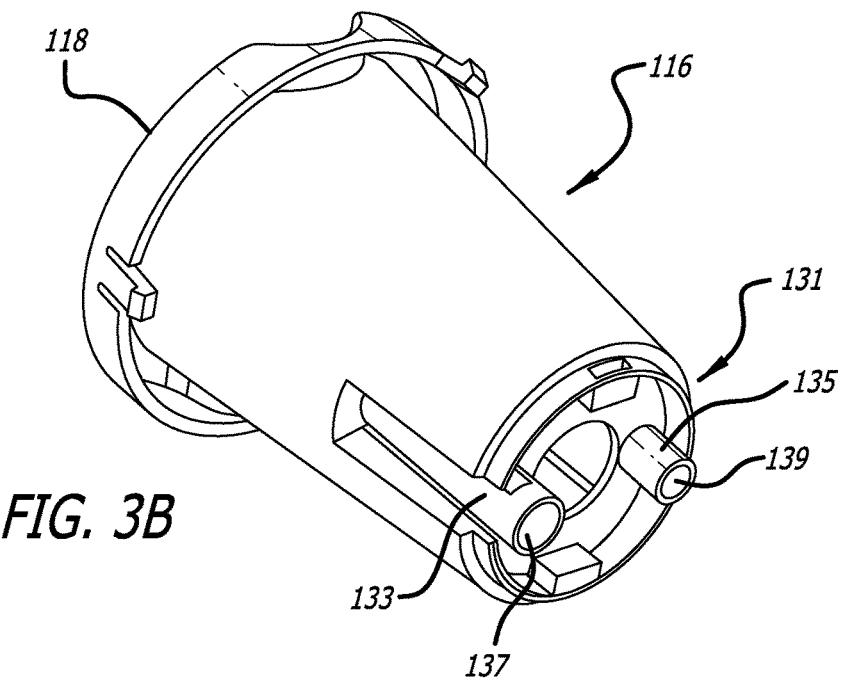
FIG. 3B shows another perspective view of the cup holder of FIG. 3A.

FIG. 3B shows a bottom perspective view of the holder 116. The holder may have a bottom end 131 on the opposite side of the lip 118. The holder 116 may have a first funnel 133 coupled to the first needle 130 such that liquid may pass through the first needle 130 and exit through a first outlet 137. The holder 116 may have a second funnel 135 coupled to the second needle 132 such that liquid may pass through the second needle 132 and exit through a second outlet 139.

Figure 4A:
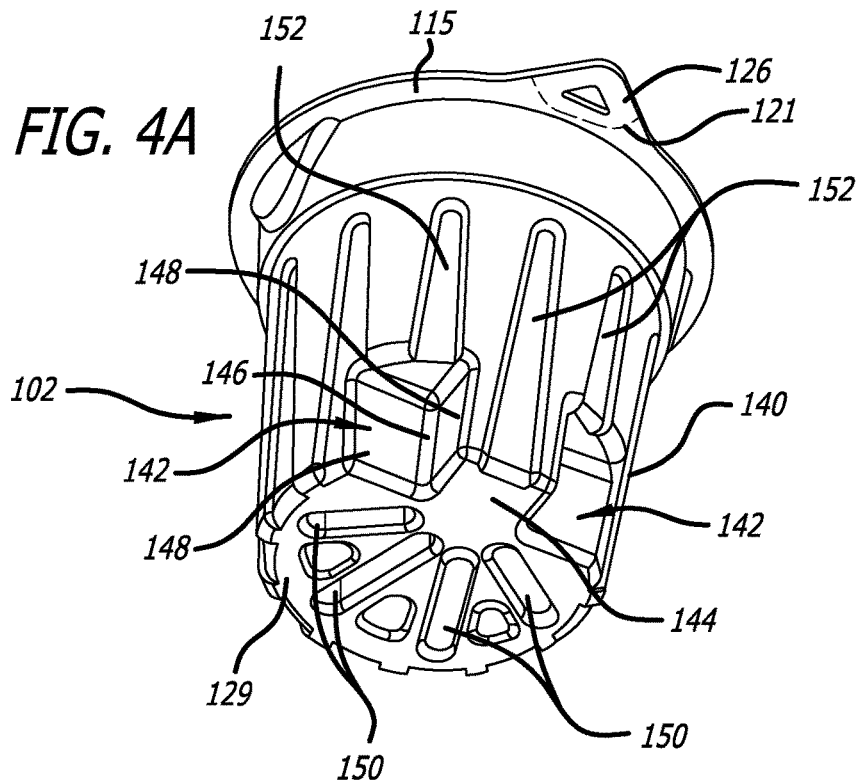
FIG. 4A shows a perspective view of a cup.

FIG. 4A shows a bottom perspective view of the cup 102. The cup 102 may have a base 129 defining a side wall 140 extending between the rim 115 and the base 129. A portion of the side wall 140 near the base 129 may have one or more corner 142 defining a target area 144 along the base 129 between the two corners 142. In general, the corners 142 may be mirror image of each other, and each of the corner 142 may have a bend 146 defining perpendicular walls 148. The target area 144 may be juxtaposed to the ledge 126. The base 129 may have one or more inner ribs 150, and the side wall 140 may have one or more inner ribs 152 along the longitudinal axis of the cup 140. As the cup 102 is inserted into the well 117 of the holder, the inner ribs 152 may accommodate the rib lines 134 within the well 117 of the holder 116; and the side wall 140 of the cup 102 may be adjacent to the inner surface area 119 of the well 117. The rim 115 may have a line of weakness 121 so that the ledge 126 may be separated along the line of weakness 121 from the rim 115 by applying pressure on the ledge 126.

Figure 4B:
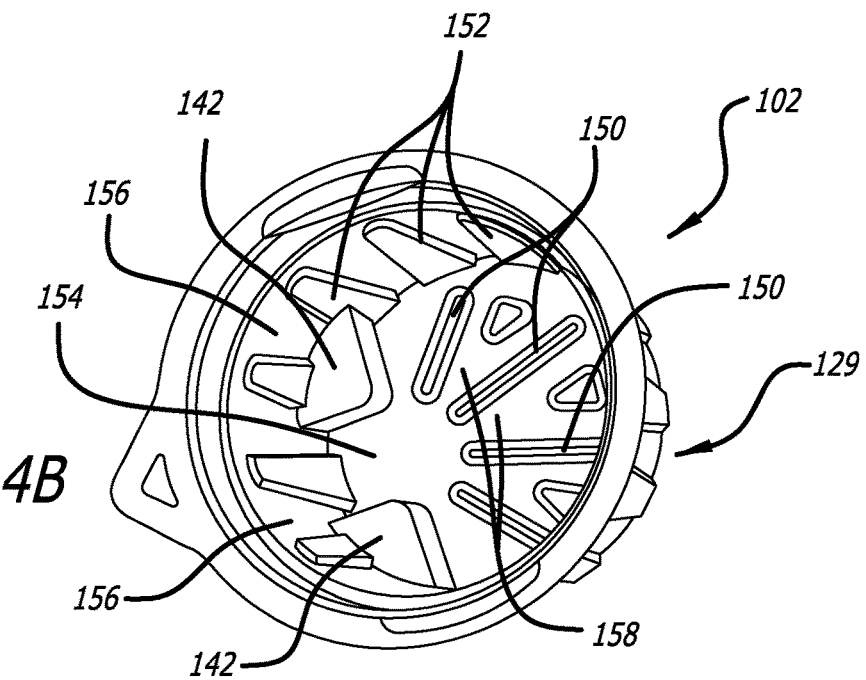
FIG. 4B shows another perspective view of the cup of FIG. 4A.

FIG. 4B shows a perspective view of the cup 102 where a basin 154 may be formed between the two corners 142. Channels 156 may be formed between two adjacent ribs 152 such that wider gaps may be formed between the channels 156 and the sidewall of the filter 104. This may allow the beverage permeating out of the filter 104 to flow down into the basin 154 with less resistance. Base channels 158 may also be formed on the base 129 between the inner ribs 150 to guide liquid or beverage on the base 129 toward the basin 154.

Figure 5A:
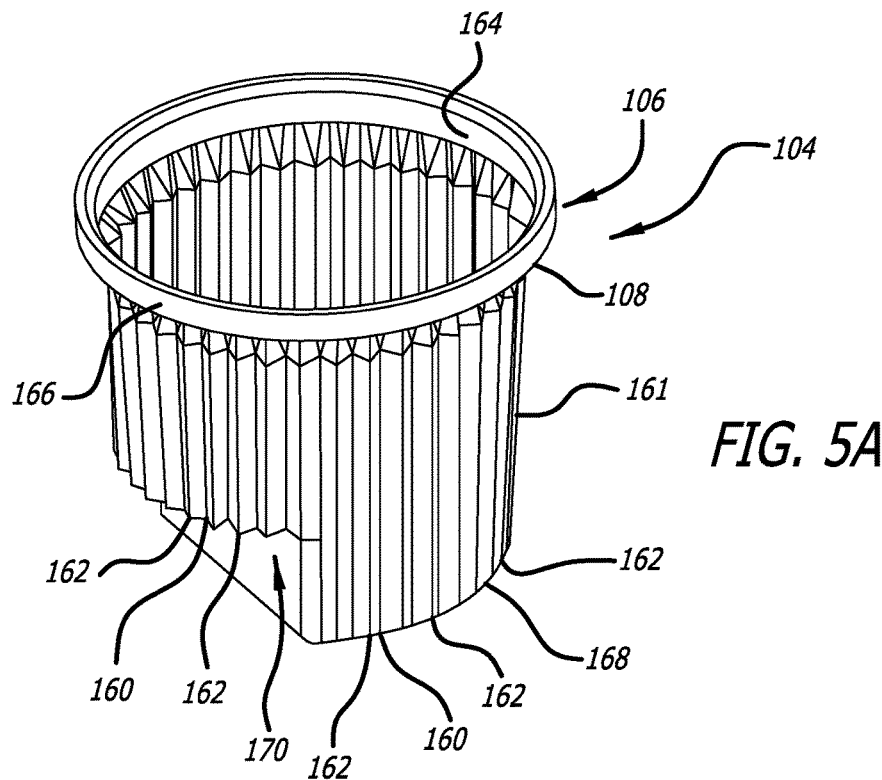
FIG. 5A shows a perspective view of a filter.

FIG. 5A shows a perspective view of the filter 104 with a side wall 161 that is folded such that the side wall 161 may be corrugated to form channels 160 between adjacent peaks 162 along the longitudinal axis of the filter 104. The ring 106 may be coupled to the rim 108 of the filter 104. The ring 106 may have an inner side 164 and an outer side 166. The rim 108 of the filter 104 may be coupled to the inner side 164 or the outer side 166. The rim 108 of the filter 104 may be coupled to the ring 106 through a variety of methods known to one skilled in the art, such as using adhesive or ultrasonic welding. It is also within the scope of the invention to have the rim 108 of the filter 104 to be sealed directly onto the inner wall of the cup near the inner ledge 110. The filter 104 may have a base 168 with an indentation 170 along the base 168 to accommodate the corners 142 of the cup 102 such that the filter 104 substantially fill the space within the cup 102.

Figure 5B:
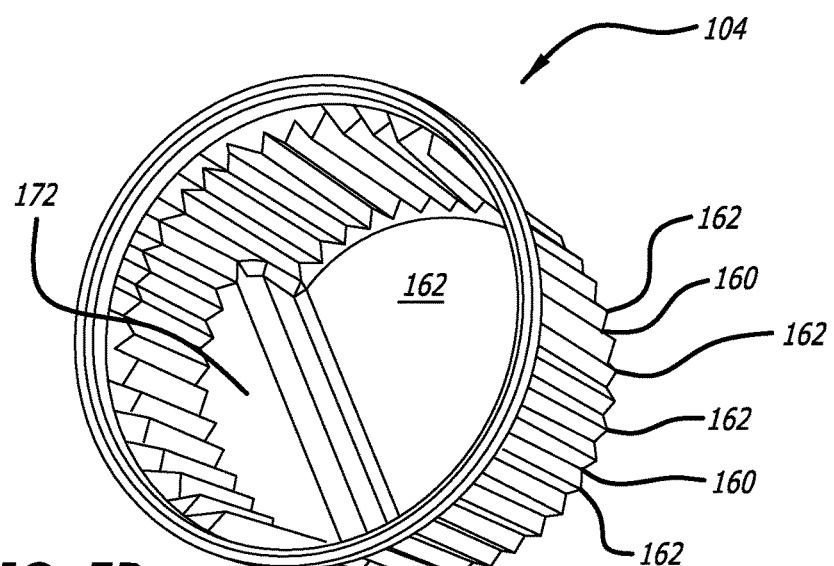
FIG. 5B shows another perspective view of the filter of FIG. 5A.

FIG. 5B shows a top perspective view of the cup filter 104 with more detail view of the channels 160 and peaks 162. The indentation 170 along the portion of the base 162 may form a step 172, which may be supported by the corners 142 such that when the second needle 132 pierces through the basin 154 of the cup 102, the second needle does not pierce through the step 172 of the filter 104 thus eliminating the need for a filter guard as the one described in the '0303964 Application.

Figure 6:
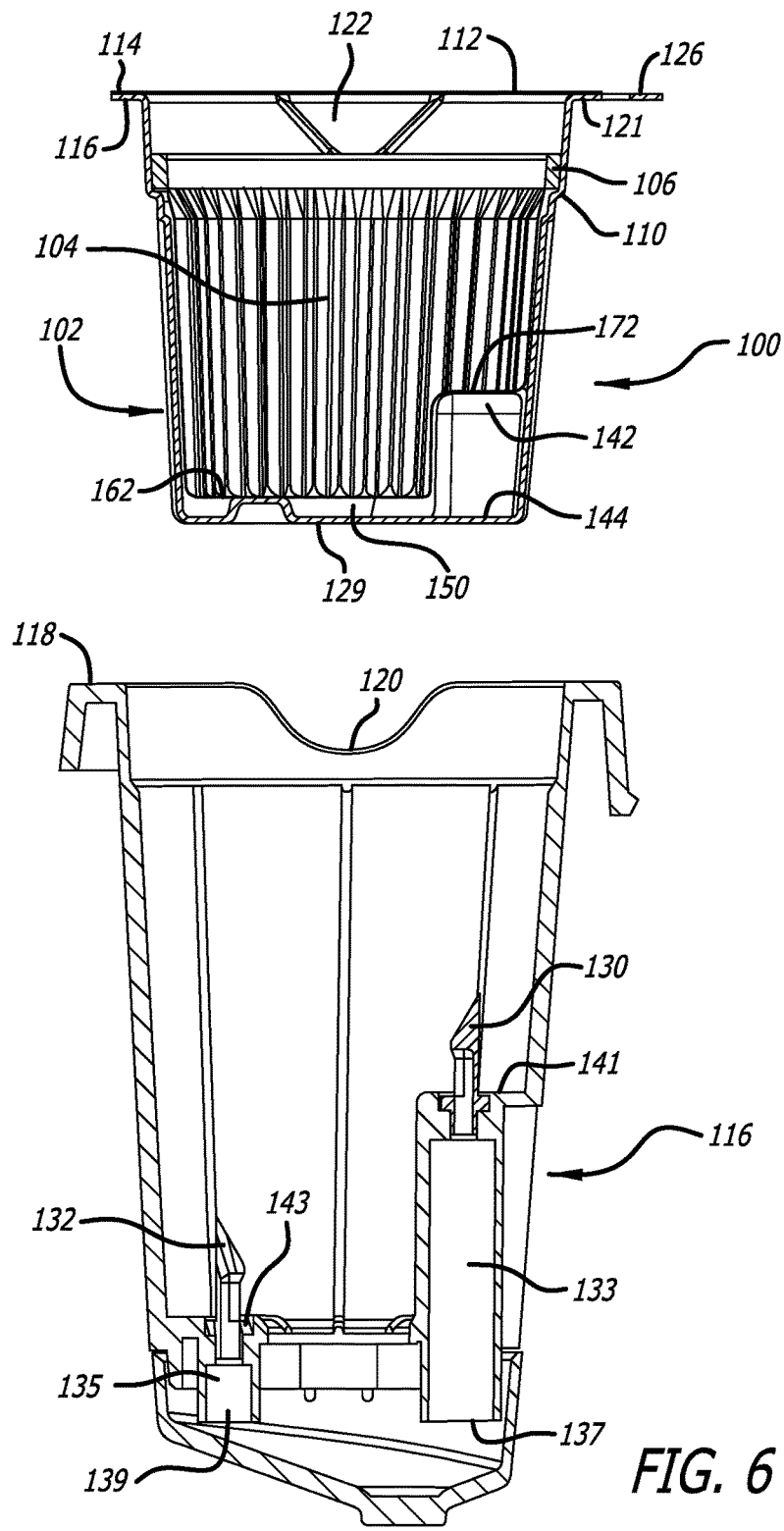
FIG. 6 shows a cross-sectional view of the brewing system of FIG. 2.

FIG. 6 shows cross-sectional views of the cartridge system 100 and the holder 116. The cartridge system 100 may be assembled by inserting the filter 104 into the cup such that the ring 106 may be press fitted into the inner ledge 110 to substantially minimize the hot water injected into the beverage grind in the filter 104 from passing through the gap between the ring 106 and the inner ledge 110. The step 172 of the filter 104 may rest on the corners 142 of the cup, and the base 162 of the filter 104 may be adjacent to the base 129 of the cup 104 such that the filter 104 substantially contours the inner surface of the cup 102. The inner ribs 150 on the base 129 may provide a gap between the base 162 of the filter 104 and the base 129 of the cup. Once the beverage grind has been poured into the filter 104, the outer circumference 114 of the cover 112 may be sealed over the rim 115 of the cup 102. The cover 112 may be sealed onto the cup 102 through a variety of methods known to one skilled in the art, such as adhesive and pressure sensitive adhesive so that the cover may be peeled off after use if desired. For instance, after the cartridge system 100 has been used to make a beverage, the ledge 126 may be broken off from the rim 115 along the line of weakness 121, and as the ledge 126 is lifted, the cover 112 may also peel off from the rim 115 of the cup. With the cover 112 removed, the filter 104 with the used beverage grind in the filter may be removed from the cup 102 by pulling on the ring 106; thus separating the cup 102 from cartridge system 100. The cup 102 may be made from recyclable material so that it can be recycled if desired.

To insert the cup 102 into the holder 116, the pair of ears 122 may be line up with the cavities 120 along the lip 118. The first needle 130 may be coupled to the stopper ledge 141 within the well 117. The first needle 130 may be coupled to the first tunnel 133, and once the first needle 130 pierce through the target area 144 of the cup 102, beverage may pass through the first needle 130 and exit through the first outlet 137. The second needle 132 may protrude from the basin 143 of the holder 116, and the second needle 132 may be coupled to the second funnel 135, and beverage may exit through a second outlet 139.

Figure 7:
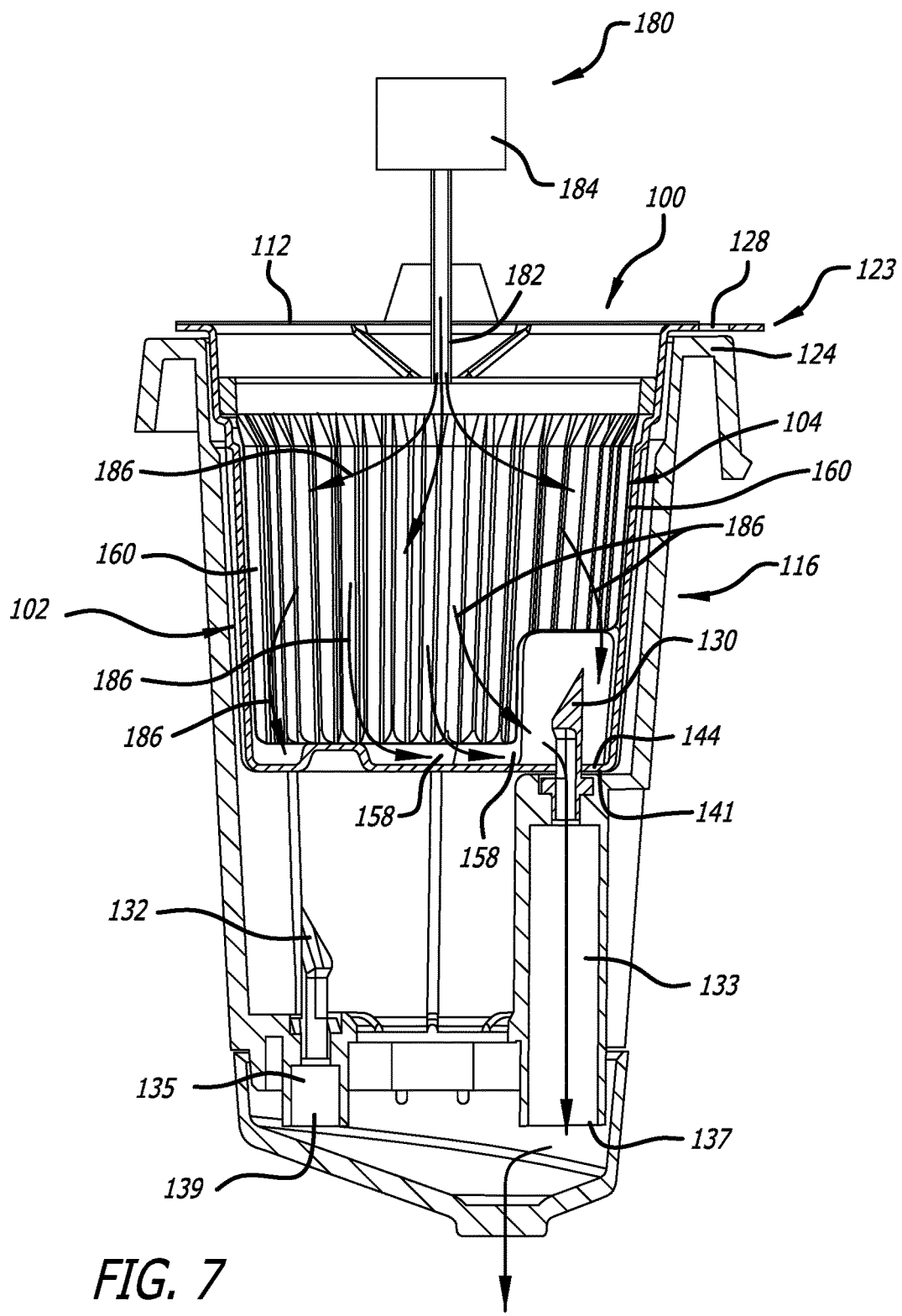
FIG. 7 shows another cross-sectional view of the brewing system of FIG. 2.

FIG. 7 shows a cross-sectional view of the cartridge system 100 inserted into the holder 116. The cartridge system 100 may be inserted into the holder 116 such that the opening 128 may align with the pointer mark 124 on the lip 118 such that the ledge 126 may point towards the first orientation 123 relative to the holder 116. As the cartridge system 100 is inserted in the first orientation relative the holder 116, the first needle 130 may pierce through the target area 144 of the cup 102. The stopper ledge 141 of the holder 116 may abut against the target area 144 of the cup 102 to support the cup 102 within the holder 116. Note that the second needle 132 does not pierce the cartridge system 100.

A brewer system 180 may be provided to brew a beverage. The brewer system 180 may include an injection needle 182 adapted to pierce through the cover 112. The brewer system 180 may include a pump 184 to deliver heated liquid, such as water, though the injection needle 182, and into the cup 102. The solid direction arrows 186 may generally illustrate flow of hot liquid injected into the cup 102 to wash the beverage grind within the filter 104, and pass through the filter 104. The beverage may utilize the channels 160 to drop down into the base channels 158 of the cup 102, and exit through the first needle 130 to pass through the first channel 133 and exit through the first outlet 137.

Figure 8A:
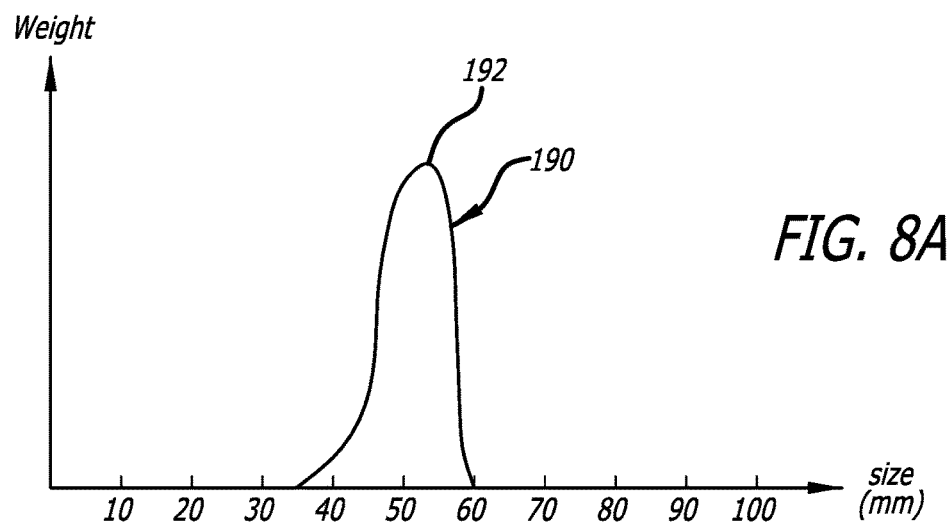
FIG. 8A shows a graph generally illustrating distribution of coffee grind sizes packed in a typical K-Cup®.

FIG. 8A shows a graph generally representing distribution of grind sizes of a coffee formulation 190 provide in a single serve cartridge sold under the trade name of K-Cup® by Green Mountain Coffee Roasters, Inc. The coffee grind sizes provided in the K-Cup® generally vary from about 0.35 mm to about 0.60 mm with a median grind size 192 being about 0.50 mm. While coffee brewed from K-Cup® provide adequate coffee strength, the brew time or flow rate of hot water through the K-Cup® is relatively short compared to a traditional drip coffee method. In addition, the narrow range of the coffee grind sizes may result in uneven saturation of the coffee grind such that an upper portion of the coffee grind may have greater extraction percentage compared to the lower portion of the coffee grind. This may result in low extraction of coffee from the coffee grind such that the TDS level may be low.

Figure 8B:
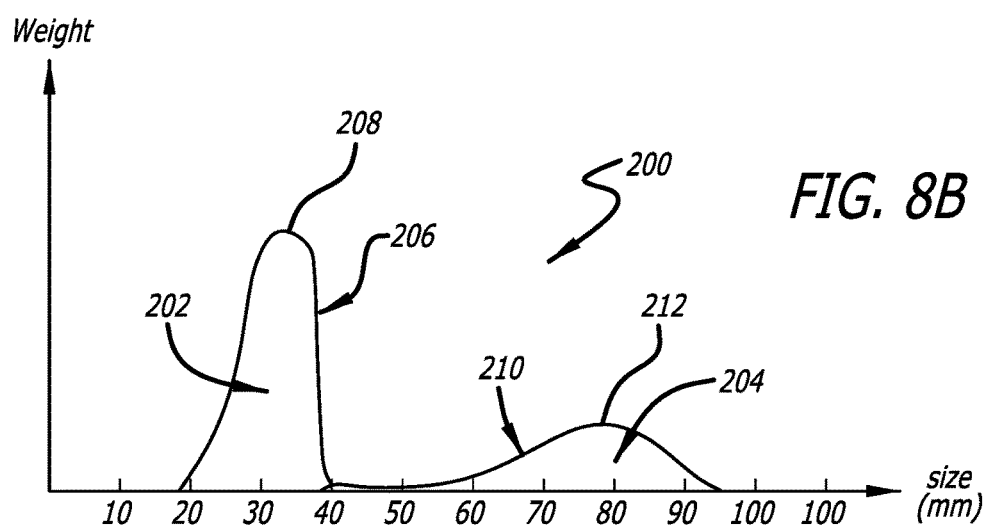
FIG. 8B show a graph generally illustrating distribution of coffee grind sizes according to this invention.

FIG. 8B shows a graph generally representing distribution of grind sizes of a coffee formulation 200 provide in a single serve cartridge in accordance with this invention including a first portion 202 and a second portion 204. The first portion 202 of the coffee grinds may be represented by a graph 206 where the grind sizes varies from about 0.18 mm to about 0.40 mm, and a median grind size 208 of about 0.32 mm. The second portion 204 of the coffee grinds may be represented by a graph 210 where the grind sizes varies from about 0.38 mm to about 0.95 mm, and a median grind size 212 of about 0.75 mm. It is within the scope of this invention to have broader and/or narrow grind sizes for the first portion 202 and the second portion 204 such that there may or may not be an overlap between the graphs 206 and 210. The weight ratio between the first and second portions may be from about 1:1 to about 3:1, and preferably about 2:1. The coffee formulation 200 may be provided in a variety of single cartridge system including K-Cup® and the cartridge system 100 described above.

The coffee formulation 200 may be formulated by grinding the first portion 202 within the grind sizes mentioned above, and grinding the second portion 204 within the grind sizes mentioned above. Thereafter, the proper weight ratio between the first and second portions, as discussed above, may be mixed together to formulate the coffee grind 200. In general, the median grind size 208 of the first portion 202 may be smaller than the median grind size 192, and the median grind size 212 of the second portion 204 may be larger than the median grind size 192. With a combination of distinct smaller and larger coffee grinds of the coffee formulation 200 compared to the coffee formulation 190, the hot liquid may more evenly saturate the coffee formulation 200 to extract more coffee from the combination of the coffee grinds, which may result in a stronger coffee. Moreover, the first portion 202 with smaller grind sizes compared to the coffee formulation 190 may slow down the flow of hot liquid through the coffee formulation 200, thus allowing more time for the hot liquid to extract the coffee beverage from the coffee formulation 200.

Table 1 below shows the test results of coffee brewed from coffee formulations 190 and 200. In preparation for the test, Starbucks'® Caffe Verona Dark roast K-Cups® were purchased, which is generally made in accordance to the cartridge described in the '0303964 Patent Application. The amount of coffee grind in each of the K-Cup® varied. To establish a common base line, aluminum foil cover was opened, and the coffee grinds were poured out and measured using a digital weight meter. An average weight was 12.3 grams of coffee grinds. Using this as a base line, 12.3 grams of same coffee grinds were poured back into empty K-Cup®, and resealed using a new aluminum foil with adhesive layer on one side. The aluminum cover was wrapped over the rim of the cup. Five K-Cups® were made with 12.3 grams of the same coffee grind in each K-Cup®, and they were labeled 1A, 2A, 3A, 4A, and 5A.

From a Starbucks® store, a bag of Dark Caffe Verona® whole bean coffee was purchased. The whole beans were grinded using an Encore Coffee Grinder manufactured by Baratza®. This grinder has many settings to grind the coffee beans in different sizes. Setting the grinder to number 8 grinded the coffee to produce the grind sizes generally described in the first portion 202, and setting the grinder to number 22 grinded the coffee to produce the grind sizes generally described in the second portion 204. The assumption here is that using the same type of coffee beans "Dark Caffe Verona" from the same company, Starbucks®, for testing would minimize the variances in the testing.

After the first and second portions 202 and 204 were grinded, the coffee formulation 200 were made by mixing about 2:1 weight ratio of first and second portions, respectively. Using the same empty Starbucks' K-Cups®, five K-Cups® were refilled with 12.3 grams of the coffee formulation 200, and they were labeled 1B, 2B, 3B, 4B, and 5B. Then in alternating order, as noted below in Table 1, each K-Cups® were inserted into a Keurig® B70 brewer to make coffee. During each brewing cycle, the size of the coffee in (oz), temperature of the coffee in the cup, and the brew times were measured, as noted below.

TABLE 1

| No. | Cup Type | Type of Coffee grind | Gram of Coffee | Brewer | Actual (oz) | Temp (° C.) | brew time | TDS |
|---|---|---|---|---|---|---|---|---|
| 1A | SBUX K-cup | K-cup grind | 12.3 | B70 | 7 | 77.5 | :35 | 0.98 |
| 1B | SBUX K-cup | combo grind | 12.3 | B70 | 7 | 79.0 | :42 | 1.06 |
| 2A | SBUX K-cup | K-cup grind | 12.3 | B70 | 7 | 81.0 | :35 | 0.98 |
| 2B | SBUX K-cup | combo grind | 12.3 | B70 | 7 | 78.0 | :40 | 1.03 |
| 3A | SBUX K-cup | K-cup grind | 12.3 | B70 | 7 | 81.0 | :34 | 0.97 |
| 3B | SBUX K-cup | combo grind | 12.3 | B70 | 7 | 78.0 | :40 | 1.05 |
| 4A | SBUX K-cup | K-cup grind | 12.3 | B70 | 7 | 81.0 | :33 | 0.98 |
| 4B | SBUX K-cup | combo grind | 12.3 | B70 | 7 | 80.0 | :42 | 1.06 |
| 5A | SBUX K-cup | K-cup grind | 12.3 | B70 | 7 | 80.0 | :34 | 0.99 |
| 5B | SBUX K-cup | combo grind | 12.3 | B70 | 7 | 78.0 | :43 | 1.10 |

After the 10 cups coffee were made, the coffee were allowed to cool to room temperature, then the TDS level were measured using a digital conductivity meter from HM Digital, Inc., model no. COM-100. As noted above, B70 consistently brewed same amount of coffee or about 7 oz. However, the average brew time for the coffee formulation 190 was about 34.2 seconds, while the average brew time for the coffee formulation 200 was about 41.4, which is about 7.2 seconds longer than the coffee formulation 190. The longer brew time may have contributed brewing a stronger coffee because the average TDS level for the coffee formulation 200 is about 1.06% compared to the average TDS level for the coffee formulation 190, which is about 0.98%. This means that the coffee formulation 200 brews about 8% stronger coffee compared to the coffee formulation 190 using same amount of coffee.

Figure 9:
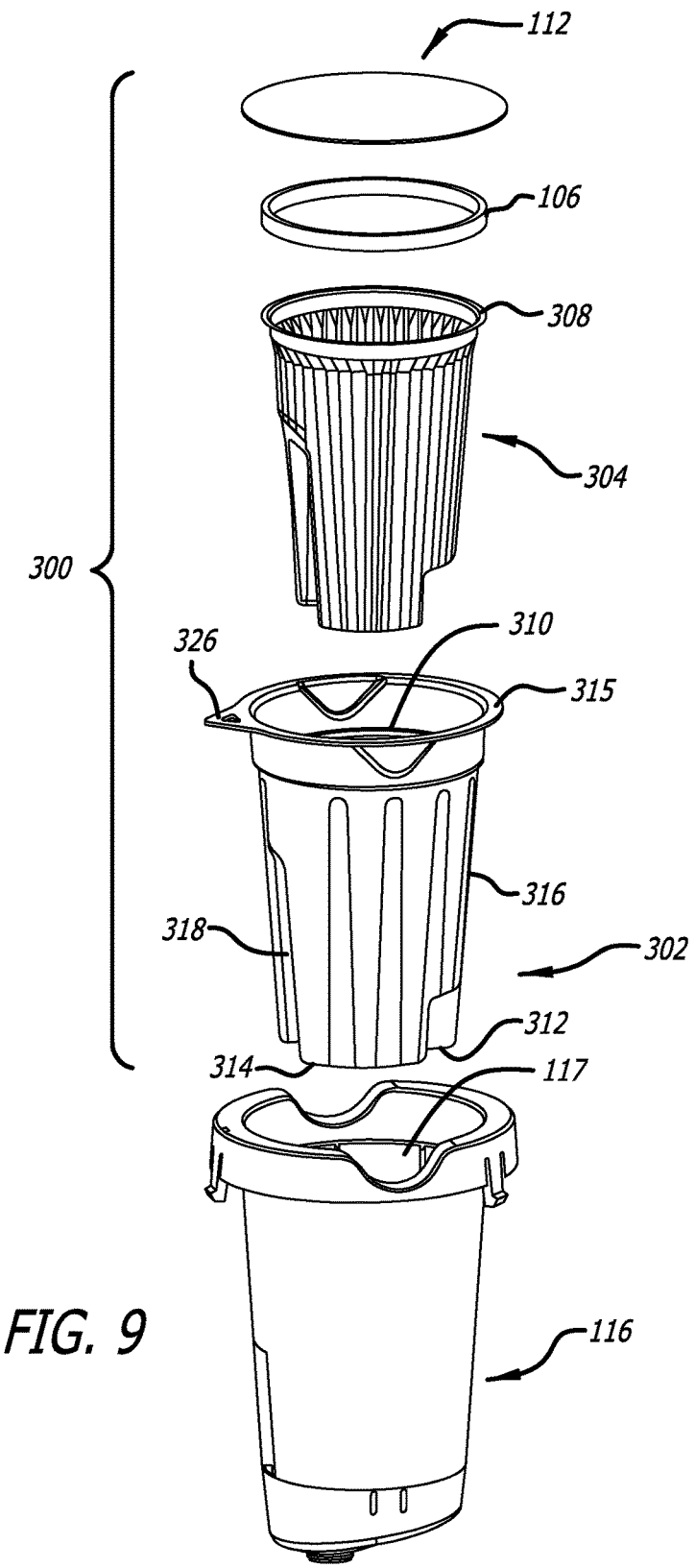
FIG. 9 shows an expanded view of a taller cartridge system.

FIG. 9 shows an expanded view of a cartridge system 300 adapted to brew a beverage. The cartridge system 300 may include an elongated cup 302 adapted to house an elongated filter 304. The elongated filter 304 may be adapted to hold beverage grind, such as grinded coffee or tea, therewithin. A ring 106 may be coupled to a rim 308 of the elongated filter 304, and as the filter is fitted inside the elongated cup 302, the ring 106 may releasably engage with an inner ledge 310 formed within the elongated cup 302. With beverage grind placed inside the elongated filter 304, the cover 112 may enclose the elongated cup 302 by sealing an outer circumference 114 of the cover 112 around the rim 315 of the elongated cup 302. The holder 116 may be adapted to receive the cartridge system 300 within the well 117 such that the second needle 132 may pierce a target area 312 on the base 314. The elongated cup 302 may have a side wall 316 between the rim 315 and the base 314. The side wall 316 may have a cavity 318 along a portion of the elongated cup 302 along its elongated axis below a ledge 326. The cavity 318 may be adapted to receive the first needle 130 such that the first needle 130 may not pierce the elongated cup 302 as discussed in more detail below.

Figure 10:
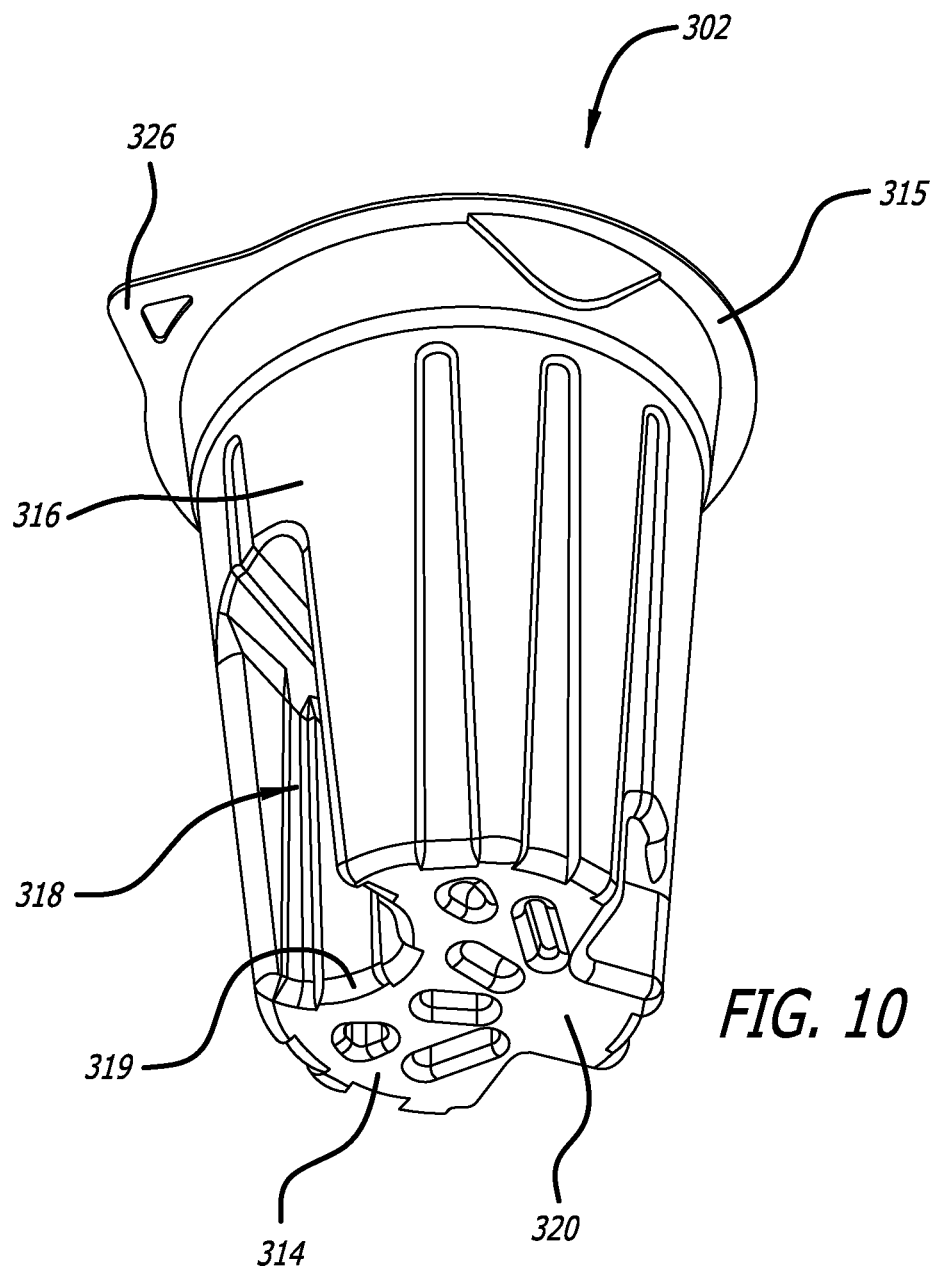
FIG. 10 shows a perspective view of a cup of the cartridge system of FIG. 9.

FIG. 10 shows a bottom perspective view of the elongated cup 302 that may be similar to the cup 102 described above, except that the side wall 316 may have the cavity 318 extending partially along the longitudinal axis of the elongated cup 302 underneath the ledge 326, and the base 314 may have a recess 319 adapted to receive the first needle 130 as the cup 302 is inserted into the holder 116. The base 314 may have a target area 320 on the opposite side of the recess 319. The distance between the rim 315 and the base 314 of the elongated cup 302 may be greater than the distance between the rim 115 and the base 129 of the cup 102.

Figure 11:
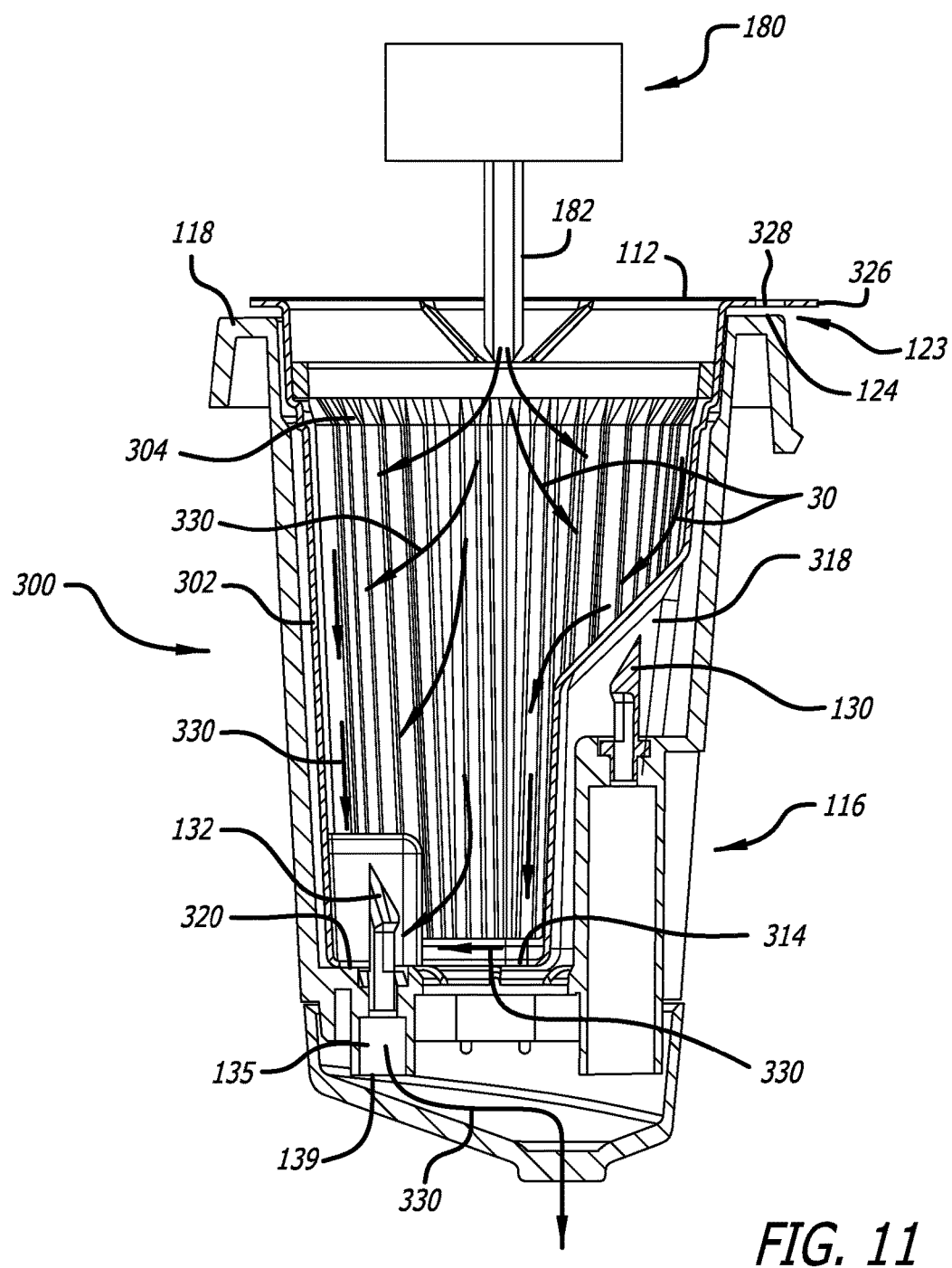
FIG. 11 shows a cross-sectional view of the taller cartridge system of FIG. 9.

FIG. 11 shows a cross-sectional view of the cartridge system 300 inserted into the holder 116. The cartridge system 300 may be inserted into the holder 116 such that an opening 328 within the ledge 326 may align with the pointer mark 124 on the lip 118 such that the cartridge system 300 may be inserted so that the ledge 326 points towards the first orientation 123 relative to the holder 116. As the cartridge system 300 is inserted towards the first orientation relative the holder 116, the cavity 318 of the elongated cup 302 may receive the first needle 130 without pierce the elongated cup 302. The second needle 132, however, may pierce the target area 320 of the elongated cup 302.

A brewer system 180 may be provided to inject hot water through the injection needle 182 adapted to pierce through the cover 112. The solid direction arrows 330 may generally illustrate flow of hot liquid injected into the elongated cup 302 to wash the beverage grind within the filter 304, and pass through the filter 304. The beverage may drop down into the base 314 of the cup 302, and exit through the second needle 132 to pass through the second channel 135 and exit through the second outlet 139. The elongated filter 304 may hold more beverage grind than the filter 104 so that a bigger cup of beverage may be brewed. Moreover, the elongated filter 304 may hold the coffee grind in an elongated form such that it may take longer time for hot water from the injection needle 182 to flow through the coffee grind and reach the second needle 132. The longer contact time between the hot water and the coffee grind may allow for greater extraction of coffee beverage from the coffee grind to brew stronger coffee. Note, it is within the scope of the invention to configure the elongated cup 304 to have both of the first and second needles 130 and 132 pierce the elongated cup 304.

Figure 12A:
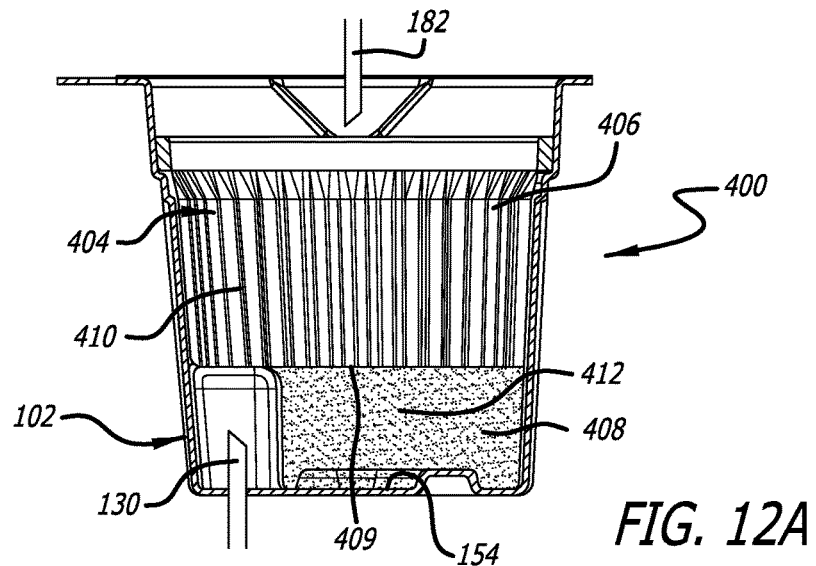
FIG. 12A shows a cross-sectional view of yet another cartridge system with a second beverage grind between a filter and a bottom of the cup.

FIG. 12A shows a cross-sectional view of a cartridge system 400. The cartridge system 400 may be similar to the cartridge system 100, as discussed above, except that a filter 404 within the cup 102 may be shorter than the filter 104 such that the cup 102 may be divided generally into a first chamber 406 and a second chamber 408. The first chamber 406 may be the space within the filter 404 adapted to hold a first beverage grind 410. The second chamber 408 may be the space between a bottom 409 of the filter 404 and the basin 154 of the cup 102. The second chamber 408 may hold a second beverage grind 412. For example, the first beverage grind 410 may be coffee grind, and the second beverage grind 412 may be powder creamer and/or sweetener.

Incorporating creamer in the second chamber 408 allows creamer to be added to the coffee beverage in one-step process. As hot water injected through the injection needle 182 extract coffee from the coffee grind 410 within the filter 404, the hot coffee beverage passes through the filter 404 and enters the second chamber 408, and dissolves the powder creamer 412. The combination of creamy coffee may then exits through the first needle 130. One of the desirable characteristics of powder creamer is to dissolve quickly and thoroughly so that the powder creamer does not clog up the first needle 130. In this regard, powder creamers used in instant coffee may be utilized. In particular, powder creamer made in accordance with Korean patent application publication number 1020120042406 with publication date of Mar. 5, 2012 entitled "PRODUCING METHOD OF COFFEE CREAMER POWDER HAVING IMPROVED MILK FLAVOR," (the "'42406 Application") may be used utilized, which is hereby incorporated by reference.

Note, it is within the scope of this invention to incorporate a second beverage grind 412 into the second camber in the K-Cup®, which is the space between the bottom of the filter and the bottom of the cup. With a finite space in the K-Cup®, the weight ratio between the coffee grind in the filter and the creamer may vary. For instance, with the creamer described in the '42406 Application, the coffee grind to creamer weight ratio may be from about 2:1 to about 2:3, and in particular about 1:1. For instance, while taste can be subjective, a good milky coffee taste was obtain when 6.0 oz cup was brewed using about 10.0 grams of coffee grind in the first chamber, and about 9.0 grams of creamer in the second chamber using a K-Cup®. While it was possible to add more coffee grind and creamer into the first and second chambers, respectively, doing so may in some instances cause the coffee grind and creamer to be too closely packed together within the K-Cup®. This increased the resistance to flow of hot water through the coffee grind such that hot water may leak out through the gap between the injection needle 182 and the cover 112. Moreover, adding more creamer to the second chamber, in some instance, caused the creamer to not dissolve thoroughly such that clumps of creamer were left in the bottom of the cup. As such, in some instances, adding more creamer had the opposite effect in that less milky flavor were detected in the coffee because not all of the powder cream dissolved into the coffee.

Figure 12B:
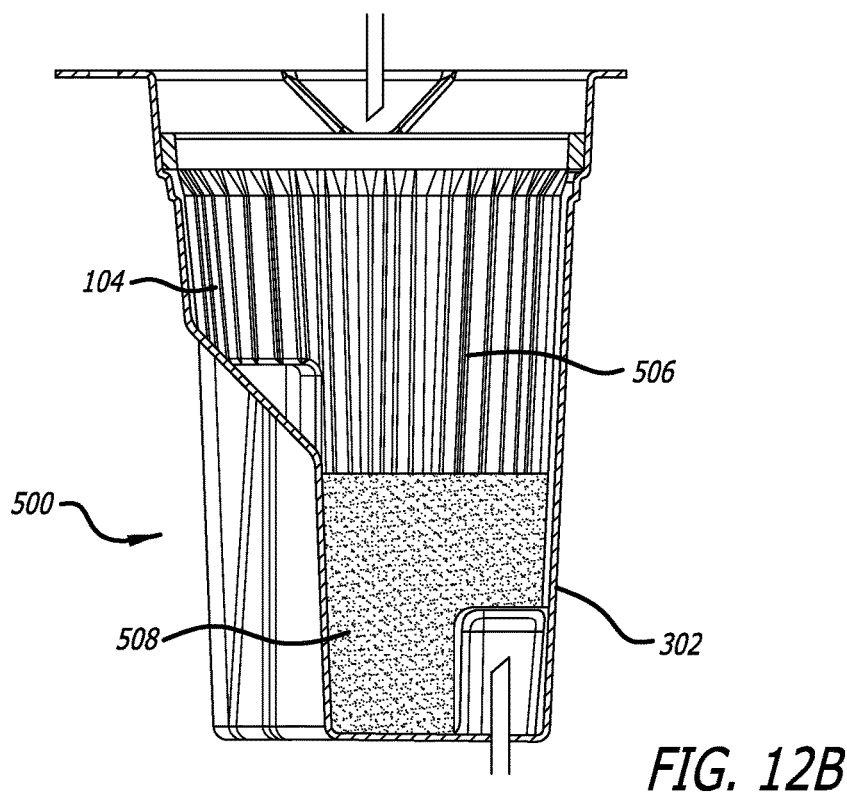
FIG. 12B shows a cross-sectional view of a taller cartridge system with a second beverage grind between a filter and a bottom of the cup.

FIG. 12B shows a cross-sectional view of a cartridge system 500. The cartridge system 500 may be similar to the cartridge system 300, as discussed above, except that the filter 104 may be incorporated into the cup 302 to generally divide the elongated cup 302 into a first chamber 506 and a second chamber 508. The first chamber 506 may be the space within the filter 104 to hold more beverage grind than the cartridge system 400, and hold more creamer in the second chamber 508. This allows the cartridge system 500 to brew a bigger cup of coffee with creamer in one-step process compared to the cartridge system 400. In addition to incorporating creamer and sweetener in the second chamber 508, other taste flavoring may be added to enhance the taste the beverage. Moreover, scent enhancing materials may be added in the second chamber to enhance the aroma scent of coffee to intensify the aroma smell from the cup of coffee.

Figure 13A:
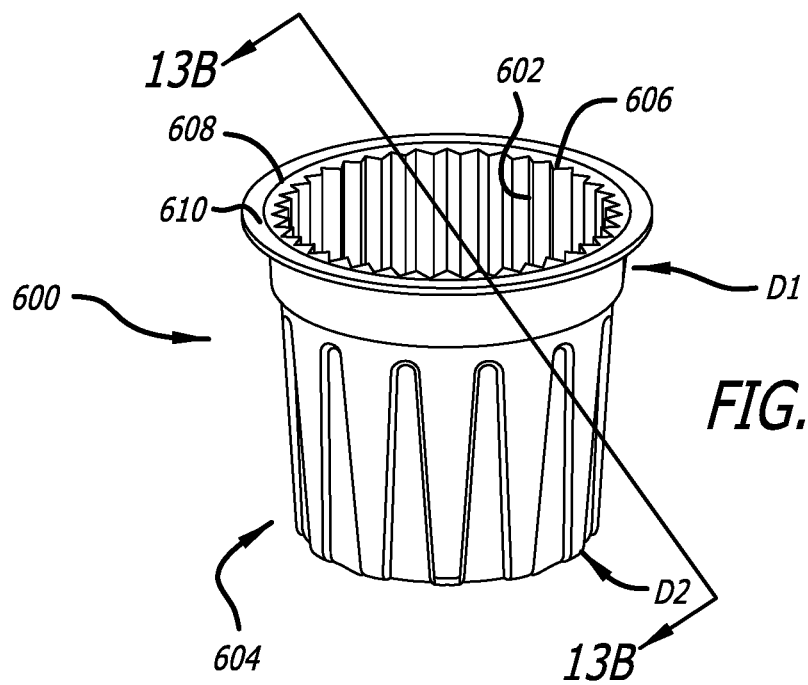
FIG. 13A is a perspective view of yet another cartridge system.

FIG. 13A shows a perspective view of a cartridge system 600 similar to the cartridge system 400, as discussed above, with the following differences. The cartridge system 600 includes a filter 602 within a cup 604. The rim 606 of the filter 602 may be sealed around the inner edge 608 located adjacent to the rim 610 of the cup 604. The cup 604 may not have corners 142 along the bottom, as described in reference to the cup 102, to maximize the space of the second chamber, as discussed in more detail below. The cup 604 may be sized to have similar dimensions as K-Cup® such that the outer diameter D1 adjacent to the rim 610 of the cup may be from about 40.0 mm to about 47.0 mm, and in particular about 45.5 mm. The bottom outer diameter D2 may be from about 34.0 mm to about 38.0 mm, and in particular about 36.5 mm.

Figure 13B:
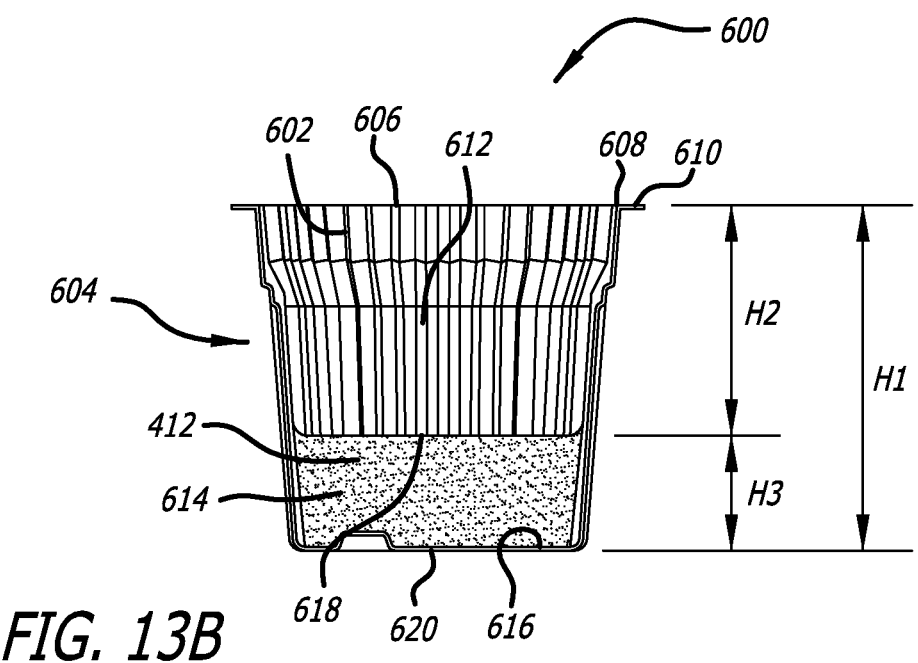
FIG. 13B is a cross-sectional view of the cartridge system of FIG. 13A.

FIG. 13B shows a cross-section view of the cartridge system 600 along the line 13-13 of FIG. 13A. The filter 606 within the cup 604 may be shorter than the filter 104 such that the cup 604 may be divided generally into a first chamber 612 and a second chamber 614. The second chamber 614 may be filled with the second beverage grind 412 such as powder creamer and/or sweetener to a level H3 from a basin 616 of the cup 604. The filter 602 may be sized to substantially fill the remaining space within the cup 604 such that a distance between the rim 610 of the cup and a bottom 618 of the filter 602 may be about H2. The filter 602 may be sealed to the inner edge 608 of the cup after the second beverage grind 412 is filled within the second chamber 614 such that the bottom 618 of filter may be substantially horizontal relative to the basin 616. The height of the cup 604 between a bottom 620 and the rim 610 of the cup 604 is H1. The distance H1 may be from about 43.0 mm to about 46.0 mm, and in particular about 44.5 mm. In situations where the bottom 618 of the filter 602 substantially makes contact with the second beverage grind 412, the H1 may be about the sum of H2 and H3.

In applications where the system 600 is used for brewing creamy coffee in one-step, the distance H3 may be about 30% to about 60% relative to the distance H1; and in particular, the distance H3 may be about 40% to about 50% relative to the distance H1. The distance H3 may vary depending on the desired creamy flavor of the coffee, where adding more cream, or increasing H3, relative to the coffee grind may add more creamy flavor to the coffee, and vice versa. The distance H2 may be about 40% to about 70% relative to the distance H1; and in particular, the distance H2 may be about 50% to about 60% relative to the distance H1. The cup 604 may also have the volume ratio between the first and second chambers 612 and 614 from about 3:7 to about 6:4, and in particular from about 2:3 to about 1:1.

The distance H1 may be greater than the sum of H2 and H3 such that there may be a gap between the bottom 618 of the filter 602 and the secondary beverage grind 412. Providing a gap or space between the filter 602 and the secondary beverage grind 412 may improve the dissolvability of powder cream within the second chamber 614. This may be due to providing extra space within the second chamber 614, which may improve the dissolvability of the power cream.

Figure 13C:
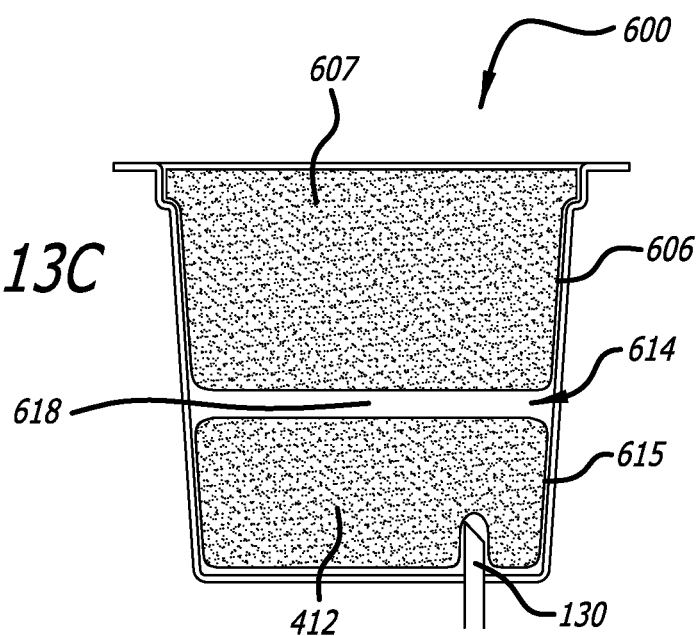
FIG. 13C is another cross-sectional view of the cartridge system of FIG. 13A.

FIG. 13C shows a cross-section view of a cartridge system 600 with the filter 606 within the cup 604 holding coffee grind 607, and the second chamber 614 may have a pouch 615 filled with the second beverage grind 412 such as powder creamer and/or sweetener. The pouch 615 may be a mesh filter to contain the powder creamer therein and allow the powder creamer to permeate when dissolved with hot water. The pouch 615 may be sized to contain the second beverage grind 412 to substantially prevent the grind 412 from making contact with the filter 606 thereby providing a space 618 between the filter 606 and pouch 615. Providing a gap or space between the filter 606 and the grind 412 may improve the dissolvability of the powder grind 412. Moreover, the pouch 615 may be made of a mesh filter material that may substantially resist being punctured by the first needle 130 at the bottom of the cup holder 116 such that the pouch 615 conforms around the needle 130, as shown in FIG. 13C. This may substantially prevent the dry powder cream from passing through the needle 130 and dropping into the cup before the powder cream dissolve into liquid form. However, it is within the scope of the invention to have the needle 130 pierce through the pouch 615.

The amount of powder cream within the second chamber 614 and/or pouch 615 may vary depending on the desired creamy and/or sweetness flavor. As a way of background, Keurig® brewers for K-Cups® generally takes about 30 to about 35 seconds for hot water to pass through the K-Cup® for about an 8 oz cup of beverage. The powder cream may be formulated and the amount of powder cream within the second chamber 614 and/or pouch 615 may be such that the powder cream substantially dissolves less than about 25 seconds for an 8 oz cup of beverage so that the bottom needle may be rinsed or purged with the remaining 5 to 10 seconds with hot beverage. This allows the bottom needle to be substantially kept clean so that in the next brew cycle, the beverage may have minimal powder creamy residue.

Figure 14:
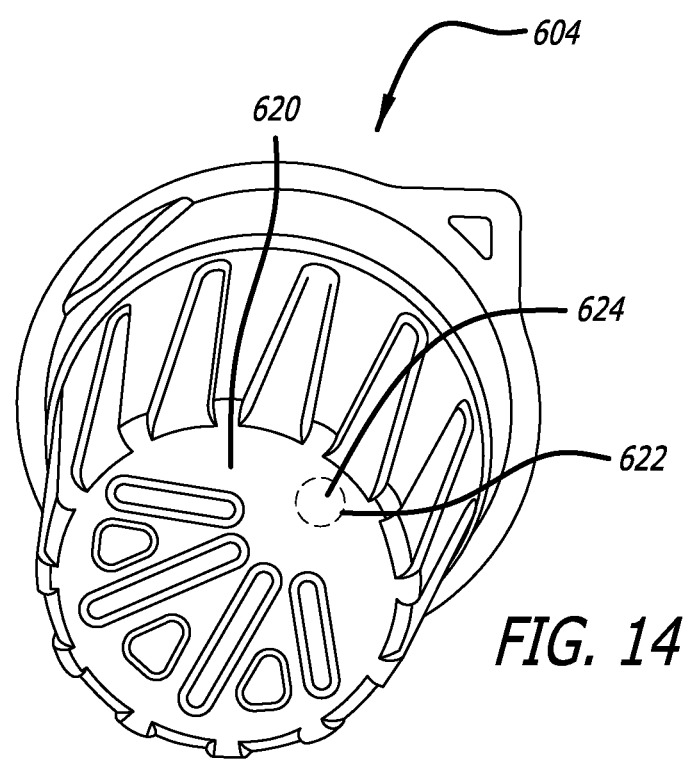
FIG. 14 shows a perspective view of another cup.

FIG. 14 shows the bottom 620 of the cup 604 having a circular line of weakness 622. The cup 604 may be made from a recyclable material, which may be harder than the non-recyclable material. With the harder material, it may take more downward force to have the bottom needle pierce through the bottom 620 of the cup 604 near the target area 624, which may dull the tip of the needle. The line of weakness 622 may circle the target area 624 to minimize the force it takes to pierce through the target area 624. Alternatively, a hole may be formed on the target area and the hole may be sealed with an aluminum foil so that the bottom needle may pierce through the aluminum foil with nominal force.

Figure 15A:
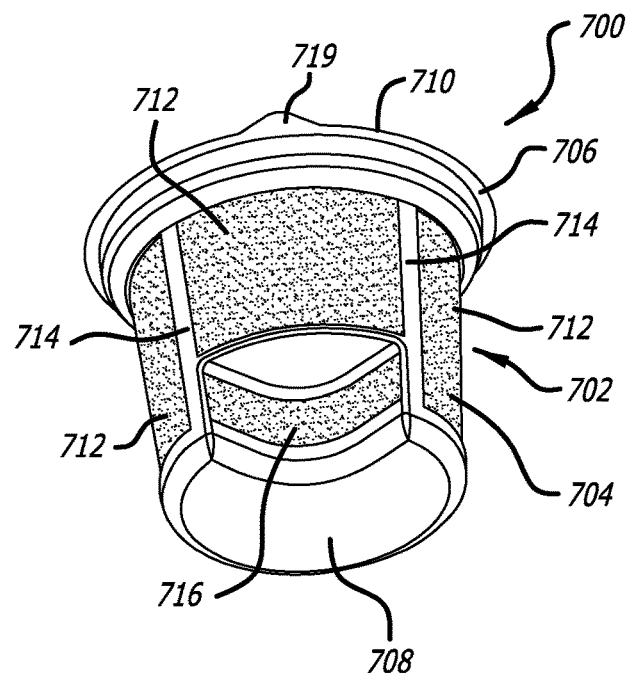
FIG. 15A shows a perspective view of still another cartridge system.

FIG. 15A shows a perspective view of a cartridge system 700 including a cup 702 with a side wall 704 between a rim 706 and a bottom 708. The system 700 may include a lid 710 to cover the rim 706 to hold the beverage medium within the cup 702. The side wall 704 may be integrated with filter elements 712 between ribs 714. The ribs 714 may substantially extend between the rim 706 and the bottom 708. The bottom 708 may be a solid base or integrated with filter element as well. The cup 702 may have a recess 716 formed along the bottom 708 and the side wall 702 adapted to receive the bottom needle when the cup 702 is inserted into the cup holder 116 such that the bottom needle does not pierce the cup 702. The lid 710 may have a ledge 719 to indicate the proper orientation of the cartridge system 700 so that the cartridge system 700 may be inserted in the proper orientation within the holder 116 such that the bottom needle is within the recess 716 of the cup 702.

Figure 15B:
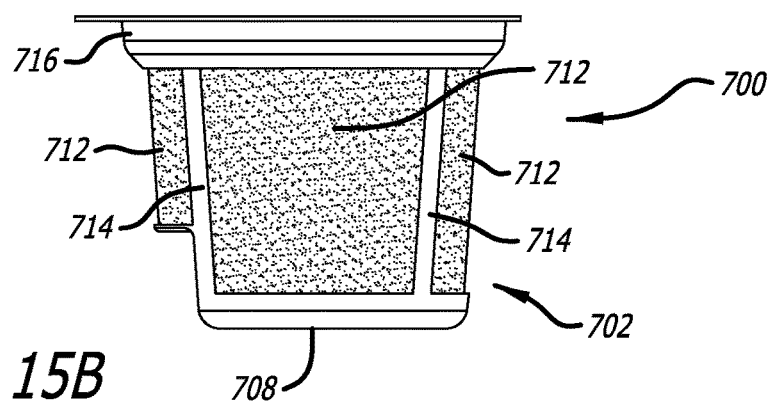
FIG. 15B shows a side view of the cartridge system of FIG. 15A.

FIG. 15B shows a side view of the cartridge system 700 with the filter elements 712 integrated between the ribs 714. The cup 702 may be sized to substantially fill the well 117 of the cup holder 116 to maximize the amount of coffee grind the cup 702 can hold. The ribs 714, rim 706, and the bottom 708 may be made from a plastic material, and the filter may be made from a mesh with sufficient pores to allow the beverage to pass therethrough while keeping the beverage medium therein.

Figure 15C:
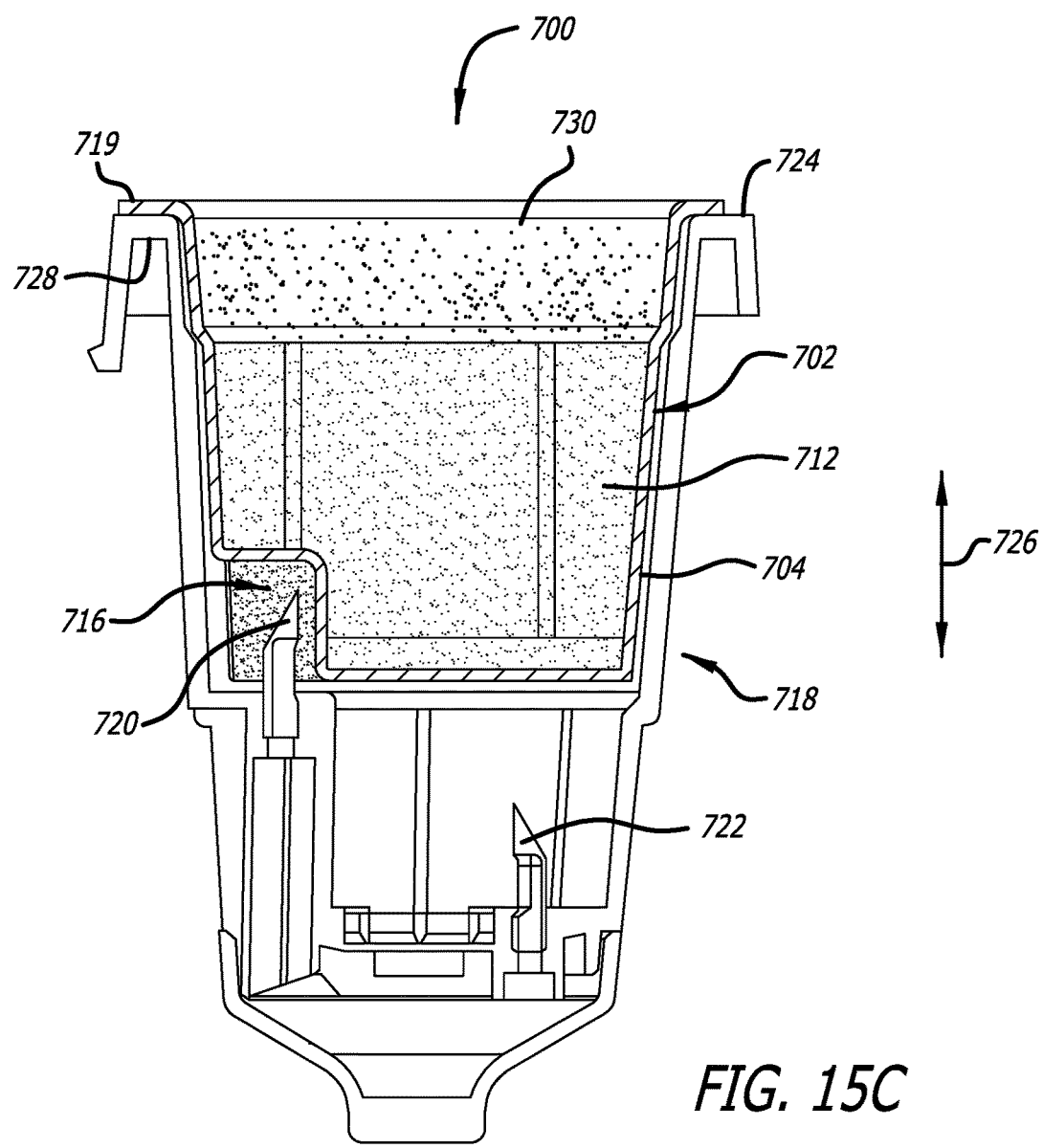
FIG. 15C shows a cross-sectional view of the cartridge system inserted into a holder.

FIG. 15C shows a cross-sectional view of the cartridge system 700 within a cup holder 718. The cup holder 718 may have a first outlet needle 720 and a second outlet needle 722. The first outlet needle 720 may be located between a lip 724 of the holder 718 and the second outlet needle 722 along a longitudinal axis 726 of the holder 718. The lip 724 may also have an pointer mark 728 to orient the cartridge system 700 in the direction where the ledge 719 faces the pointer mark 728 such that when the cartridge system 700 is inserted into the cup holder 718, the first outlet needle 720 is within the recess 716 of the cup 702. With the filter element 712 integrated within the side wall 704, the space within the cup 702 may be enlarged to hold more of the beverage medium 730.

Figure 16:
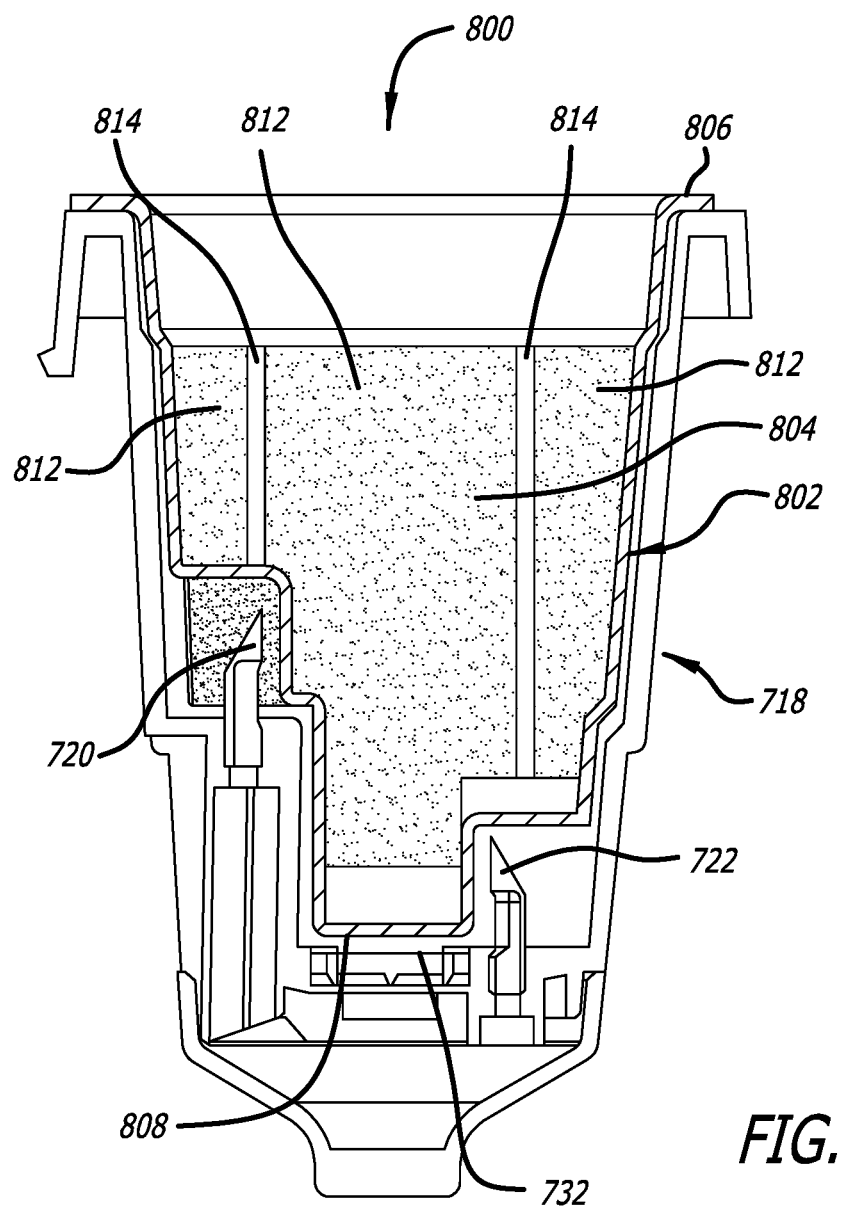
FIG. 16 shows a cross-sectional view of another cartridge system inserted into a holder.

FIG. 16 shows a cross-sectional view of the cartridge system 800 within the cup holder 718. The cartridge system 800 includes a cup 802 with a side wall 804 between a rim 806 and a bottom 808. The cup 802 may be longer relative to the cup 702 such that the bottom 808 of the cup may be adjacent to the base 732 of the cup holder 718. The side wall 804 may be integrated with filter elements 812 between ribs 814. The cup 802 may be configured to not interfere with the first and second outlet needles 720 and 722. With the cup 802 being taller than the cup 702, the cup 802 may hold more beverage medium such as coffee grind. In particular, the median coffee grind size in the cartridge system 800 may be larger than the median coffee grind size used in the cup 702 or in K-Cup® by about 10% to about 30% to minimize the resistance to flow of hot water flowing from top to bottom.

Figure 17:
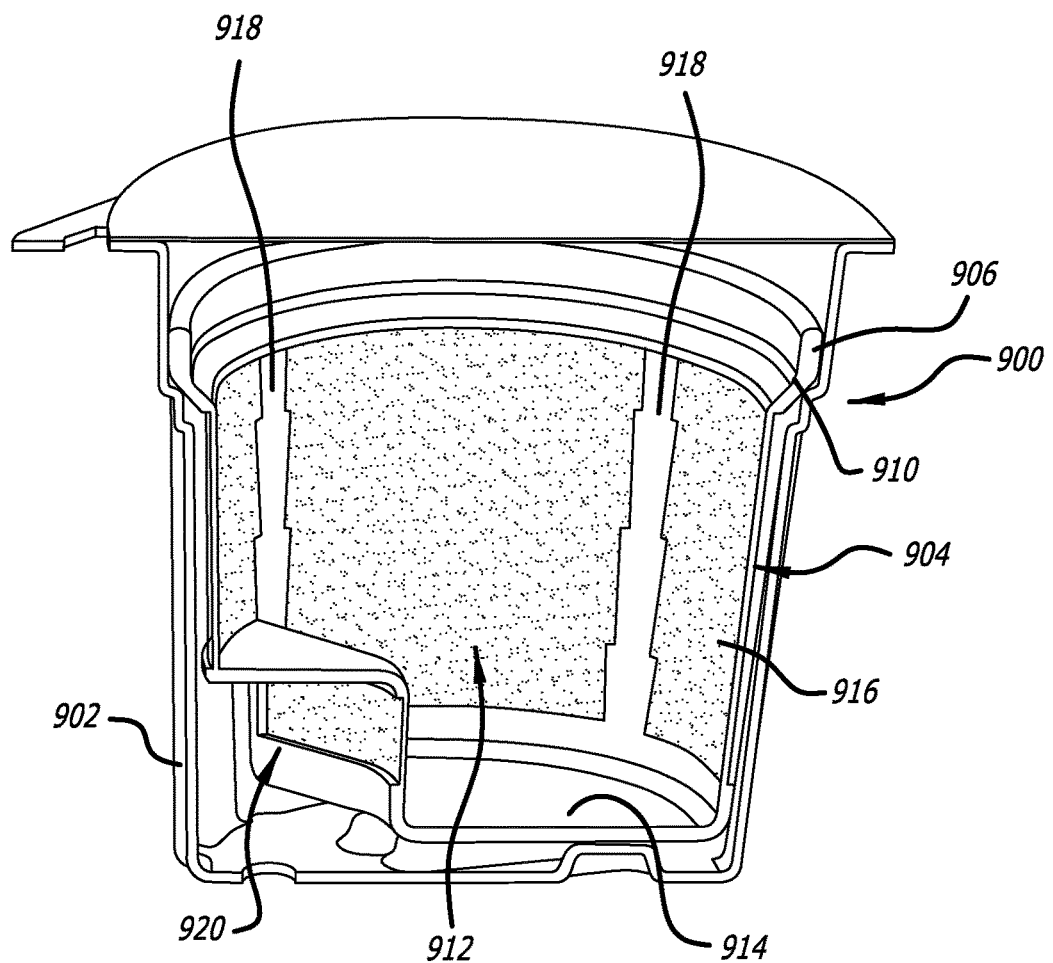
FIG. 17 is a perspective cross-sectional view of still another cartridge system.

FIG. 17 shows a perspective cross-sectional view of a cartridge system 900. The cartridge system 900 includes a cup 902 adapted to receive a filter 904. The filter 904 may have a rim 906 sized to press fit into an inner ledge 910 of the cup 902. The filter 904 may have a side wall 912 between the rim 906 and a bottom 914. The filter 904 may be integrated with filter elements 916 between ribs 918. The filter 904 may have a recess 920 formed along the bottom 914 and the side wall 912 adapted to receive the bottom needle when the cup 902 is inserted into the cup holder 718 such that the bottom needle does not pierce the cup 902.

Figure 18A:
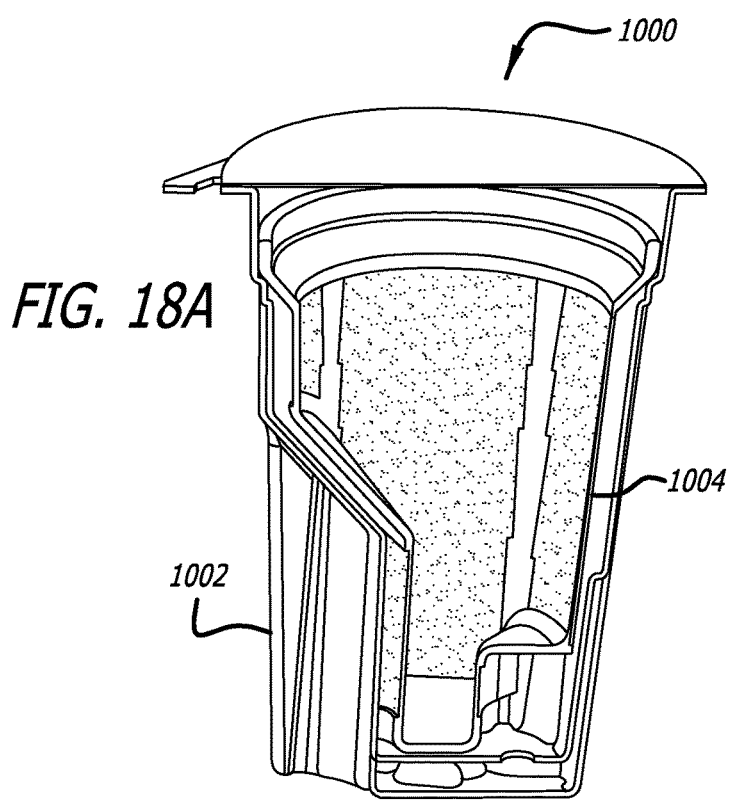
FIG. 18A is a cross-sectional view of still another cartridge system inserted into a holder.

FIG. 18A shows a perspective cross-sectional view of a cartridge system 1000. The cartridge system 1000 includes a cup 1002 adapted to receive a filter 1004. The cartridge system 1000 may be taller than the cartridge system 900 such that the cup 1002 and filter 1004 are longer than the cup 902 and filter 904 adapted to hold more beverage medium such as coffee grind. The filter 1004 may be configured to not interfere with the second outlet needle 722.

Figure 18B:
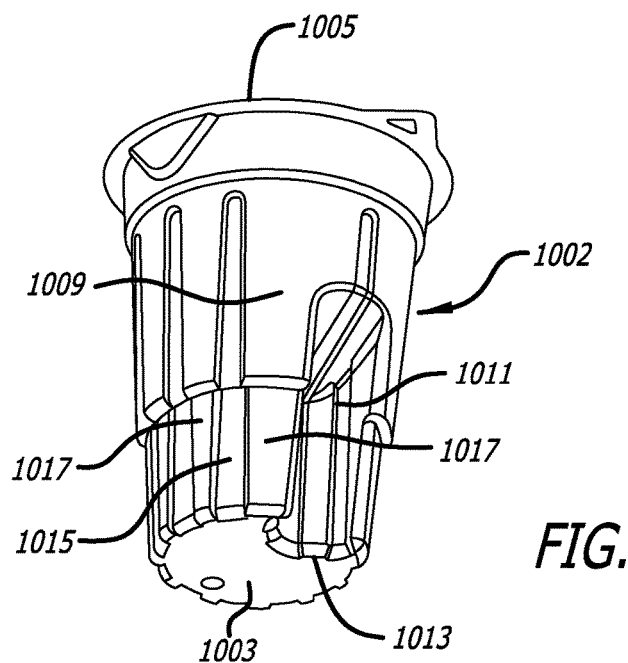
FIG. 18B is a perspective view of an outer tall cup.

FIG. 18B shows an outer configuration of the cup 1002 adapted to fit inside the cup holder 718. The cup may have a base 1003 and a lip 1005, and a side wall 1009 between the lip and the base. The side wall 1009 may have a cavity 1011 along the longitudinal axis of the cup 1002 forming a substantial recess 1013 on the base 1003. The size of the recess 1013 may be substantially greater than the size of the cavities 1015 formed between two adjacent ribs 1017. The cavity 1011 may be adapted to receive the first outlet needle 720 such that the needle 720 does not pierce the cup. However, it is within the scope of the invention to have both the first and second outlet needles pierce the cup. Conversely, it is within the scope of the invention to not have the first and second outlet needles pierce the cup such as when a mesh cup is used.

Figure 1A:
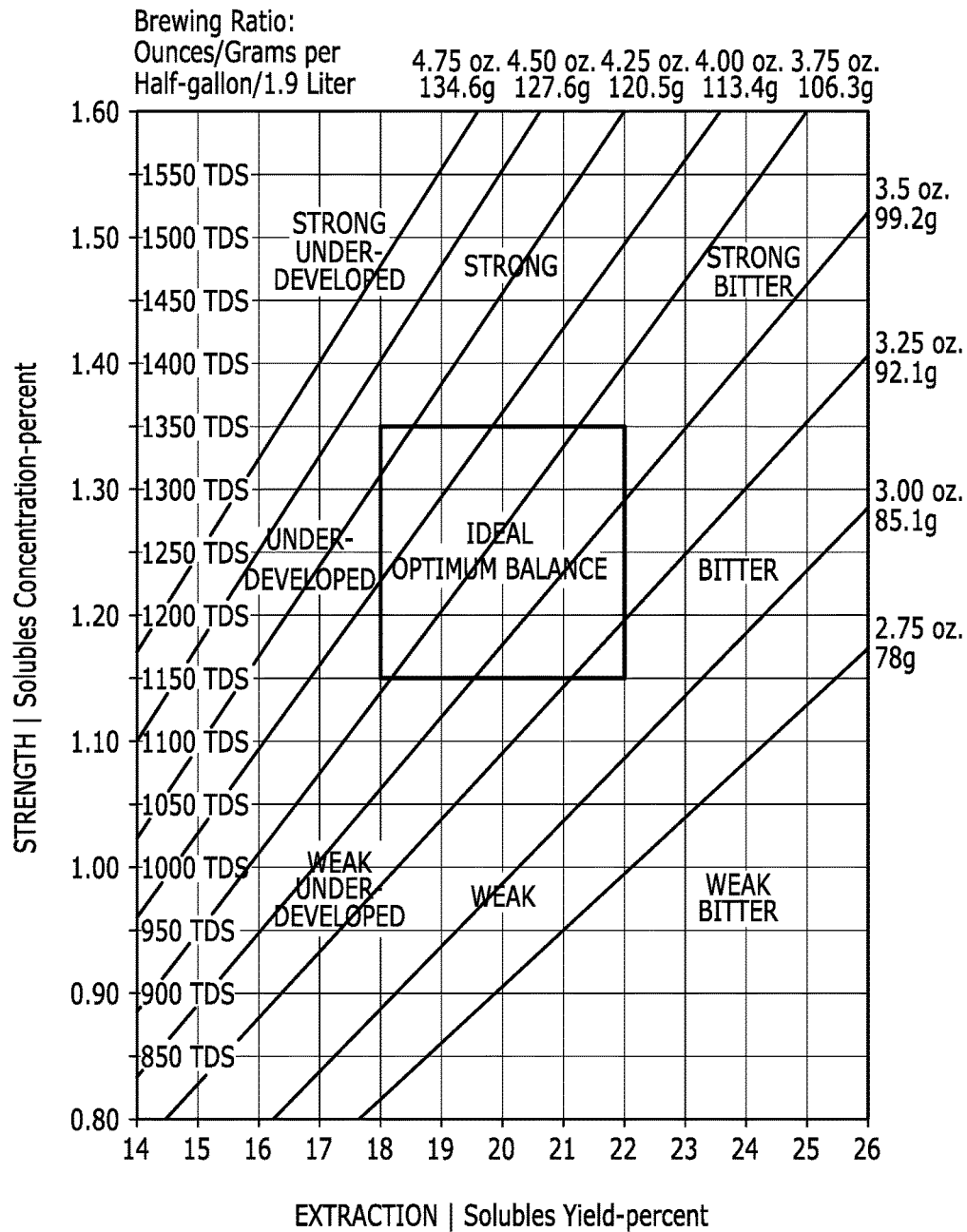
FIG. 1A shows a prior art graph illustrating strength and extraction relationship of coffee.
Figure 19A:
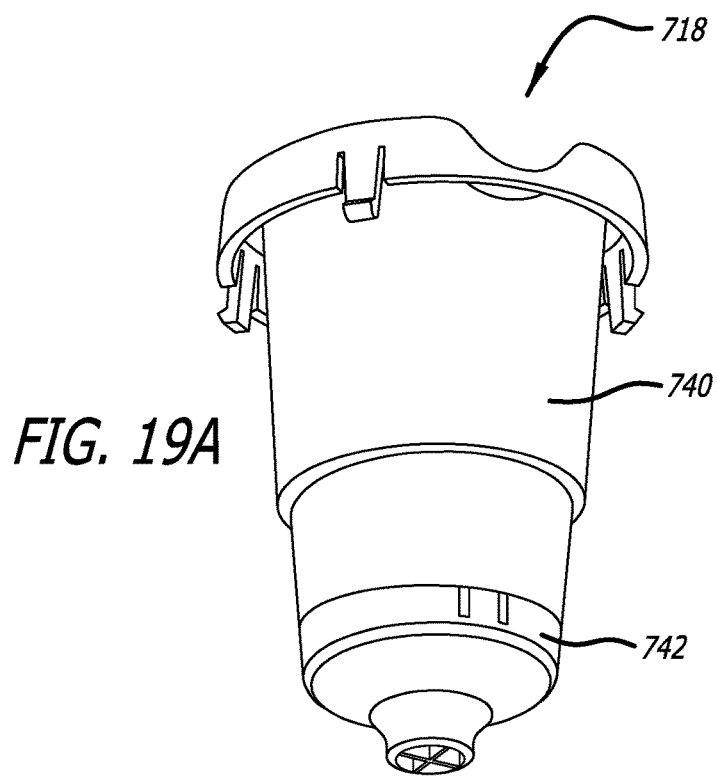
FIG. 19A is a perspective view of an interchangeable holder.
Figure 19B:
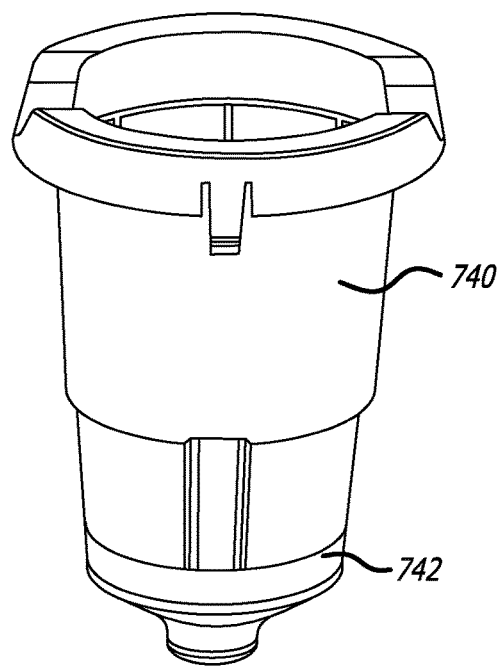
FIG. 19B is another perspective view of the interchangeable holder of FIG. 19A.
Figure 19C:
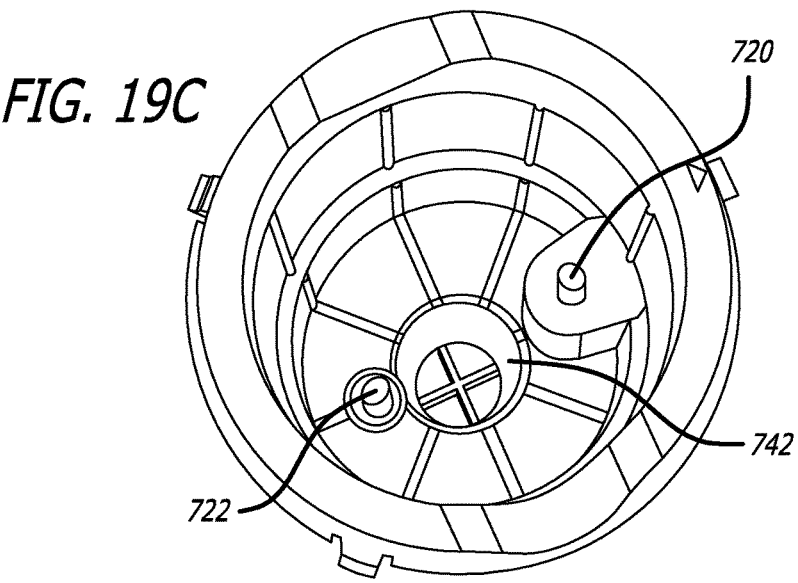
FIG. 19C is another perspective view of the interchangeable holder of FIG. 19A.
Figure 19D:
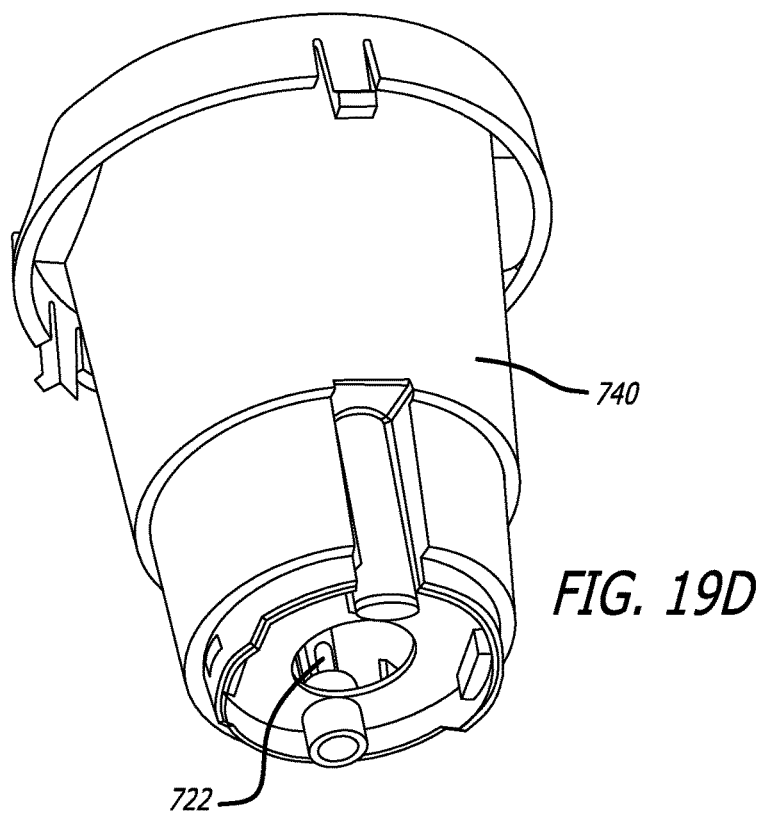
FIG. 19D is another perspective view of the interchangeable holder of FIG. 19A with the bottom funnel removed.

FIGS. 19A-19C show a various perspective views of the cup holder 718 having the first and second outlet needles. The cup holder 718 may have a main body 740 and a funnel 742 releasably coupled to the main body 740. FIG. 19D shows a perspective view of the main body 740 without the funnel. The outer shape of the cup holder 718 may be substantially similar to the cup holder 23 provided with Keurig® brewers, as discussed above in reference to FIG. 1B, such that the cup holders 718 and 23 may be interchangeable without interfering with the closing and opening actuation of the lid 22 and receptacle 20 of the brewer 10. This allows some 12 million U.S. households with a Keurig's® brewer to be compatible with K-Cups® and cartridge systems 100, 300, 400, 500, 600, 700, 800, 900, and 1000, as discussed above. This would allow the Keurig® brewers to brew not only small cup of coffee but a larger and stronger cup of coffee with the taller cartridge systems 300, 800, and 1000. In addition, coffee mixed with cream and/or sweetener may be brewed in one-step with the cartridge systems 400, 500, and 600. Note that it is within the scope of the invention to interchange the various filters disclosed in this application to have coffee and creamer integrated into one cartridge system.

The following methods may be utilized to replace the cup holder 23 provided with Keurig® brewers with the cup holder 718. The method may include: providing an interchangeable cup holder with a first needle and a second needle, the interchangeable cup holder having a lip and a base, the first needle located between the lip and the second needle, and the interchangeable cup holder having an outer configuration that is substantially similar to the outer configuration of the cup holder provided with a Keurig® brewer; providing an instruction to remove the cup holder provided with the Keurig® brewer; and providing an instruction to insert the interchangeable cup holder into the Keurig® brewer.

A method of replacing the cup holder provided with a Keurig® brewer may include: providing an interchangeable cup holder with a first needle and a second needle, the interchangeable cup holder having a lip and a base, the first needle located between the lip and the second needle, and the interchangeable cup holder having an outer configuration that is substantially similar to the outer configuration of the cup holder provided with a Keurig® brewer; and providing an instruction to replace the cup holder provided with the Keurig® brewer with the interchangeable cup holder.

Another method of replacing the cup holder provided with a Keurig® brewer may include: providing an interchangeable cup holder with a first needle and a second needle, the interchangeable cup holder having a lip and a base, the first needle located between the lip and the second needle, and the interchangeable cup holder having an outer configuration that is substantially similar to the outer configuration of the cup holder provided with a Keurig® brewer; removing the cup holder provided with the Keurig® brewer; and inserting the interchangeable cup holder into the Keurig® brewer.

Another method of replacing the cup holder provided with a Keurig® brewer may include: providing an interchangeable cup holder with a first needle and a second needle, the interchangeable cup holder having a lip and a base, the first needle located between the lip and the second needle, and the interchangeable cup holder having an outer configuration that is substantially similar to the outer configuration of the cup holder provided with a Keurig® brewer; and replacing the cup holder provided with the Keurig® brewer with the interchangeable cup holder.

A method of exchanging the cup holder provided with a Keurig® brewer with an interchangeable cup holder may include: stocking a plurality of interchangeable cup holders, each of the interchangeable cup holder having a first needle and a second needle, each of the interchangeable cup holder having a lip and a base, the first needle located between the lip and the second needle, and each of the interchangeable cup holder having an outer configuration that is substantially similar to the outer configuration of the cup holder provided with a Keurig® brewer; offering to exchange the cup holder provided with the Keurig® brewer with the interchangeable cup holder; and shipping the interchangeable cup holder to a Keurig® brewer owner when the owner requests the exchange.

A method of providing an interchangeable cup holder may include: providing an interchangeable cup holder with a first needle and a second needle, the interchangeable cup holder having a lip and a base, the first needle located between the lip and the second needle, and the interchangeable cup holder having an outer configuration that is substantially similar to the outer configuration of the cup holder provided with a Keurig® brewer; packing a plurality of cartridge systems into a container, each of the cartridge system having a cup with a rim and a bottom, the second needle adapted to pierce the bottom of the cup when the cup is inserted into the interchangeable cup holder; and inserting the interchangeable cup holder into the container.

Figure 20:
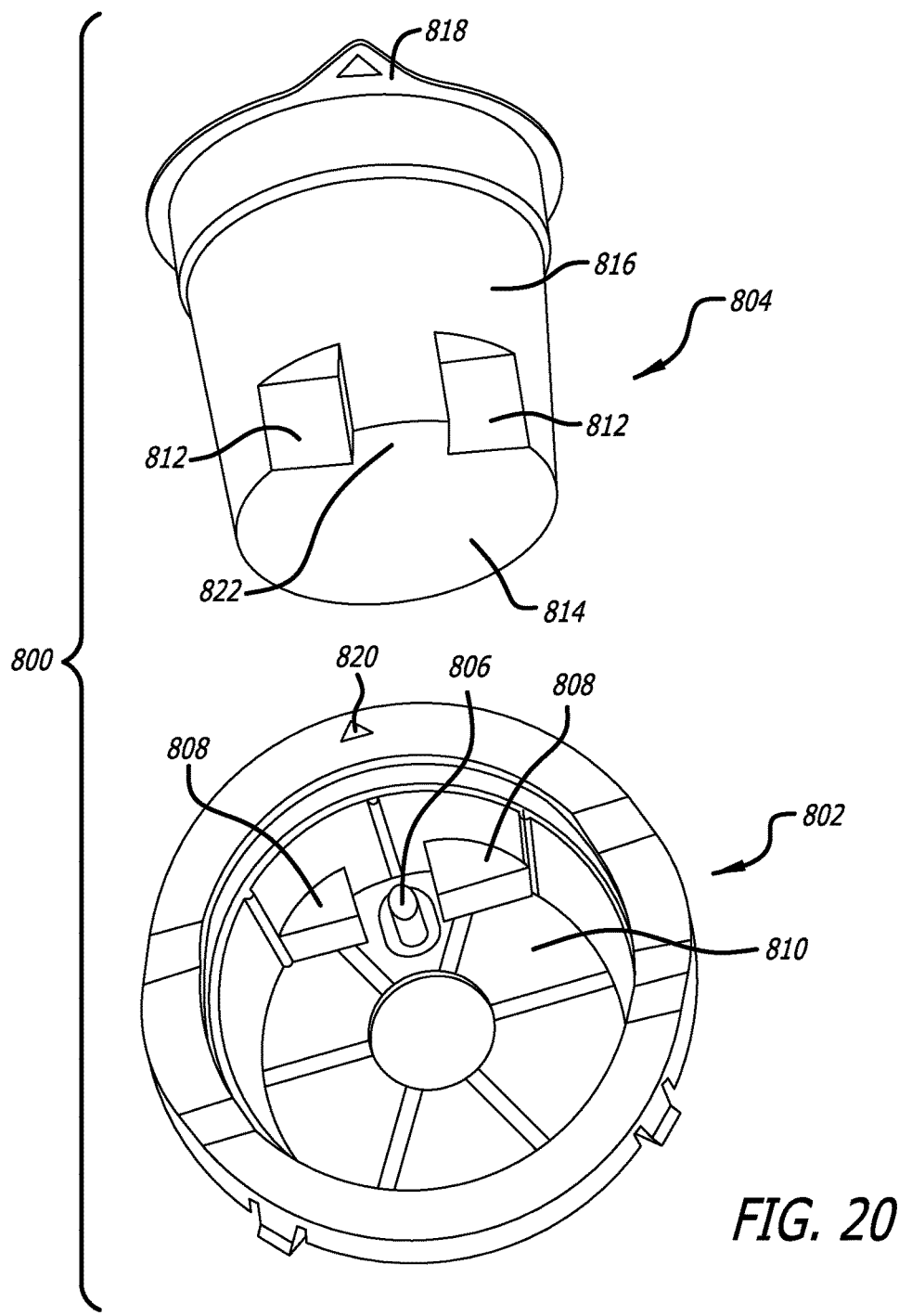
FIG. 20 is a perspective view of another brewing system.

FIG. 20 shows a brewing chamber system 800 including a cup holder 802 adapted to receive a cartridge 804. The cup holder 802 may be substantially similar to the holder 23 as discussed above in reference to FIG. 1B provided with a Keurig® brewer with the following difference. The cup holder 802 may have a needle 806 with one or more tabs 808 protruding out from the well 810. The cartridge 804 may have an outer configuration that is substantially similar to an outer configuration of K-Cup® with the following difference. The cartridge 804 may have one or more indentation corners 812 at the juncture between the base 814 and the side wall 816. The cartridge 804 may have a ledge 818 to orient the cartridge 804 so that the cartridge 804 may be inserted into the cup holder 802 with the ledge oriented towards the pointer mark 820 on the cup holder 802.

When the cartridge 804 is inserted into the cup holder 802, the needle 806 may pierce a target area 822 on the base 814, and the indentation corners 812 may receive the tabs 808 to allow the needle 806 to fully pierce through the target area 822. With the brewing chamber system 800, the traditional K-cups® without the corners 812 may not fully fit inside the cup holder 802 due to the tabs 808 substantially blocking the base or bottom of the traditional K-cups® from being fully inserted. With the brewer chamber system 802, the cup holder 802 and the cartridge 804 may function as a lock and key system such that unauthorized cartridges, without the corners 812, may not work with the cup holder 802. Note that it is within the scope of the invention to utilize a variety of other lock and key features such that only authorized cartridges may be fully inserted into a cup holder such as the cup holder 802. For instance, it is within the scope of the invention to have one tab 808, and the tab 808 may be located anywhere in the bottom of the cup holder. In addition, other protrusion element may be provided within the well 810 to function as a lock, and the cartridge 804 may have corresponding indentation adapted to receive the protrusion so that the cartridge may be fully inserted into the well 810 to allow the needle 806 to pierce the target area 822.

With the K-Cup® patents, U.S. Pat. Nos. 5,840,189 and 5,325,765, now expired, many unauthorized alternative cartridge may be introduced to work with Keurig® brewers. In order to prevent the unauthorized generic cartridges from working with the Keurig® brewers, the cup holders provided with the Keurig® brewers already in the market place, such as the holder 23, may be replaced with a cup holder specially configured to work with an authorized cartridge such as the cup holder 802 and the cartridge 804.

Figure 21A:
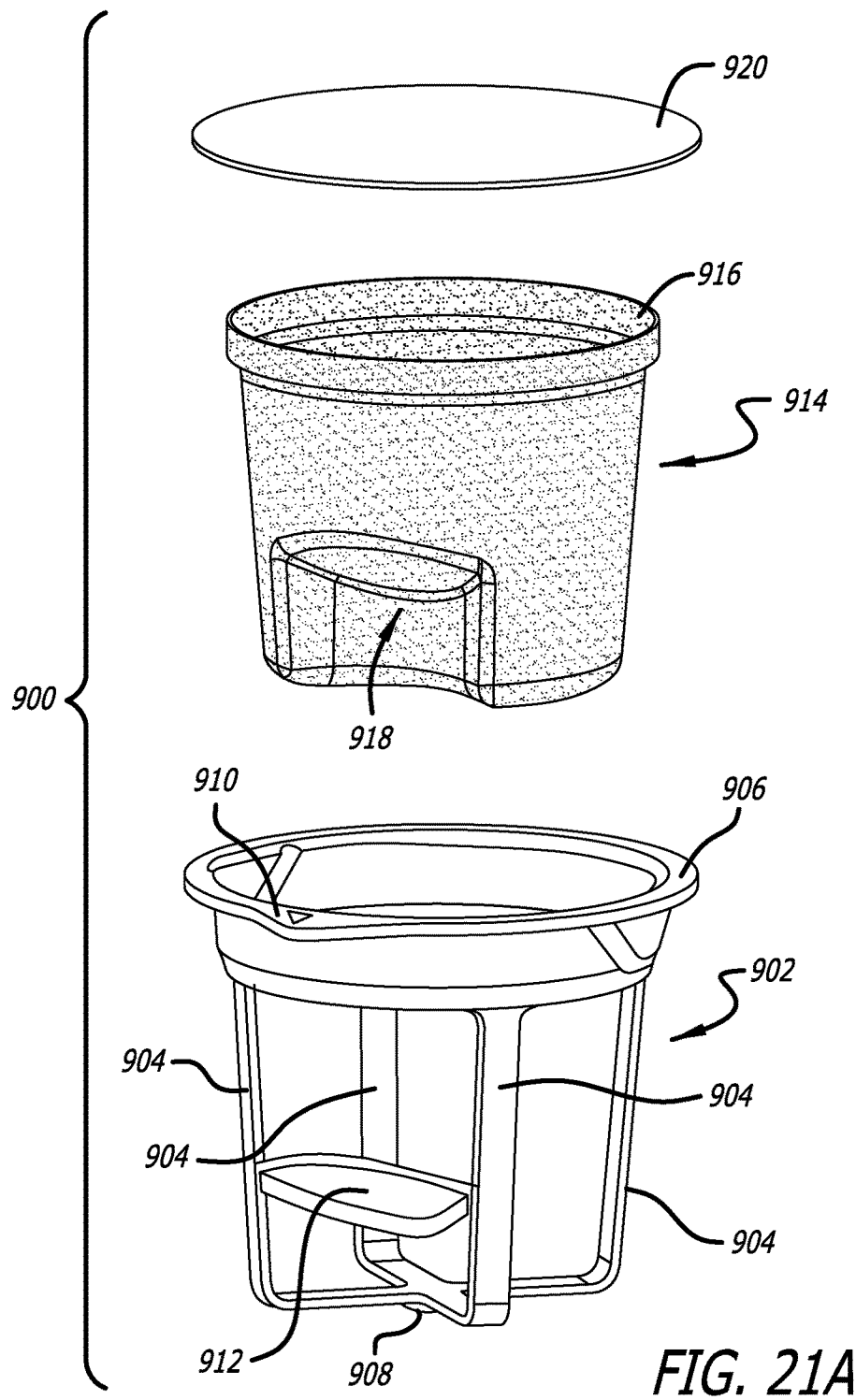
FIG. 21A is an expanded perspective view of still another cartridge system.

FIG. 21A shows an expanded perspective view of a cartridge system 900 including a rib cage 902 with a plurality of ribs 904 extending from a rim 906 and converging at a bottom 908. The rim 906 may have a ledge 910 to orient the cartridge system 900 in the proper direction when inserting the cartridge system 900 into the cup holder 718. The rib cage 902 may have a shield 912 between two adjacent ribs 904 near the ledge 910. The rib cage 902 may be adapted to receive a filter mesh 914 having a rim 916. The filter mesh 914 may be flexible and inserted into the rib cage 902, and the rim 916 of the filter 914 may be coupled or sealed to the rim 906 of the rib cage 902. Once the filter mesh 914 is inserted into the rib cage 904, the filter mesh 914 may conform to the shape of the rib cage 904 such that the filter mesh 914 may form a recess 918 due to the shield 912. The recess area 918 may be adapted to receive the bottom needle when the cartridge system 900 is inserted into the cup holder 718 such that the bottom needle does not pierce the filter mesh 914. The cartridge system 900 may include a lid 920 adapted to seal the rim 906 of the rib cage 904. The cartridge system 900 filled with coffee grind within the filter 914 may be placed inside a pouch and sealed to keep the coffee grind fresh.

Figure 21B:
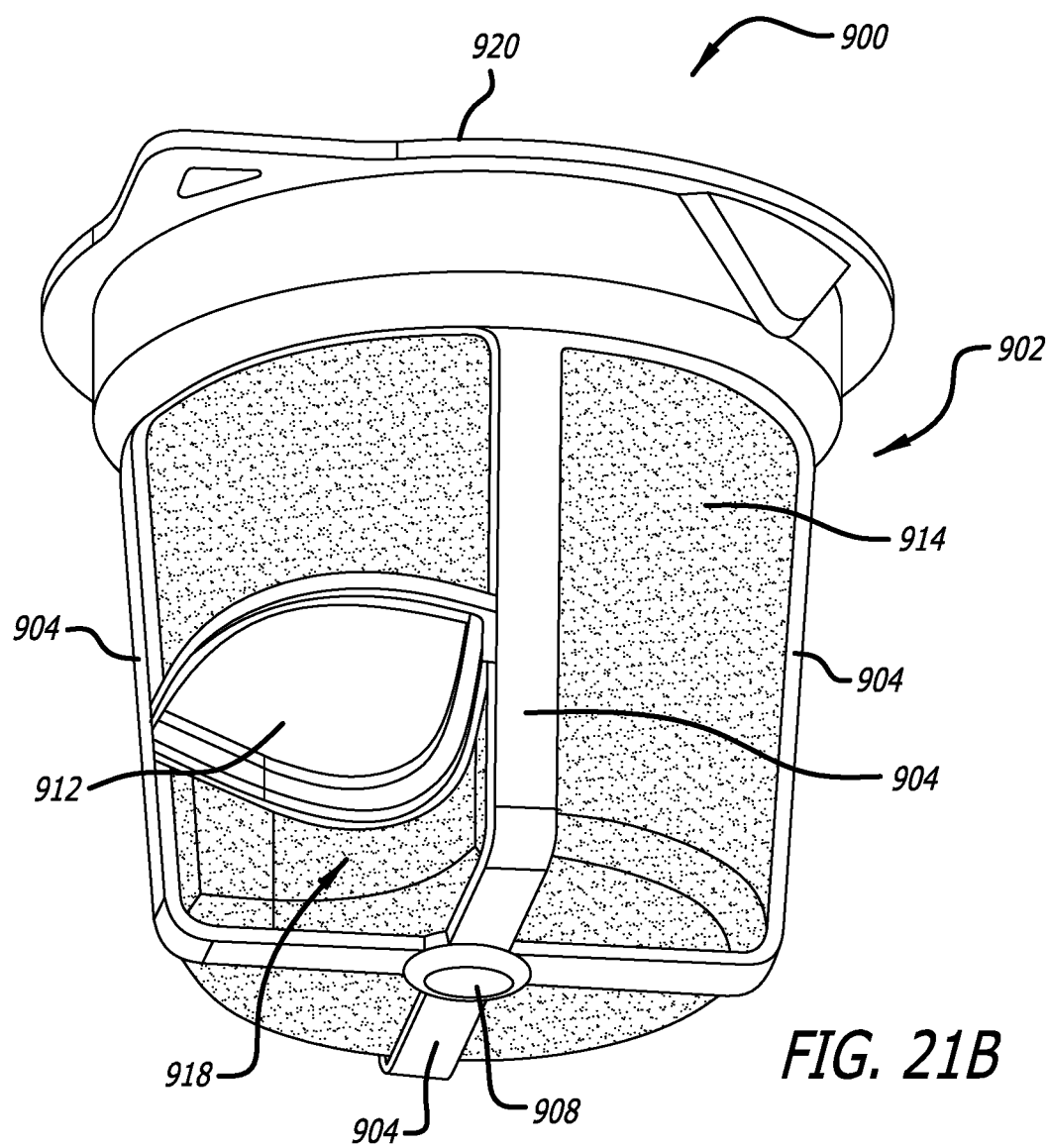
FIG. 21B is an assembled perspective view of the cartridge system of FIG. 21A.

FIG. 21B shows a perspective view of an assembled cartridge system 900 with the filter mesh 914 within the rib cage 902, and the lid 920 enclosing the rim 906 of the rib cage 902 and/or rim 916 of the filter 914. The filter mesh 914 conforms to the shape of the shield 912 to form the recess area 918. The ribs 904 may join at the bottom 908 such that the filter mesh 914 at the bottom may be porous to allow beverage to permeate.

Figure 22A:
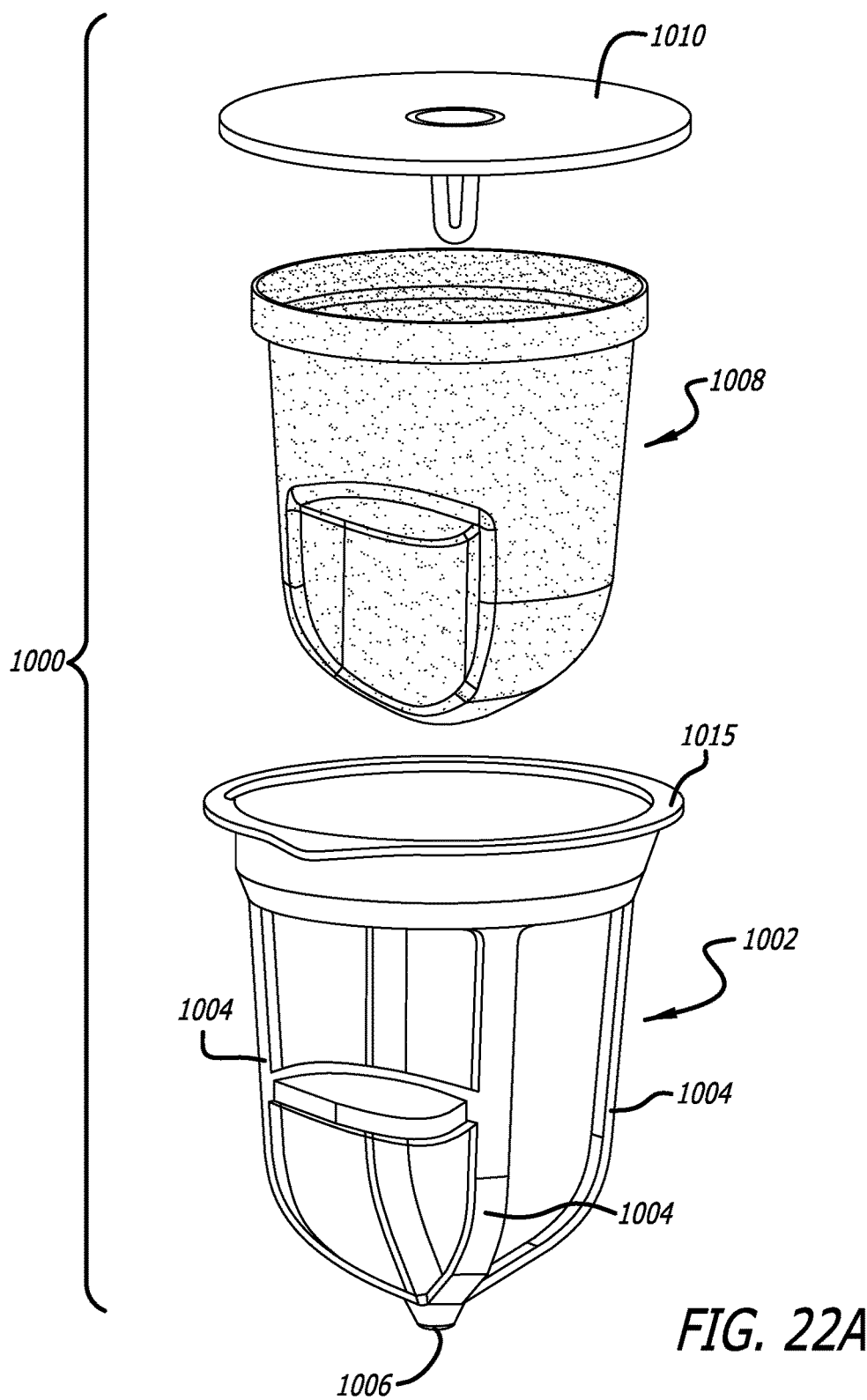
FIG. 22A is an expanded perspective view of still another cartridge system.

FIG. 22A shows an expanded perspective view of a cartridge system 1000 that is similar to the cartridge system 900 described above with the following differences. The cartridge system 1000 includes a rib cage 1002 with a plurality of ribs 1004 adapted to receive the filter mesh 1008. The ribs 1004 may converge at a bottom 1006 forming a nipple like configuration. The rib cage 1002 and the filter mesh 1008 may be longer than the rib cage 902 and the filter 914 so that the filter mesh 1008 may hold more beverage grind. The cartridge system 1000 may have a lid 1010 to seal the rim 1015 of the rib cage 902.

Figure 22B:
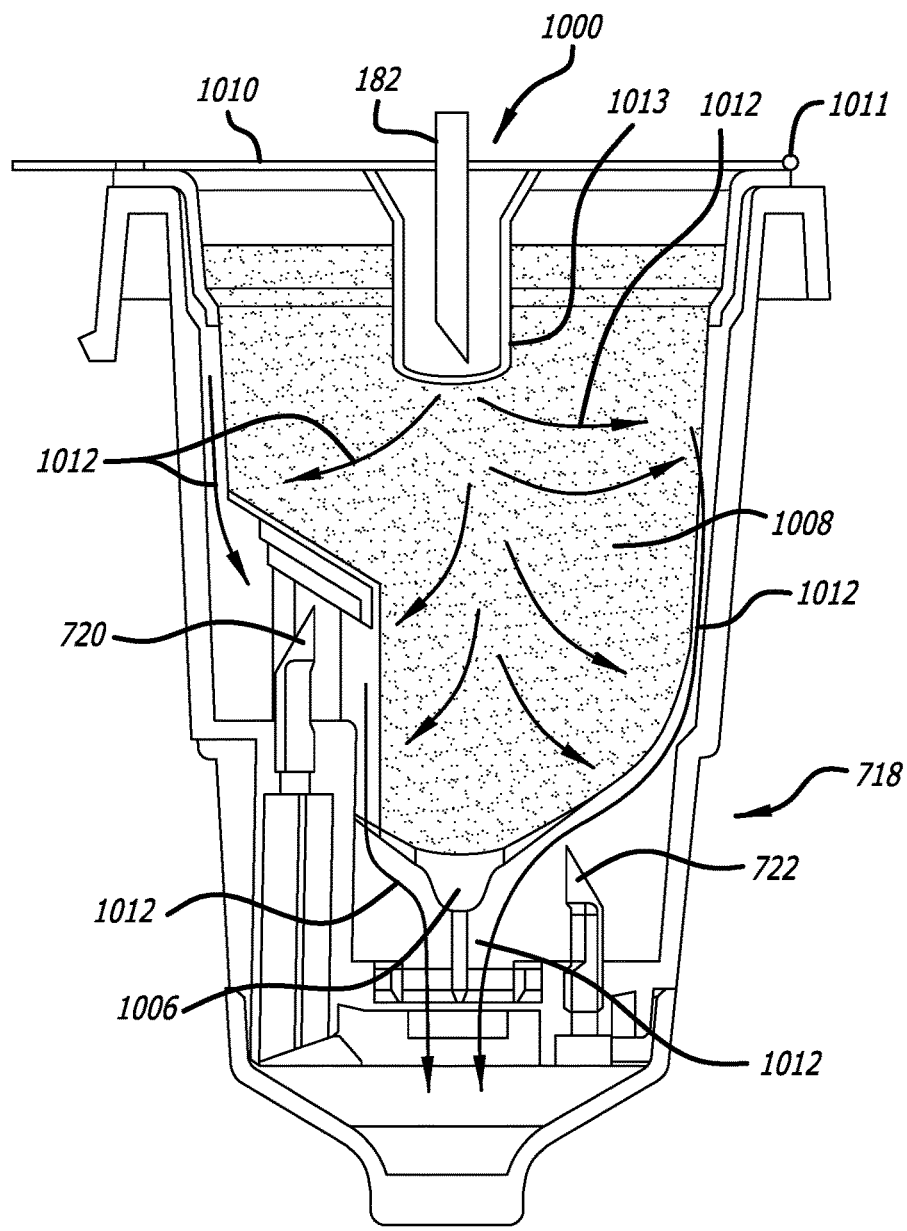
FIG. 22B is a cross-sectional view of the cartridge system of FIG. 22A inserted to a holder.

FIG. 22B shows a cross-sectional view of the cartridge system 1000 within the cup holder 718. The cartridge system 1000 may be configured such that the first and second outlet needles 720 and 722 may not pierce the filter mesh 1008. Hot water injected through the top needle 182 may pass through the beverage grind and pass through the filter mesh 1008 as indicated by direction arrows 1012 and drip down into a cup. The bottom 1006 having a nipple configuration may allow the beverage to flow down smoothly. It is within the scope of this invention for the cartridge system 1000 to be used as a reusable refill cup where the lid 1010 may be pivotably coupled to the rim 1015 at a pivot axis 1011 to allow the lid to open and close. A user may open the lid 1010, fill the cup with its own coffee grind, and close the lid to substantially seal the coffee grind within the cup. The lid 1010 may have a deep cavity 1013 adapted to receive the needle 182 without piercing the lid. The deep cavity 1013 may be porous to allow the heated water from the needle 182 to pass therethrough.

Figure 23:
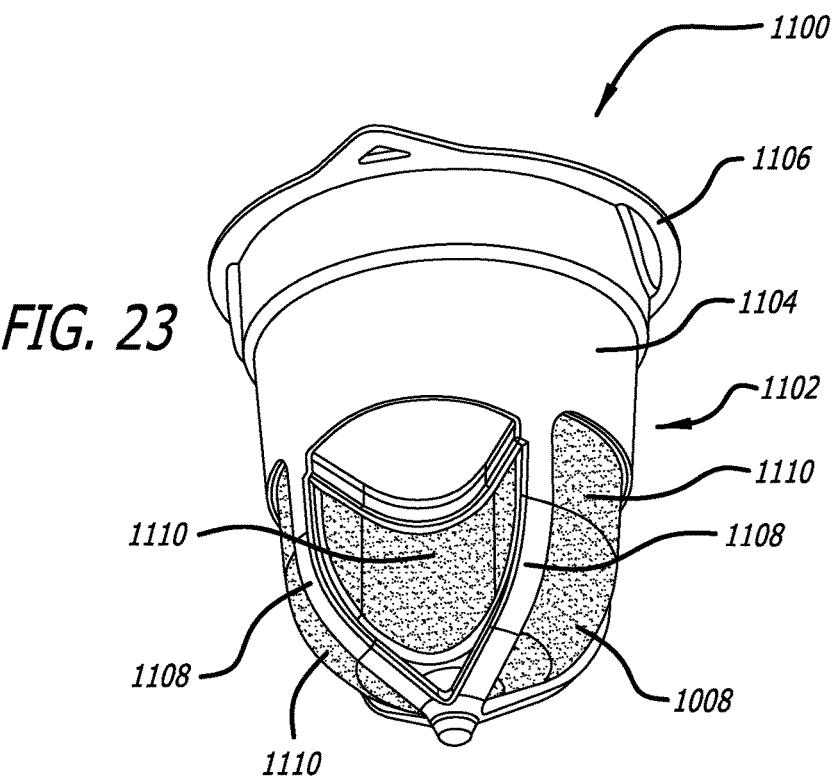
FIG. 23 is an assembled perspective view of another cartridge system.

FIG. 23 shows a perspective view of a cartridge system 1100 that is similar to the cartridge system 1000 described above except that a rib cage 1102 may have a skirt 1104 extending down from a rim 1106, and ribs 1108 extending down from the skirt 1104. The skirt 1104 may substantially prevent beverage from permeating through the top portion of the filter mesh 1008 such that the beverage permeates through the open filter mesh areas 1110. This may allow the beverage grind within the filter mesh 1008 to be more evenly saturated or washed with hot water. Without the skirt 1104, the beverage grind near the bottom portion of the filter mesh 1008 may increase the resistance to flow of liquid such that the beverage grind near the bottom portion may not get sufficient saturation from the hot water injected through the top needle 182. In addition, to allow more even saturation along the longitudinal axis of the filter mesh 1008, the median coffee grind size in the cartridge system 1100 may be larger than the median coffee grind size used in the cup 702 or in K-Cup® by about 10% to about 30% to minimize the resistance to flow of hot water flowing from top to bottom.

Figure 24:
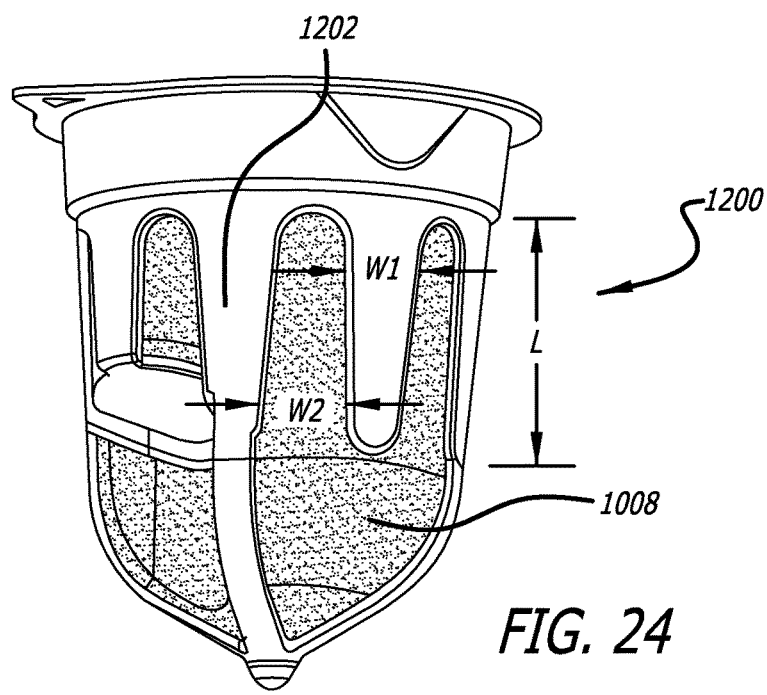
FIG. 24 is an assembled perspective view of yet another cartridge system.
Figure 25A:
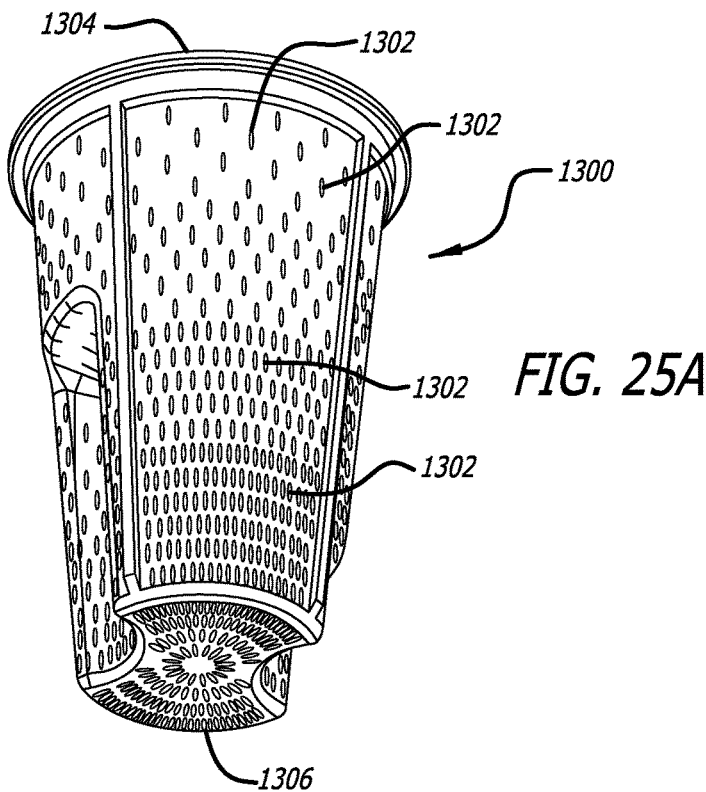
FIG. 25A is a perspective view of another filter.

FIG. 24 shows a perspective view of a cartridge system 1200 having a skirt 1202 with a sinusoidal configuration with length L, a width W1, and a gap between two adjacent waves being W2. The variables L, W1, and W2 may be adjusted to evenly saturate the beverage grind within the filter mesh 1008. The cartridge system 1200 may have a lid FIG. 25A shows an elongated plastic filter 1300 with pours 1302 sized to allow beverage to pass therethrough while containing the beverage grind therewithin. The number of pours or density of pours may increase from the rim 1304 to the bottom 1306 to compensate for the increase in resistance to flow of liquid due the beverage grind formed in an elongated fashion due to the elongated filter 1300.

Figure 25B:
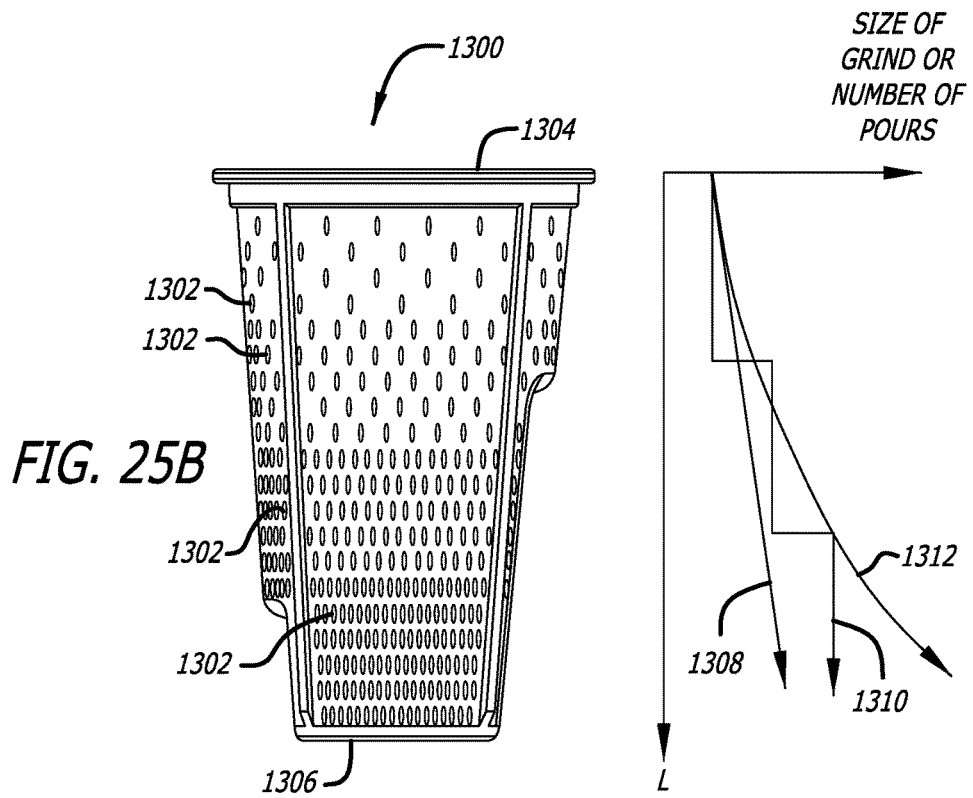
FIG. 25B is a cross-sectional view of the filter of FIG. 25A.

FIG. 25B shows a side view of the plastic filter 1300 with number of pours 1302 varying along the length L from the rim 1304 to the bottom 1306. The graph on the right shows that the density or number of pours 1302 may vary linearly as shown by the graph 1308, in steps as shown by the graph 1310, and non-linearly as shown by the graph 1312. In addition, for elongated filter 1300, the size of the beverage grind within the filter 1300 may vary along the length L as shown in graphs 1308, 1310, and 1312 to compensate for the resistance to flow of liquid deeper into the filter or as L increases. This may allow the hot liquid from the top needle to more evenly saturate the beverage grind in the filter to brew more full body or even taste.

Figure 26A:
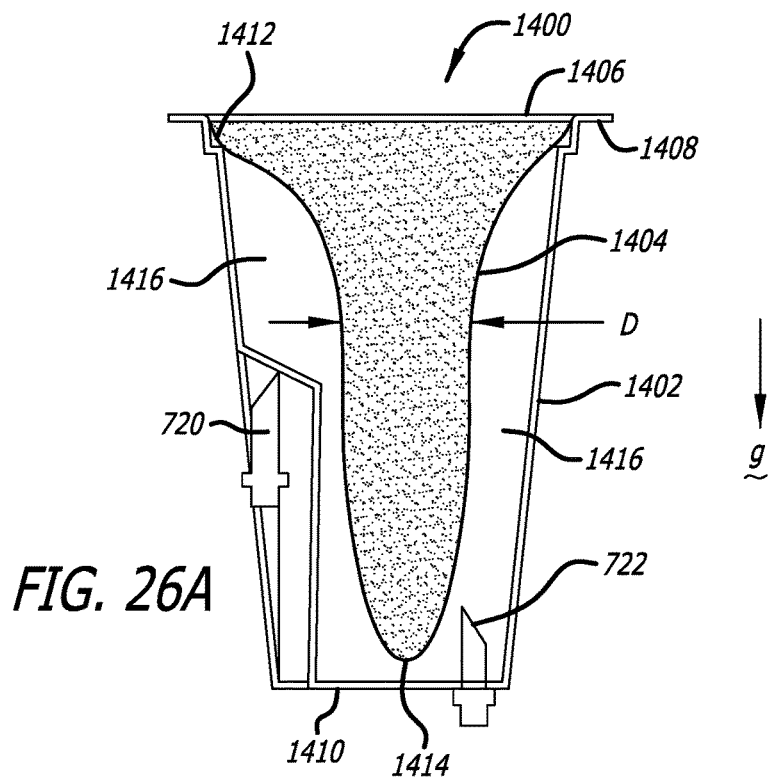
FIG. 26A is a cross-sectional view of still another cartridge system.

FIG. 26 shows a cross-sectional view an elongated cartridge system 1400 adapted to fit inside the cup holder 718. The cartridge system 1400 may include an elongated cup 1402 adapted to house an elongated filter 1404, and a lid 1406 to enclose the rim 1408 of the cup 1402. The cup 1402 may be sized to fit inside the cup holder 718 such that the bottom 1410 of the cup 1402 may be pierced by the second needle 722 when the cartridge system 1400 is inserted into the cup holder 718. By way of background, traditional K-Cups® hold about 10 to 13 grams of coffee grind within the filter. With the traditional K-Cups® being shorter than the elongated cartridge system 1400, the coffee grind in the K-Cups® are held in a short cylindrical fashion. This means that the hot water from the top needle travels a shorter distance from the top to bottom of the coffee grind in the K-Cups® compared to the cartridge system 1400. Put differently, the wash time or contact time between the hot water and the coffee grind is relatively short because the travel distance is short. This may result in a less than full extraction of coffee flavor from the coffee grind.

To increase the wash time between the hot water and the coffee grind, the filter 1404 may be elongated and configured to hold about 10 to 13 grams of coffee grind in an elongated form from the rim 1412 to the bottom 1414 of the filter 1404. This may mean that the diameter D of the filter 1404 may be smaller such that substantial gap 1416 may be formed between the filter 1404 and the cup 1402. With the increase wash time, more flavor may be extracted from the same coffee grind to brew a more flavorful cup of beverage such as coffee. As discussed above in reference to FIG. 25B, the grind size may be varied to provide a more even saturation of the coffee grind within the filter 1404.

Figure 26B:
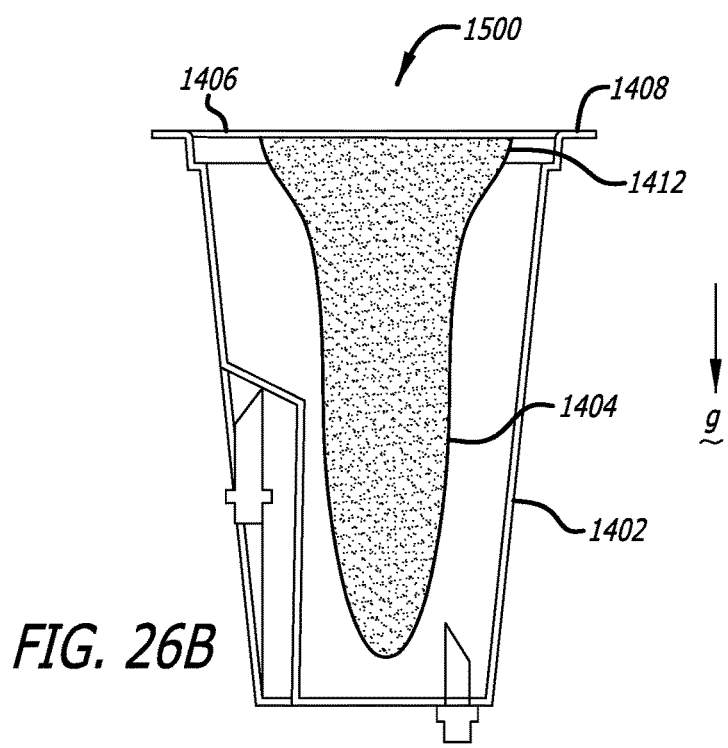
FIG. 26B is a cross-sectional view of yet another cartridge system with an alternative filter design.

FIG. 26B shows a cross-sectional view of an elongated cartridge system 1500 that is similar to the cartridge system 1400 expect that the rim 1412 of the filter 1404 may be coupled to the lid 1406 such that the rim 1412 of the filter 1404 is within the rim 1408 of the cup 1402.

Figure 27:
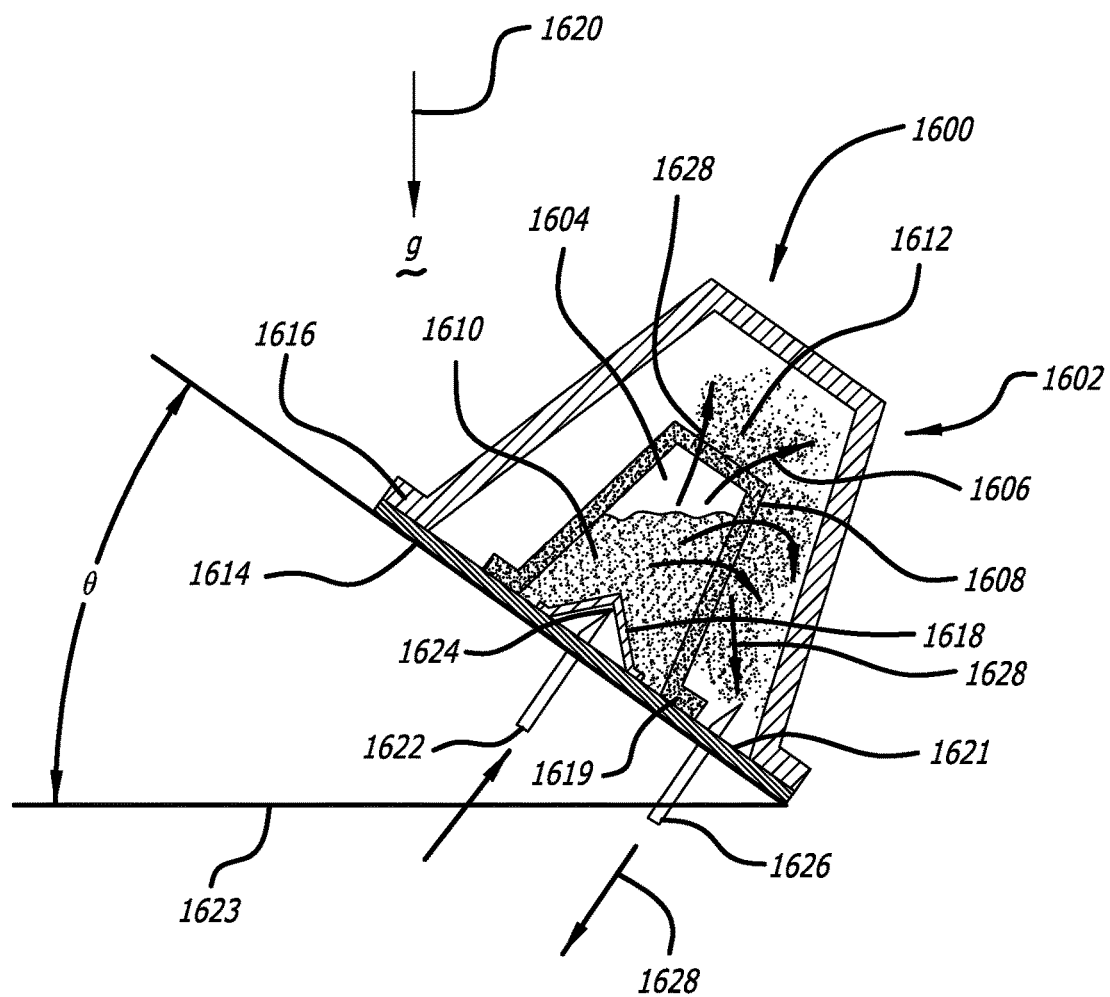
FIG. 27 is a cross-sectional view of still another cartridge system.

FIG. 27 shows a cross-sectional view of a cartridge system 1600 including a cup 1602 divided generally into a first chamber 1604 and a second chamber 1606. The first chamber 1604 may be defined by the space within the filter 1608 adapted to hold a first beverage grind 1610. The second chamber 1606 may be the remaining space within the cup 1602. The second chamber 1606 may hold a second beverage grind 1612. For example, the first beverage grind 1610 may be coffee grind, and the second beverage grind 1612 may be powder creamer and/or sweetener. The cartridge system 1600 may include a lid 1614 adapted to seal around the rim 1616 of the cup 1602. The lid 1614 may also have an inner flow distributor 1618 adapted to expand within the first chamber 1604. A portion of the rim 1619 of the filter 1608 may be sealed to the lid 1614 such that there is a space 1621 between the rim 1619 of the filter 1608 and the rim 1616 of the cup 1602.

The cartridge system 1600 may be adapted to work with a brewer system that orients the cartridge system 1600 in an angle θ from a horizontal plane 1623 where direction arrow 1620 generally indicates the direction of gravity. The brewer system may provide a first needle 1622 adapted to pierce the lid 1614 such that the tip 1624 of the first needle 1622 expands the inner flow distributor 1618 and is guarded by the inner flow distributor 1618 such that the first beverage grind 1610 does not clog the first needle 1622. The brewer system may also provide a second needle 1626 that pierces the lid 1614 at the space 1621 to drain the beverage within the cup 1602. As the first needle 1622 injects hot water into the filter 1608, the extracted beverage may permeate through the filter 1608 and dissolve the second beverage grind 1612, such as powder creamer, and the combination of beverage flavor may exit through the second needle 1626 as indicated by the direction arrows 1628.

Figure 28A:
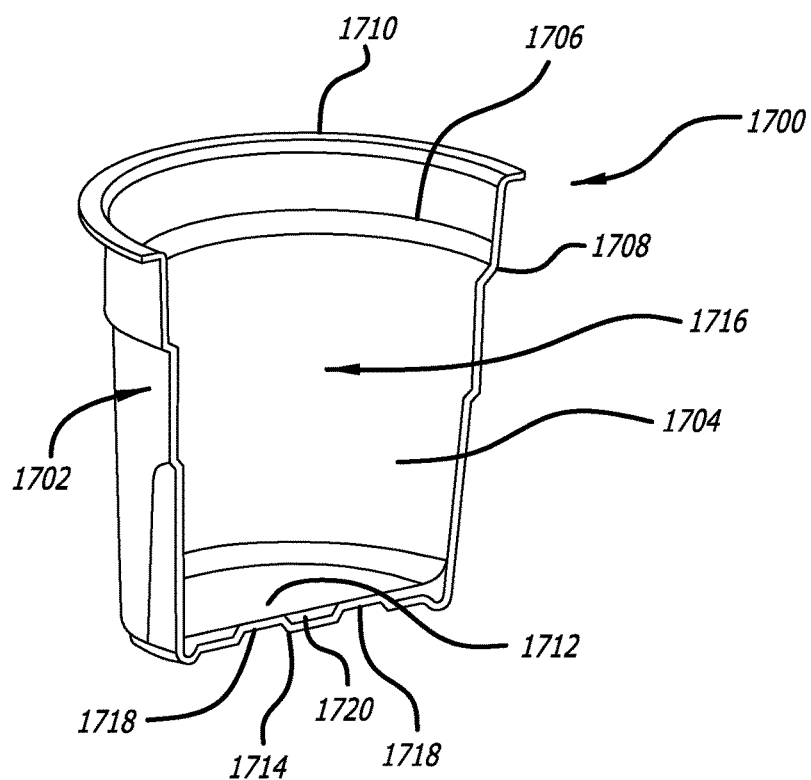
FIG. 28A is a perspective cross-sectional view of another cartridge system.

FIG. 28A shows a perspective cross-sectional view of a cartridge system 1700 including a cup 1702 housing a filter 1704. The rim 1706 of the filter 1704 may be sealed around the inner edge 1708 of the cup located adjacent to the rim 1710 of the cup 1702. The cup 1702 may be sized to have similar dimensions as K-Cup®. The filter 1704 may be configured to substantially fill the interior space of the cup 1702 such that the bottom 1712 of the filter 1704 may be juxtaposed to the basin 1714 of the cup 1702 to substantially maximize the interior space 1716 of the filter 1704. This allows ease in which to pack the cup 1702 with beverage grind and to pack as much as possible the beverage grind therein. The basin 1714 of the cup 1702 may have one or more ribs 1718 to provide a passageway 1720 between the ribs for the beverage permeating out of the filter 1704 to flow therethrough. Note that it is within the scope of this invention to have a certain portion of the bottom 1712 of the filter 1704 be in contact with the basin 1714 of the cup. Alternatively, a gap may be formed between the bottom 1712 of the filter 1704 and throughout the basin 1724 such no bottom portion 1712 of the filter 1704 is in contact with the basin 1714.

Figure 28B:
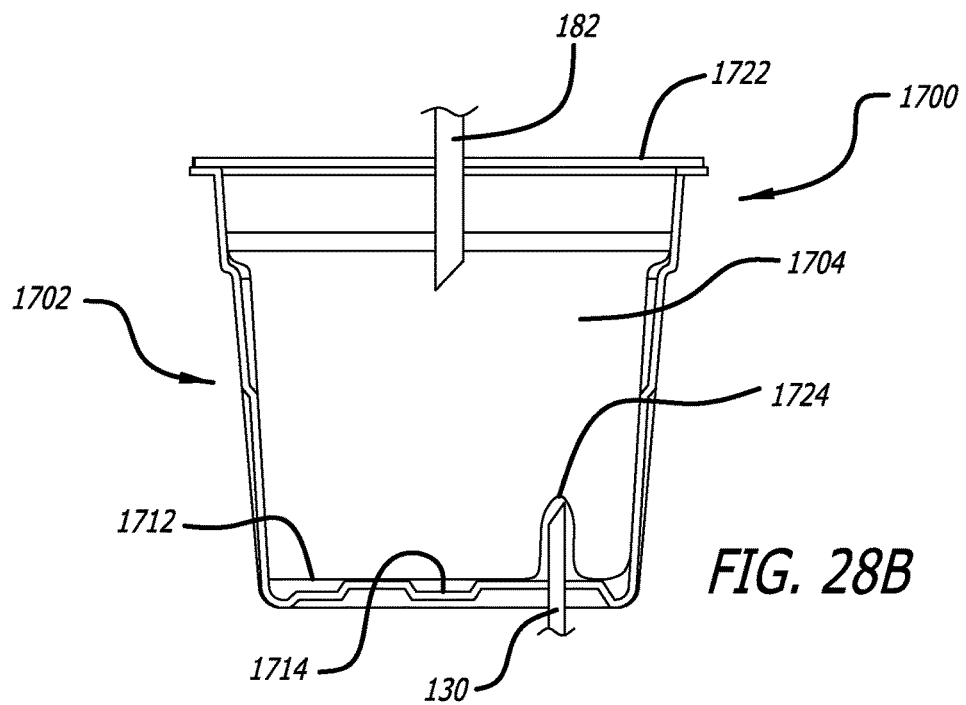
FIG. 28B is a cross-sectional view of the cartridge system of FIG. 28A.

FIG. 28B shows a side cross-sectional view of the cartridge system 1700 with the top needle 182 piercing through a top cover 1722, and the bottom needle 130 piercing through the basin 1714. The bottom 1712 of the filter 1704 may be juxtaposed to the basin 1714 such that when the bottom needle 130 piercing through the basin 1714, the bottom needle 130 may push the bottom 1712 of the filter 1704 up, as indicated by a raised portion 1724, without piercing through the raised portion of the filter 1704 at a point of contact 1724 as shown in FIG. 28B.

The filter 1704 may be formed from a material that is substantially resistance to piercing by the bottom needle 130 while allowing the beverage liquid to permeate therethrough during the brewing process. The pressure within the cartridge may increase substantially during the brewing process for the following reasons: (1) as heated water is injected into the cartridge through the top needle, the beverage grind generally expands as the grind absorb heated water; (2) the heated water fills the spaces within the cartridge, thus exerting outer pressure; and (3) the heat from the hot water increases the pressure within the cup. These factors apply pressure on the filter to expand during the brewing process such that a filter made of a weak material like the paper filter used in a K-Cup® may tear when pressed against a sharp object like the bottom needle. This would result in the beverage grind being poured into a mug, which is undesirable. As such, the filter according to this invention may be made from a cotton fabric material such as muslin cotton, synthetic material such as nylon, or paper material engineered to be resistant to piercing or tearing yet allowing the beverage liquid to permeate therethrough. Note that it is within the scope of the invention to use a variety of filter material that is known to one skilled in the art that is substantially resistant to piercing by the bottom needle 130 due to the pressure applied to the filter due to the bottom needle piercing through the cup and during the brewing process. With regard to the cartridge system 1700, the gap between the bottom 1712 of the filter 1704 and the basin 1714 may be generally described as a space in which the bottom needle 130 may make contact with the bottom 1712 of the filter 1704 after the bottom needle 130 has been fully inserted into the bottom of the cup.

Figure 29:
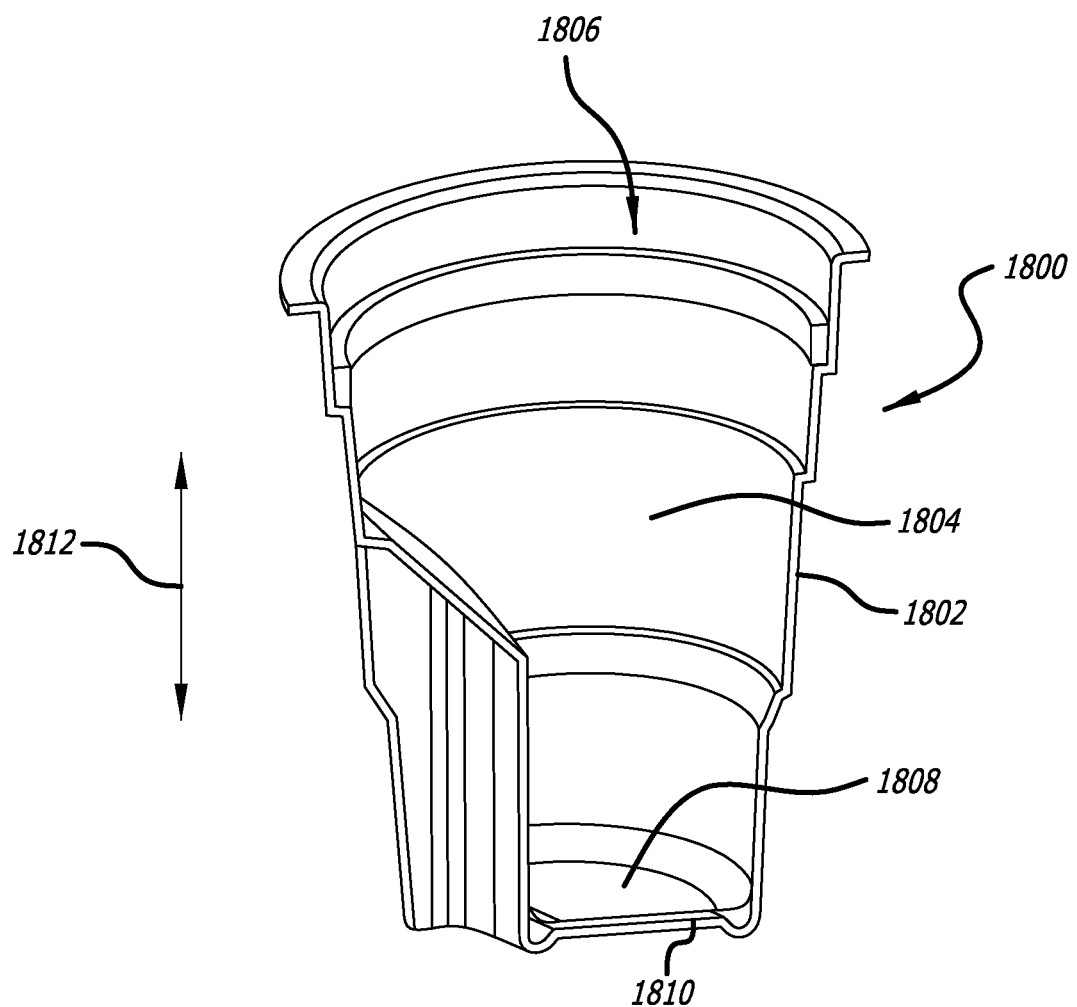
FIG. 29 is a cross-sectional view of another tall cartridge system.

FIG. 29 shows a perspective cross-sectional view of a cartridge system 1800 including a cup 1802 housing a filter 1804 where the filter 1804 substantially fills the interior space 1806 of the cup. The bottom 1808 of the filter 108 may be juxtaposed to the basin 1810 of the cup 1802 with the filter material substantially resistant to piercing by the bottom needle in a manner similar to the cartridge system 1700 discussed above in reference to FIG. 28. The cup 1802 and the filter 1804, however, may be longer along its longitudinal axis 1812 relative to the cup 1702 and the filter 1704.

Figure 30:
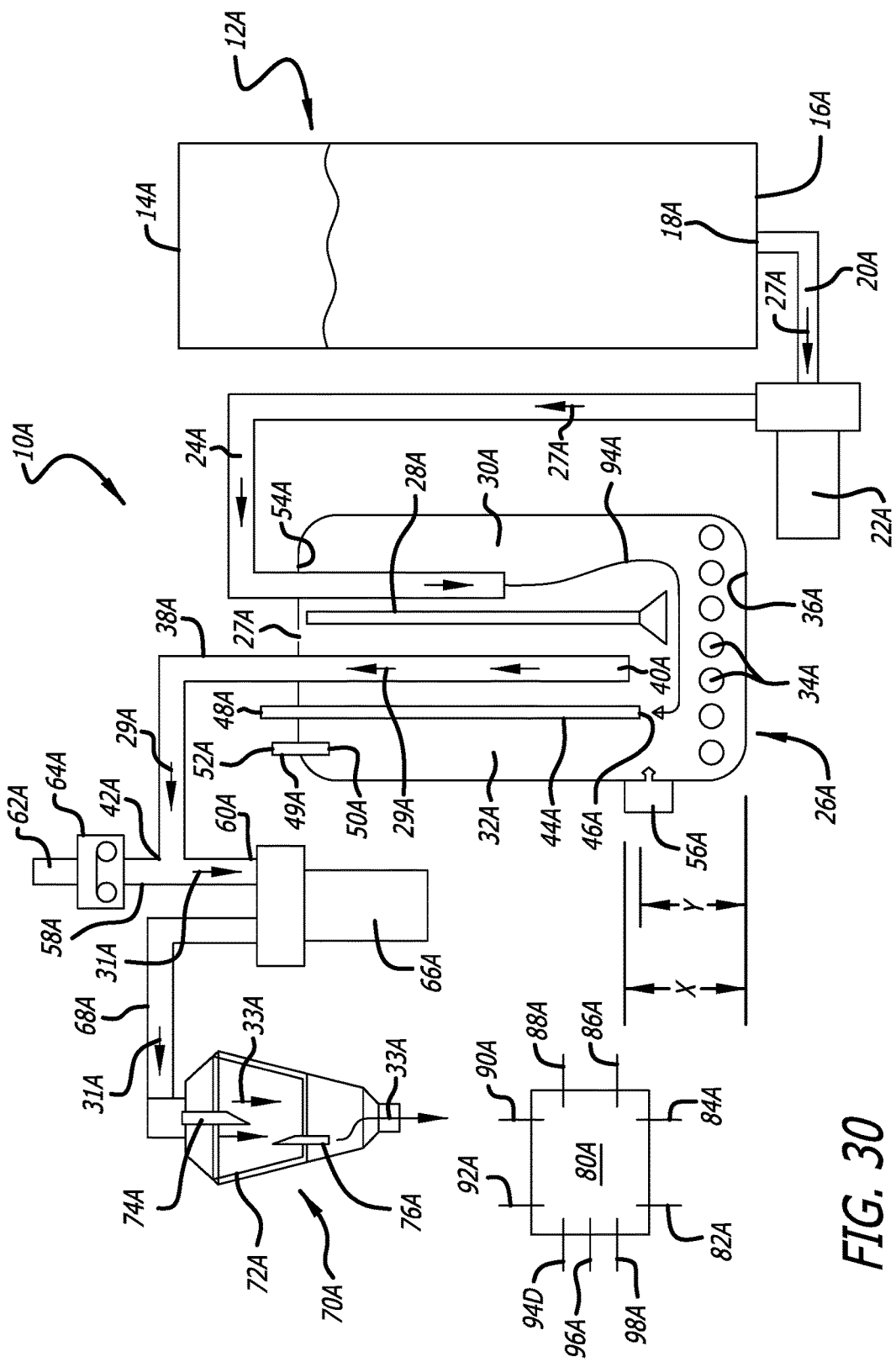
FIG. 30 shows a schematic diagram of a beverage brewing system.

FIG. 30 shows a schematic diagram of a beverage brewer system 10A having a reservoir 12A adapted to hold fluid such as liquid water to serve a plurality of different beverages such as coffee. The reservoir 12A may have an opening 14A to allow a user to pour liquid into the reservoir 12A. The reservoir 12A may have a base 16A with a drain hole 18A to allow the liquid to flow therethrough. A first tube 20A may be coupled to the drain hole 18A to a first pump 22A adapted to pump the water in the reservoir 12A through a second tube 24A.

The system 10A may include a heating member 26A adapted to receive the water from the second tube 24A. The heating member 26A may be open to the atmosphere or it may be sealed to the atmosphere. In this embodiment, the heating member 26A may have an opening 27A so that the air in the heating member 26A may be displaced to the atmosphere as water enters the heating member 26A through the second tube 24A. This allows the first pump 22A to utilize nominal power to pump water into the heating member 26A compared to a heating member that is substantially sealed to the atmosphere due to the rise in the pressure within the sealed heating member.

The heating member 26A may include a wall 28A that may partially divide the heating member 26A into a first section 30A and a second section 32A. The second tube 24A may provide the water from the reservoir 12A into the first section 30A. The heating member 26A may have a heating element 34A adapted to heat the water within the heating member 26A. The heating element 34A may be juxtaposed to a basin 36A of the heating member 26A, and positioned between the wall 28A and the basin 36A. The heating member 26A may include a third tube 38A having a first end 40A and a second end 42A.

The heating member 26A may have a first probe 44A and a second probe 49A. The first probe 44A may have a first end 46A and a second end 48A, and the second probe 46A may have a first end 50A and a second end 52A. The first ends 46A and 50A of the first and second probes 44A and 46A, respectively, may be adapted to detect water. The first end 40A may be located a distance X relative the basin 36A, and the first end 46A may be located a distance Y relative to the basin 36A, where Y may be less than X. The first end 50A may be juxtaposed to a cover 54A of the heating member 26A. The heating member 26A may also include a temperature sensor 56A located juxtaposed to the first end 40A to approximate the temperature of the water near the first end 40A.

The second end 42A of the third tube 38A may be fluidly coupled to a fourth tube 58A between first and second ends 60A and 62A. The fourth tube 58A may have a switch 64A juxtaposed to the second end 62A adapted to open and close to the atmosphere. The second end 42A may be fluidly coupled to the fourth tube 58A between the switch 64A and the first end 60A. The first end 60A may be coupled to a second pump 66A such that water from the third tube 38A may be pumped through a fifth tube 68A and into a brewing chamber 70A. The brewer chamber 70A may be adapted to receive a cartridge 72A and pierce the top with a first needle 74A, and pierce the bottom with a second needle 76A. In certain applications where the cartridge is designed to be pierced the top cover with the mesh bottom, the brewer chamber 70A may only need to pierce the top cover.

The system 10A may include a controller 80A having a plurality of nodes 82A through 92A, where the node 82A may be communicably coupled to the first pump 22A, the node 84A may be communicably coupled to the temperature sensor 56A, the node 86A may be communicably coupled to the second end 48A, the node 88A may be communicably coupled to the second end 52A, the node 90A may be communicably coupled to the switch 64A, and the node 92A may be communicably coupled to the second motor 66A.

When the system is initially turned on, the controller 80A may first determine if the first end 46A of the probe 44A detects water in the heating member 26A. If not, the controller 80A may turn on the first pump 22A to provide water into the heating member 26A through the first and second tubes 20A and 24A as indicated by the direction arrows 27A. Once the first end 46A of the probe 44A detects water, the controller may turn on the heater element 34A until the water temperature measurement from the sensor 56A reaches a predetermined water temperature. This may be done to prevent the heating element 34A from burning out due to little or no water in the heating member 26A. Once the first end 50A of the second probe 49A detects water, the controller 80A may stop the first pump 22A since the heating member 26A may be substantially full of water, and to prevent over flow of water out of the heating member 26A. The controller 80A may keep the heater element 34A on until the heating member 26A substantially full of water is heated to the predetermined temperature.

As the first pump 22A pumps water from the reservoir 12A into the first section 30A, the wall 28A forces the water to flow through a path as indicated by the direction arrow 94A such that the cooler water from the reservoir 12A in the first section flows pass the heater element 34A. This may allow the water in the second section 32A to be kept hotter relative to the water in the first section 30A to minimize the time to heat the water in the second section 32A to a desired temperature. Note that the volume of space in the second section 32A may be greater than the first section 30A so that the second section 32A may hold more water than the first section 30A.

When the system 10A is on, the heating member 26A may be in a ready mode, where the water level within the heating member 26A may be at the first end 50A of the second probe 49A and the water temperature may be kept substantially near the predetermined temperature. For instance, if the water temperature within the heating member 26A drops below the predetermined temperature, the controller 80A may turn on the heating element 34A to raise the temperature again until the predetermined temperature is reached.

The controller 80A may receive input signals 94A, 96A, and 98A from a user interface, as discussed in more detail below. The input signal 94A may represent the desired temperature of the water, the input signal 96A may represent the desired flow rate of the water through the cartridge 72A, and the input signal 98A may represent the desired volume of water or cup size. The controller may adjust the temperature of the water in the heating member 26A within the optimal temperature range, such as from about 185° F. to about 205° F. with 5° F. increments or 185° F., 190° F., 195° F., 200° F., and 205° F. In general, lower brewing temperature may result in more sour coffee taste, while higher brewing temperature may result in more bitter coffee taste.

The controller 80A may also adjust the flow rate of the water passing through coffee grind in the cartridge 72A from slow to fast, such as from about 60 seconds for an 8 oz cup of coffee to about 20 seconds for the same 8 oz cup of coffee in about 10 seconds of increments or 60, 50, 40, 30, and 20 seconds per 8 oz cup. In general, the range of flow rate mentioned above may be applicable to a cartridge containing about 10 to 12 grams of coffee grind, which may be appropriate to brew an 8 oz cup of coffee. Put differently, hot water passing through the coffee grind may be thought of as washing the coffee grind such that more time the hot water is in contact with the coffee grind, more thoroughly the coffee grind will get washed. However, if the coffee grind is over washed, the hot water is in contact with the coffee grind for too long, and over-extraction may occur, which may result in bitter coffee taste. Conversely, if the coffee grind is not washed enough, the hot water is in contact with the coffee grind for a short period of time, and under-extraction may occur, which may result in flat and sour coffee taste.

The amount of hot water relative to the amount of the coffee grind may also have an impact on the coffee taste. If too much water is used, the coffee may taste weak or water-downed, but if not enough water is used, then the coffee may taste too strong. As such, temperature, flow rate, and amount water used need to be balanced as they can all impact the taste of coffee, and with individual coffee drinkers having their own preference for coffee tastes, the temperature, flow rate, and cup size may be independently controlled to customize the coffee taste.

Referring back to FIG. 30, the following describes the process the controller 80A may go through to brew a cup of coffee with the heating member 26A in a ready mode, where the water level is at or near the first end 50A of the second probe 46A, and the water temperature substantially at or near the predetermined temperature. In this example, the predetermined temperature may be set at 185° F. In general, a cartridge holds about 10 to 12 grams of coffee grind, which is sufficient to brew an 8 oz cup of coffee. For instance, if a user prefers a strong cup of coffee, the user may select the following: the input signal 94A with the temperature of 200° F.; the input signal 96A with the flow rate of 50 seconds per 8 oz; and the input signal 98A with the cup size of 7 oz. With these input signals, the controller 80A may turn on the heating element 34A until the temperature sensor 56A indicates that the water temperature is heated from the predetermined temperature of 185° F. to 200° F.

Once the desired temperature is reach, the controller 80A may turn off the heating element 34A, and turn on the second pump 66A, and close the switch 64A so that the second end 62A of the tube 58A is closed to the atmosphere. The second pump 66A may be a vacuum pump to draw the heated water within the heating member 26A out through the first end 40A of the third tube 38A as indicated by the direction arrow 29A; and as the heated water is drawn out through the third tube 38A, atmospheric air may enter the heating member 26A through the opening 27A to minimize the power needed from the second pump 66A to draw the heated water out of the heating member 26A. With the switch 64A closed, the heated water flows through the first end 60A of the fourth tube 58A as indicated by the direction arrow 31A and out through the fifth tube 68A as indicated by the direction arrow 31A, and injected into the cartridge 72A and exit from the brewing chamber 70A as indicated by the direction arrows 33A.

Depending on the flow rate selected, the controller 80A may control the voltage supplied to the second pump 66A to control the speed of the motor; thus, the flow rate of the water. The controller 80A may keep track of the time the second pump 66A has been running and by multiplying the flow rate and the time, the controller 80A may determine the amount of heated water that has been pumped by the second pump 66A. In this example, with the user selecting flow rate of 50 seconds/8 oz, and having selected 9 oz cup of coffee, the controller 80A may keep the second pump running for less than 50 seconds to fill the 7 oz cup of coffee.

Figure 31:
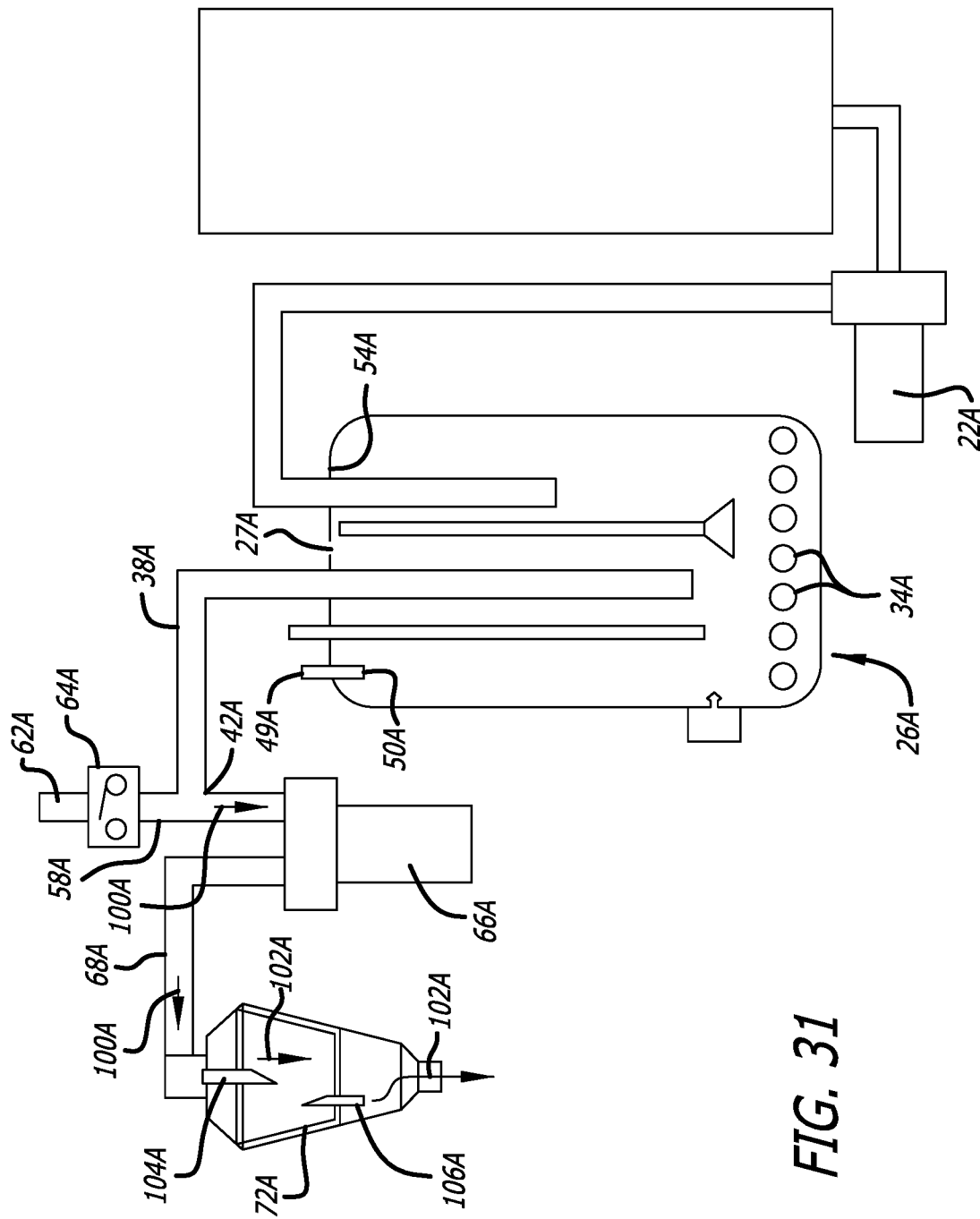
FIG. 31 shows the beverage brewing system of FIG. 1 in a different state.

FIG. 31 shows that once the controller 80A determines that the desired amount of heated water has been injected through the cartridge 72A, the controller 80A may open the switch 64A to cause the air to enter through the second end 62A of the fourth tube 58A as indicated by the direction arrow 100A. The second end 42A of the third tube 38A may be located above the cover 54A of the heating member 26A along the vertical axis when the system 10A is being used so that when the switch 64A is opened, the water in the third tube 38A substantially stops flowing. With the switch 64A opened, the second pump 66A may substantially pump air through the fourth and fifth tubes 58A and 68A as indicated by the direction arrows 100A; and inject air through the cartridge 72A as indcted by the direction arrow 102A to substantially purge a top needle 104A, and the remaining beverage within the cartridge 72A out through a bottom needle 106A.

Once the purging is done, the controller 80A may close the switch 64A and prepare the heating member 26A to a ready mode again by turning on the first pump 22A until the probe 49A detects water at its first end 50A. The controller 80A may simultaneously or sequentially turn on the heating element 34A to heat the water temperature to the predetermine temperature. Having the heating member 26A in a ready mode minimizes the time it takes to heat the water to a desired temperature to minimize the time it take to brew a cup of coffee.

Figure 32:
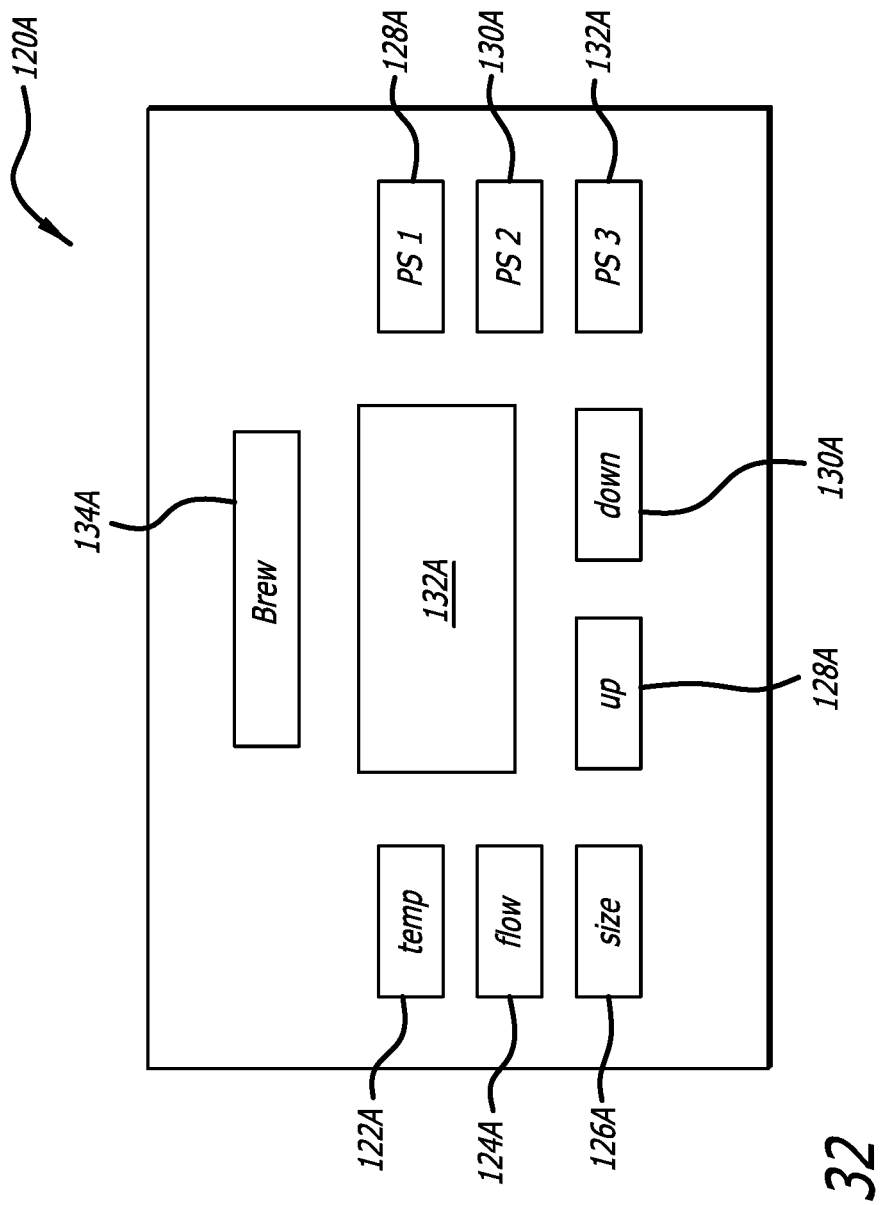
FIG. 32 shows a user interface for the beverage brewing system.

FIG. 32 shows a user interface 120A adapted to provide input signals to the controller 80A. The user interface 120A may have a temperature button 122A, a flow rate button 124A, a size button 126A, an up button 128A, a down button 130A, and a display 132A. A user may adjust the temperature, flow rate, and size of the beverage by first pressing on the appropriate button, and then using the up or down buttons 128A and 130A to adjust the settings. For instance, to adjust the temperature, the user may select the temperature button 122A, and then use the up or down buttons to adjust the temperature from 185° F. to 205° F. The display 132A may indicate the selected temperature. The flow rate and the size of the coffee may be adjusted by selecting the buttons 124A and 126A, respectively, and using the up and down buttons 128A and 130A to adjust accordingly.

The user interface 120A may include preset buttons 128A, 130A, and 132A. Once the user has found a preferred combination of temperature, flow rate, and size of the beverage, the user may store the customized combination into one of the preset buttons. Once the desired combination has been set, the user may press a brew button 134A to start the brewing process.

Figure 33:
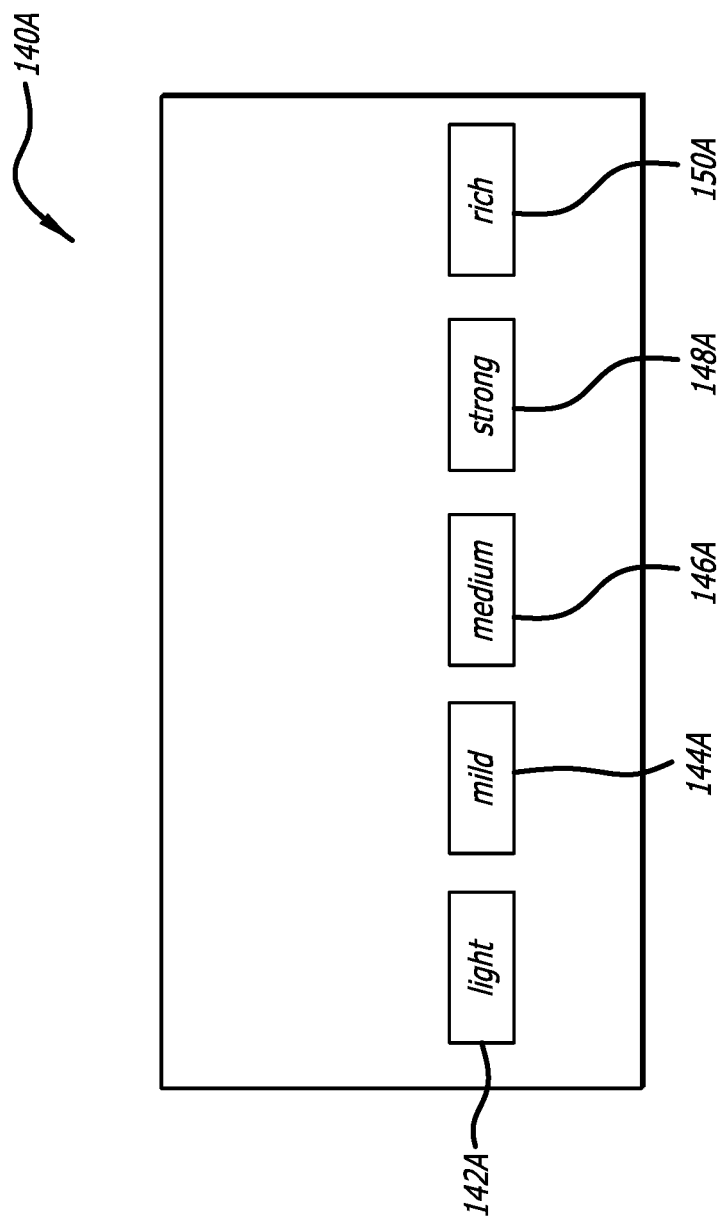
FIG. 33 shows another user interface.

FIG. 33 shows alternative user interface 140A where a user may choose from a plurality of taste or cup settings. The settings may include a light button 142A, mild button 144A, a medium button 146A, a strong button 148A, and a rich button 150A. These buttons may be preprogrammed to brew the desired tastes based on a cartridge containing between 10 and 12 grams of coffee grind. For instance, the light button 146A may be preprogrammed with the following settings: water temperature of 185° F., flow rate of 20 seconds per 8 oz of coffee, and a serving size of 9 oz. Conversely, the rich button 150A may be preprogrammed with the following settings: water temperature of 205° F., flow rate of 60 seconds per 8 oz of coffee, and a serving size of 7 oz, which would result in a richer tasting coffee compared to the light button 146A.

Figure 34:
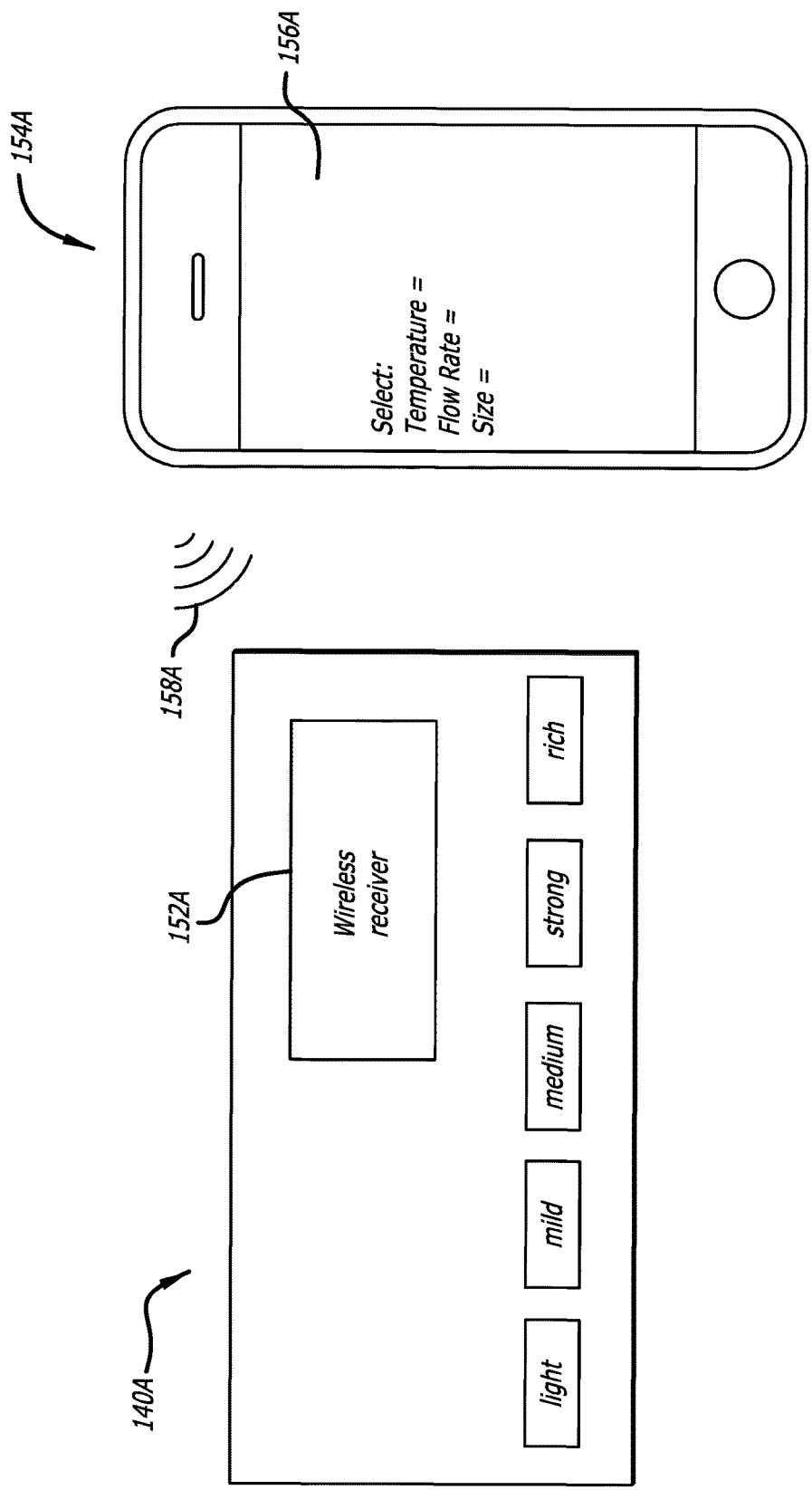
FIG. 34 shows a wireless user interface system.

FIG. 34 shows that the user interface 140A may include a wireless receiver 152A adapted to receive a single from a smart device such as a smart phone 154A. The smart phone 154A may have an application 156A adapted to set the temperature, flow rate, and the cup size of the beverage; and transmit the settings through a wireless signal 158A, which may be received by the wireless receiver 152A. The controller 80A may then brew a beverage utilizing the settings from the smart phone 154A.

Figure 35:
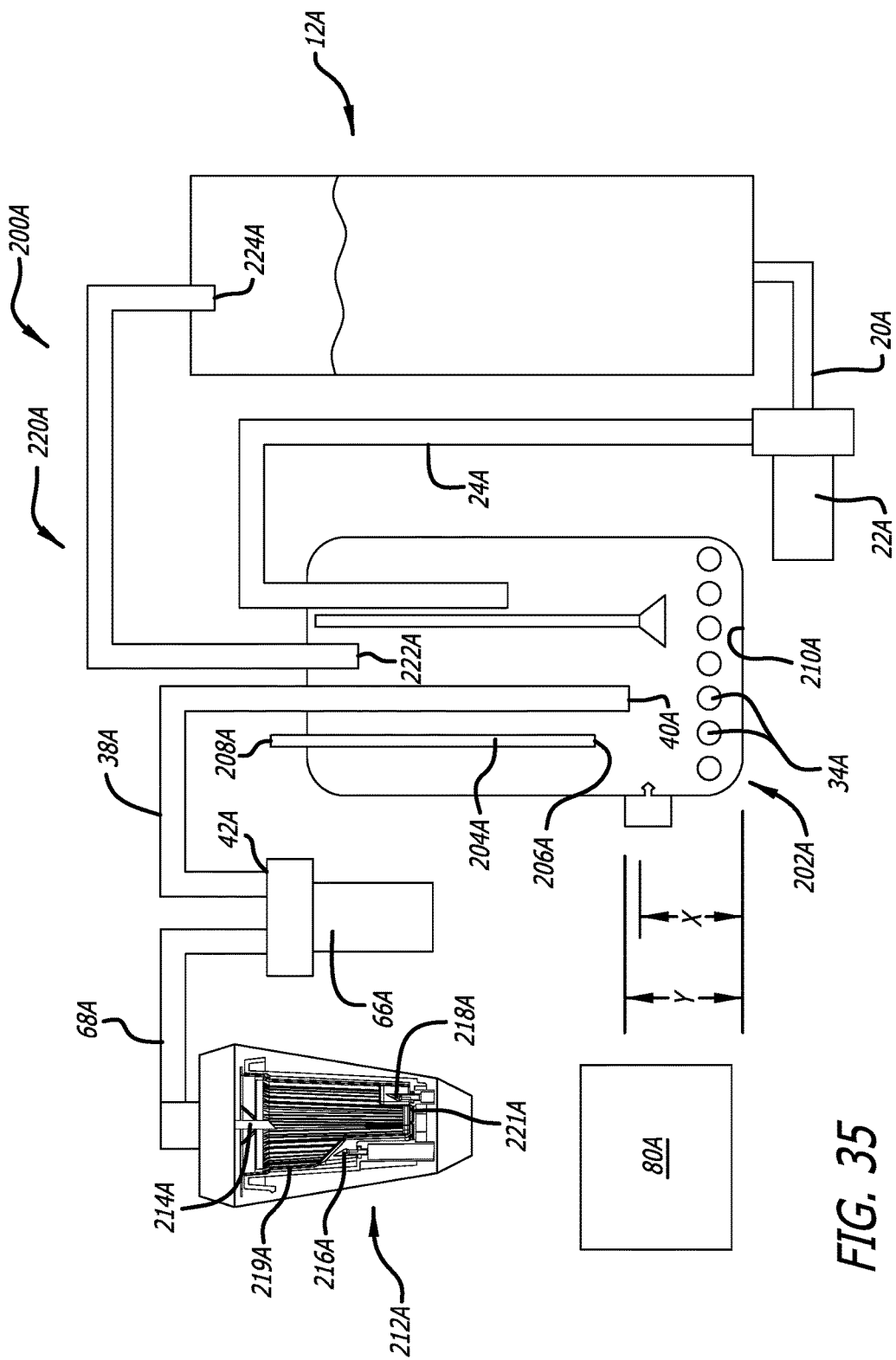
FIG. 35 shows another beverage brewer system.

FIG. 35 shows another beverage brewer system 200A similar to the system 10A with the following differences. With the brewer system 200A, the controller 80A may monitor the flow rate of the water being pump by the first pump 22A to monitor amount of water from the reservoir 12A being pumped into the heating member 202A. The heating member 202A may have a first probe 204A having a first end 206A and a second end 208A. The first end 206A may be located distance Y from a basin 210A of the heating member 202A, and the first end 40A of the second tube 38A may be located distance X from the basin 210A. With the brewer system 200A, the distance Y may be greater than the distance X. Put differently, the first end 206A of the first probe 204A may be higher than the first end 40A of the second tube 38A along the vertical axis when the system 200A is in use. The second end 42A of the tube 38A may be coupled to the second pump 66A, which in turn pumps heated water through the fifth tube 68A to inject heated water to a brewing chamber 212A. The brewing chamber 212A may have a top needle 214A, a first bottom needle 216A, and a second bottom needle 218A. When the brewing chamber is closed, the first bottom needle 216A may be located between the top needle 214A and the second bottom needle 218A. The first bottom needle 216A may be positioned within the brewing chamber 212A to pierce a first cartridge 72A sized and shaped similar to a K-Cup®. The second bottom needle 218A may be position to pierce the bottom of a second cartridge 219A that is longer along its longitudinal axis relative to the first cartridge 72A. The second cartridge 219A may be configured to avoid the first bottom needle 216A but configured to allow the second bottom needle 218A to pierce the bottom 221A when the second cartridge is inserted fully into the brewing chamber 212A.

The system 200A may include a fourth tube 220A having a first end 222A and a second end 224A. During the heating period, steam or excess water within the heating member 202A may exit through the first end 222A and exit through the second end 224A. The steam entering the fourth tube 220A may condense and drop into the reservoir 12A. Likewise, excess water entering the first end 222A may drop into the reservoir 12A.

When the system 200A is initially turned on, the water level within the heating member 202A may be either below or in contact with the first end 206A of the probe 204A. If the water makes contact with the first end 206A, then the water level may be at or above the first end 206A. If the water level is below the first end 206A, then the controller 80A may turn on the first pump 22A to fill the heating member 202A until the first end 206A detects water. The system 200A may then wait for a user to brew a cup of beverage. During this waiting period, the controller 80A may maintain the water temperature within the heating member 202A at or near the predetermined temperature. Once the user activates the system 200A to brew a desired amount of beverage, the controller may control the voltage of the first pump 22A to control the flow rate over a period time to fill the heating member 202A with an appropriate amount of water to brew the desired amount of beverage. The controller 80A may simultaneously or sequentially turn on the heating element 34A, to heat the water in the heating member to a desired temperature. Once the desired temperature has been reached, the controller 66A may turn on the second pump 66A; and as the water level within the heating member 202A drops below the first end 206A of the first probe 204A, the controller may increase the voltage fed to the first pump 66A to purge the top needle 214A by speeding up the flow rate. And as the water level drops below the first end 40A of the third tube 38A, the pump 66A may pump air through the third tube 38A, thus in essence blowing air through the top needle 214A and the coffee grind in the cartridge to purge the top needle from clogging and to substantially drain the cartridge of the remaining beverage.

When the system 200A is initially turned on, the water may be in contact with the first end 206A such that the water level may be at or above the first end 206A. Under this situation, the controller 80A may maintain the water temperature within the heating member 202A at or near the predetermined temperature. Once the user activates the system 200A to brew a desired amount of beverage, the controller 80A may heat the water within the heating member 202A to a desired temperature, and once the desired temperature is reached, the controller 80A may control the voltage of the second pump 66A to control the flow rate to inject heated water through the brewing chamber 212A while keeping track of the time the second motor 66A is on until the water level is below the first end 40A of the third tube 38A. This allows the controller to calculate the amount of water injected through the brewing chamber 212A. If the amount of water is less than the desired amount of water selected by the user, the controller 80A may then turn on the first pump 22A to pump the difference between the desired amount of the water and the actual amount water pumped by the second pump into the heating member 202A. The controller 80A may then turn on the heating element 34A to heat the water to the desired temperature, and the controller 80A may then turn on the second pump 66A to pump the heated water in the heating member 202A again until the water level is below the first end 40A. The controller may then purge the top needle 214A and the coffee grind in the cartridge in a manner described above.

Figure 36:
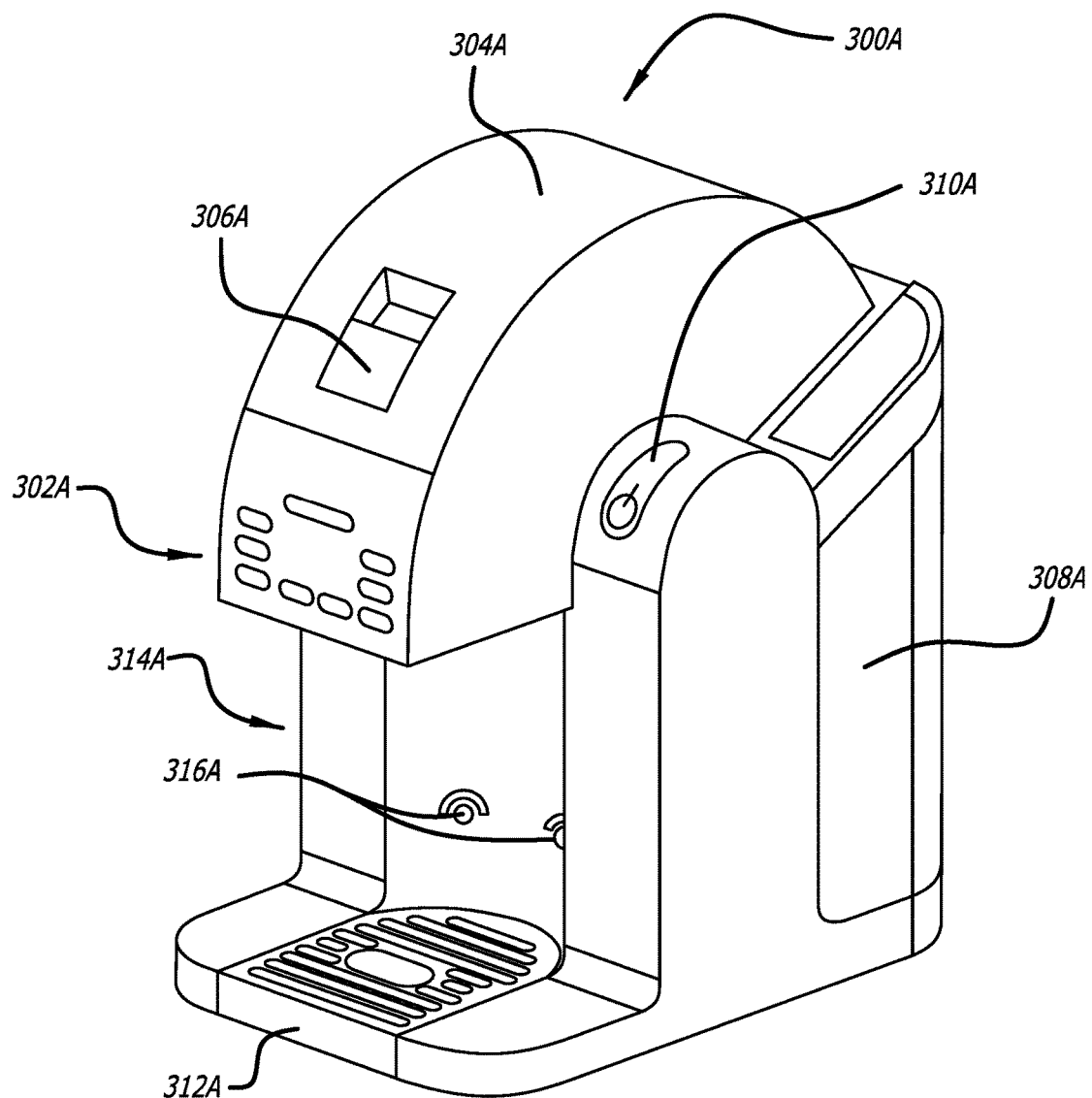
FIG. 36 shows a perspective outer view of a beverage brewer system.

FIG. 36 shows a perspective view of a beverage brewer system 300A having a user interface 302A, a cover 304A with a release latch 306A, a reservoir 308A, and an on/off button 310A. The system 300A may also have a drip tray 312A releasably attached to a main body 314A. FIG. 36 shows the drip tray in the first position, however, main body 314A may have peg holes 316A adapted to receive the drip tray 312A such that the drip tray 312A may be removed and re-engaged with the peg holes 316A to relocate the drip tray 312A into a second position.

Figure 37:
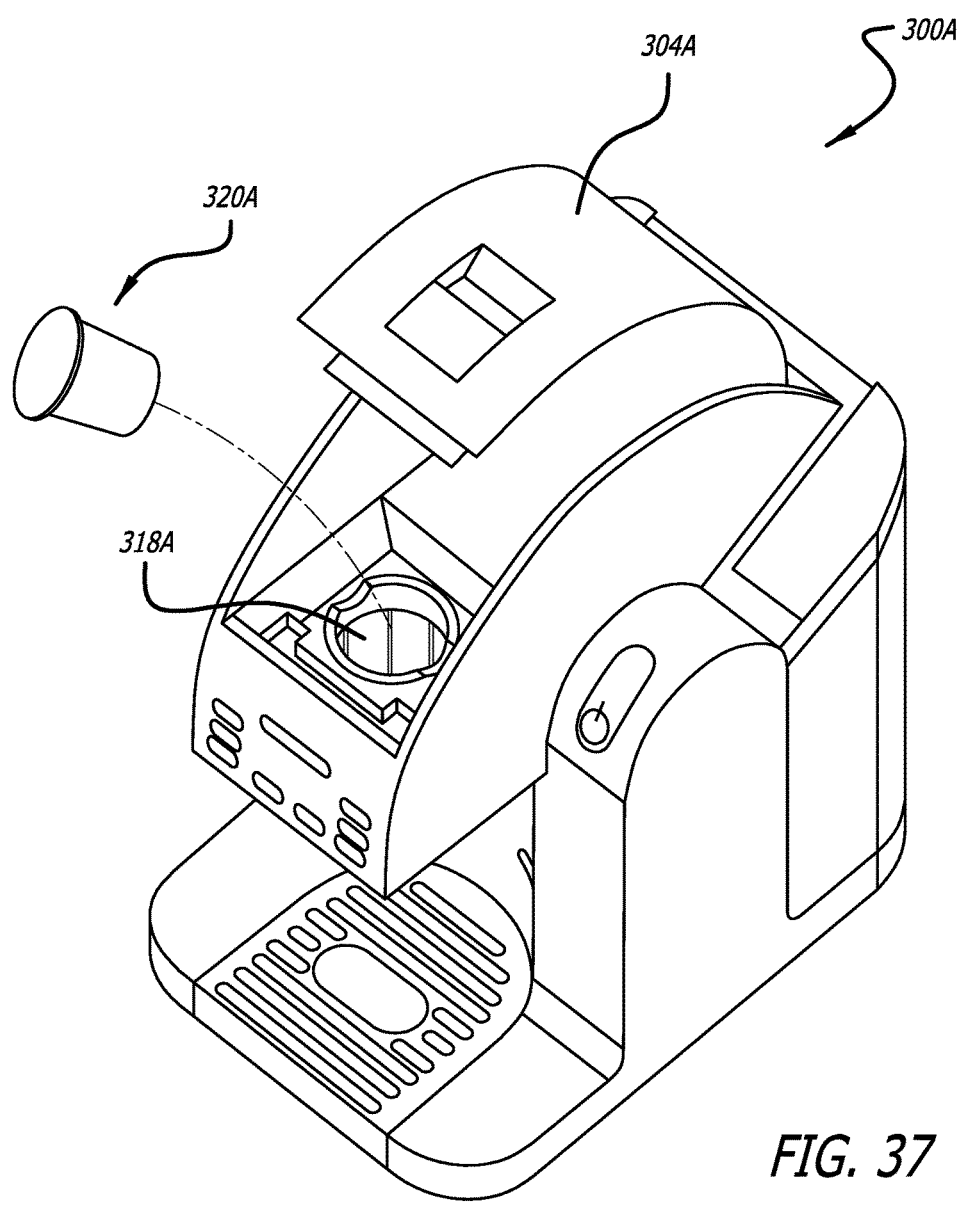
FIG. 37 shows the beverage brewer system of FIG. 7 with its cover in an open position.

FIG. 37 shows the system 300A with the cover 304A in an open position, which exposes a cup holder 318A adapted to receive a cartridge 320A containing premeasured beverage material such as coffee grind. To make a cup of beverage, the cartridge 320A may be inserted into the cup holder 318A and the cover 304A may be closed.

Figure 38:
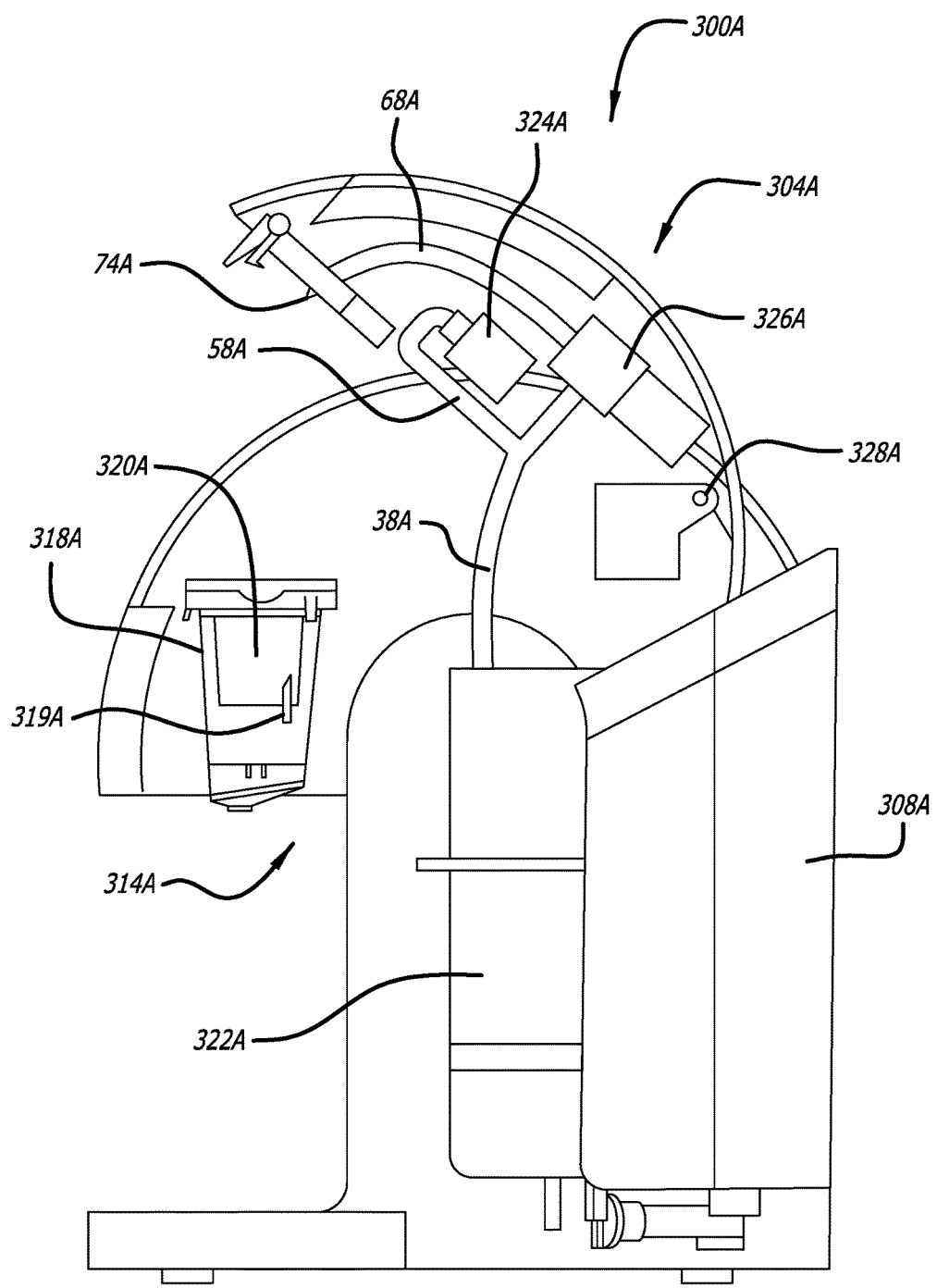
FIG. 38 shows a side view of the beverage brewer system of FIG. 1 with certain housing portions removed to show the placement of certain internal components.

FIG. 38 shows a side view of the system 300A with certain elements removed to show certain internal components such as the reservoir 308A fluidly coupled to a heating member 322A with the third tube 38A fluidly coupling the heating member 322A to a switch 324A and a second pump 326A. The fourth tube 58A may fluidly couple the switch 324A to the third tube 38A, and the fifth tube 68A may fluidly couple the second pump 326A to the first needle 74A. The cover 304A may be pivotally coupled to the main body 314A about a pivot axis 328A to allow the cover to open and close. The cup holder 318A may be removably couple to the main body 314A to hold the cartridge 320A such that the first needle 74A may pierce the top side of the cartridge 320 when the cover is closed.

Figure 39:
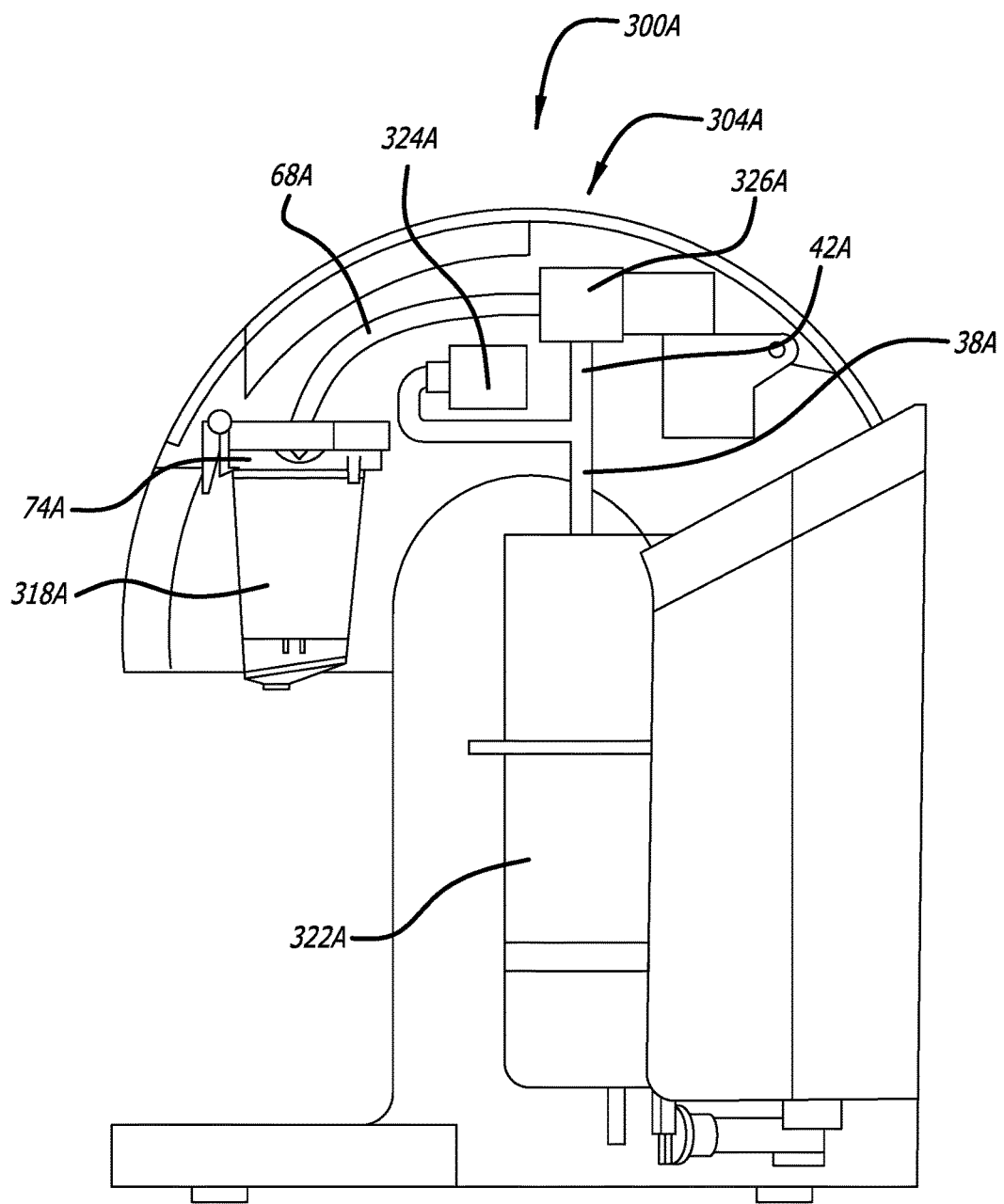
FIG. 39 shows the beverage brewer system of FIG. 1 with its cover in a closed position.

FIG. 39 shows the system 300A with the cover 304A in the closed position such that the first needle 74A pierces the top side of the cartridge 320A within the cup holder 318A. The second pump 326A may be located within the cover 304A such that the second pump 326A may be located above the heating member 322A. This allows the second end 42A of the third tube 38A to be located above the heating member 322A along the vertical axis when the system 300A is being used so that when the switch 64A is opened, the water in the third tube 38A substantially stops flowing. With the switch 324A open, the second pump 326A may substantially pump air through the fourth and fifth tubes 38A and; and inject air through the cartridge 320A to substantially purge the first needle 74A, and water within the cartridge 320A out through a second needle 319A.

Figure 40:
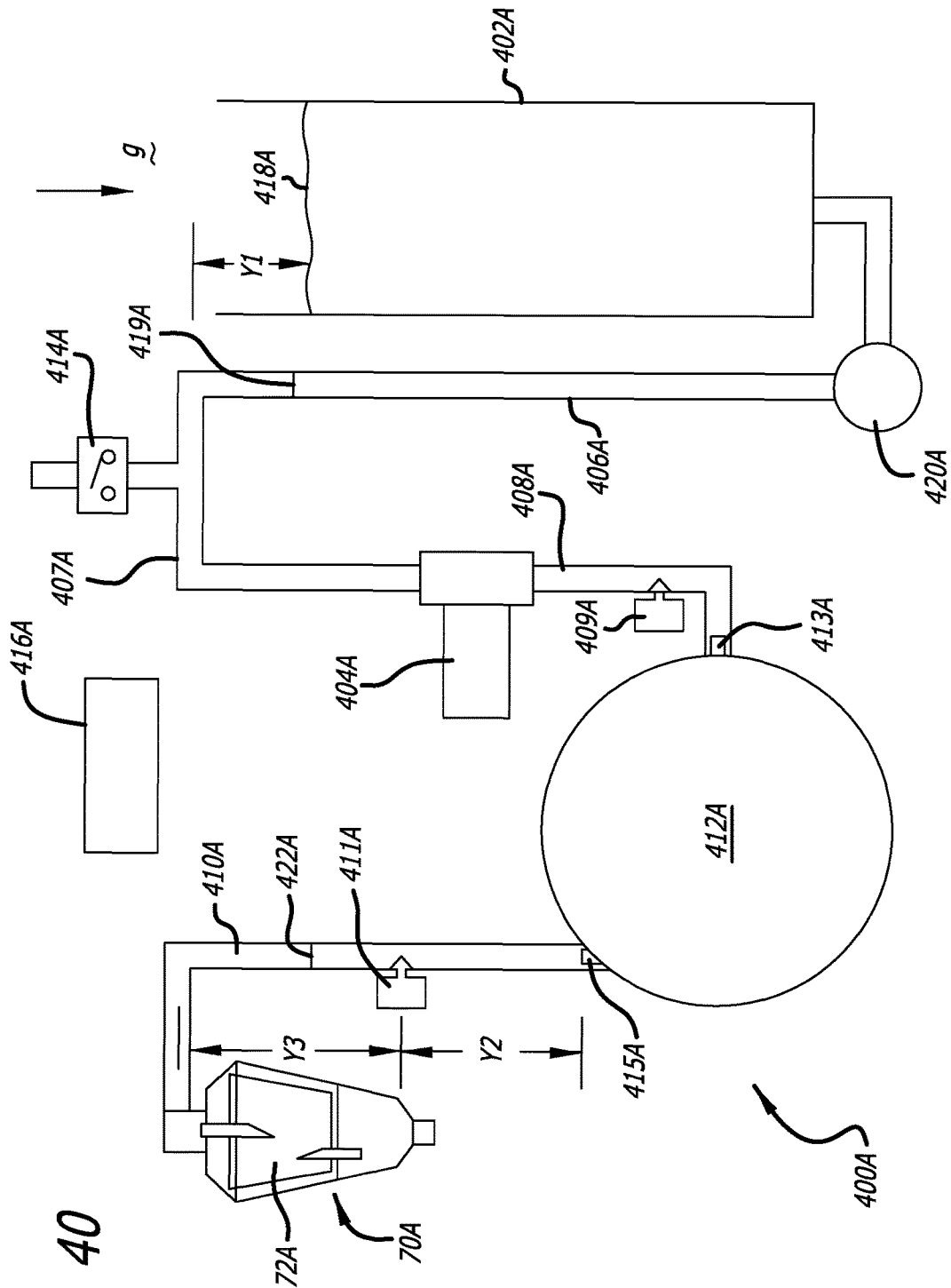
FIG. 40 shows yet another beverage brewer system.

FIG. 40 shows another beverage brewer system 400A having a reservoir 402A fluidly coupled to a pump 404A adapted to convey fluid through a first tube 406A and through a second tube 408A. The second tube 408A may be fluidly coupled to a tube heater 412A to heat the water passing therethrough. The tube heater 412A may be coiled to minimize the space it occupies within the brewer. In particular, the tube heater may be about 1200 Watt to about 1800 Watt power heater design to heat about 8 oz of water with an inlet room temperature of about 14° C. to about 25° C. (about 59° F. to about 77° F.) to an outlet temperature of about 88° C. to about 93° C. (190° F. to about 199° F.) passing through the tube heater in about 30 seconds to about 55 seconds. It is within the scope of the invention to utilize a variety of tube heaters known to one skilled in the art to heat the water passing through the tube. The heated water may be passed through a third tube 410A to provide heated water to the brewing chamber 70A. The tube heater 412A may have an inlet 413A and an outlet 415A adapted to coupled to the second tube 408A and the third tube 410A, respectively.

The first tube 406A may be routed such that a portion 407A of the first tube 406A may be elevated vertically above the top line 418A of the water inside the reservoir 402A when the brewer system 400A is in use, as defined by distance Y1. The top line 418A may be the maximum amount of water that can be held by the reservoir 402A. A switch 414A may be coupled to the portion 407A of the first tube 406A adapted to open and close to the atmosphere. The switch 414A may be located in an elevated level above the top line 418A within the reservoir 402A. This ensures that when the switch 414A is in an open position, as shown in FIG. 40, the portion 407A of the first tube 406A is open to the atmosphere, and the water level 419A within the first tube 406A is below the portion 407A of the first tube 406A and the switch 414A.

The brewer system 400A may include a first temperature sensor 409A and a second temperature sensor 411A coupled to the second tube 408A and the third tube 410A, respectively. The first temperature sensor 409A senses the temperature of the water before entering the inlet 413A, and the second temperature sensor 411A senses the temperature of the water after the water exists through the outlet 415A of the tube heater 412A. The second temperature sensor 411A may be located distance Y2 above the outlet 415A, and a distance Y3 from the maximum height of the third tube 410A along the vertical axis when the brewer system 400A is in use.

The pump 404A may be a variable pump, such as a vacuum DC pump, to adjust the flow rate of the water through the tube heater 412A. A flow meter 420A may be coupled to one of the tubes, such as the first tube 406A, to monitor the amount of water passing through the tubes. Alternatively, the volume of water pumped through the brewing chamber 70A may be calculated by the flow rate of the water pumped by the pump 404A multiplied by the time the pump 404A has been on. Once the desired amount of water has passed through the brewing chamber 70A, the controller 416A may open the switch 414A to allow atmospheric air to be pumped through the portion 407A instead of water from the reservoir 402A. With the switch 414A in the open position, atmospheric air enters the portion 407A of the tube 406A such that air is pumped through the second tube 408A, heater 412A, and the third tube 410A to purge the cartridge 72A with air so that the beverage within the cartridge 72A may be substantially drained. Note that it is within the scope of the invention to have the pump 404A and the switch 414A positioned between the tube heater 412A and the brewing chamber 70A similar to the second pump 66A and switch 64A shown in FIG. 30.

The brewing system 400A includes a controller 416A communicably coupled to the pump 404A, switch 414A, flow meter 420A, heater 412A, and the first and second temperature sensors 409A and 411A. When a coffee drinker initiates the brewer system 400A to make a cup of beverage such as coffee, the controller 416A may monitor the temperatures at the inlet 413A and the outlet 415A through the first and second temperature sensors 409A and 411A, respectively. The controller 416A may monitor the inlet water temperature to determine if the water temperature is within the room temperature range of about 14° C. to about 25° C. (about 59° F. to about 77° F.). The inlet water temperature may be below the room temperature range for a variety of reasons, such as due to cold atmospheric temperature or from refrigerated water being poured into the reservoir 402A. Under such circumstances, it may take additional time to heat the water through the tube heater 412A to a desired temperature at the outlet 415A. To do so, the controller 416A may reduce the voltage provide to the pump 416A to reduce the flow rate of the water through the tube heater 412A to allow the tube heater 412A additional time to heat the water. In addition, reducing the flow rate may allow additional contact time between the hot water and the beverage grind for full extraction of the flavors from the coffee grind. Conversely, if the water temperature at the inlet 413A is above the room temperature, the controller may increase the speed of the pump 404A to increase the flow rate so that the water through the tube heater 412A has less time to heat the water to compensate for the higher inlet water temperature so that the outlet water temperature is at the desired temperature. Alternatively, the controller may turn the heater 412A on—off—on—off and so on if the inlet water temperature is high to prevent overheating the inlet temperature. As such, the controller may adjust the speed of the pump 404A to control the flow rate as a function of the inlet water temperature so that the outlet water temperature may be within the desired water temperature.

The controller may also monitor the water temperature at the outlet 415A through the second temperature sensor 411A to determine if the outlet water temperature is within a desired temperature range, such as about 88° C. to about 93° C. (190° F. to about 199° F.) for brewing coffee. The outlet water temperature may be below the desired temperature range for a variety of reasons, such as cold start of the heater 412A due to the heater 412A not being used for an extended period of time. In other words, the heater 412A may not be warmed up so that even if the water entering the inlet 413A is within the desired room temperature, the water temperature of the initial heated water exiting through the outlet 415A may be below the desired temperature range. Under such circumstances, it may take additional time to heat the water within the heater 412A to a desired temperature at the outlet 415A. If the second temperature sensor 411A detects that the water temperature is below the desired temperature range, the controller 416A may turn off the pump 416A such that the water level within the third tube 410A may be at level 422A. The controller 416A may keep the power on to the heater 412A to allow the heater 412A to heat the water therein. As the water within the heater 412A is heated, the hotter water may rise up through the third tube 410A and displace the cooler water within the third tube 410A. The rise in temperature within the third tube 410A may increase the pressure therein and force the cooler water within the third tube 410A to the brewing chamber 70A and into the cartridge 72A; thus soaking the beverage medium such as coffee grind. This may also be commonly referred to in the coffee industry as "pre-infusion" or "pre-wetting" the coffee grind to get the coffee grind to receive water. It has been suggested that pre-wetting the coffee grind allows the coffee grind to absorb water and swell in size and release carbon dioxide to open paths for the hot water later poured into the coffee grind to more easily penetrate and extract the coffee flavors from the coffee grind. Once the second temperature sensor 411A detects that the water temperature reaches the desired temperature, the controller 416A may turn on the pump 404A again to substantially maintain the water temperature at the outlet 415A within the desired water temperature.

Figure 41:
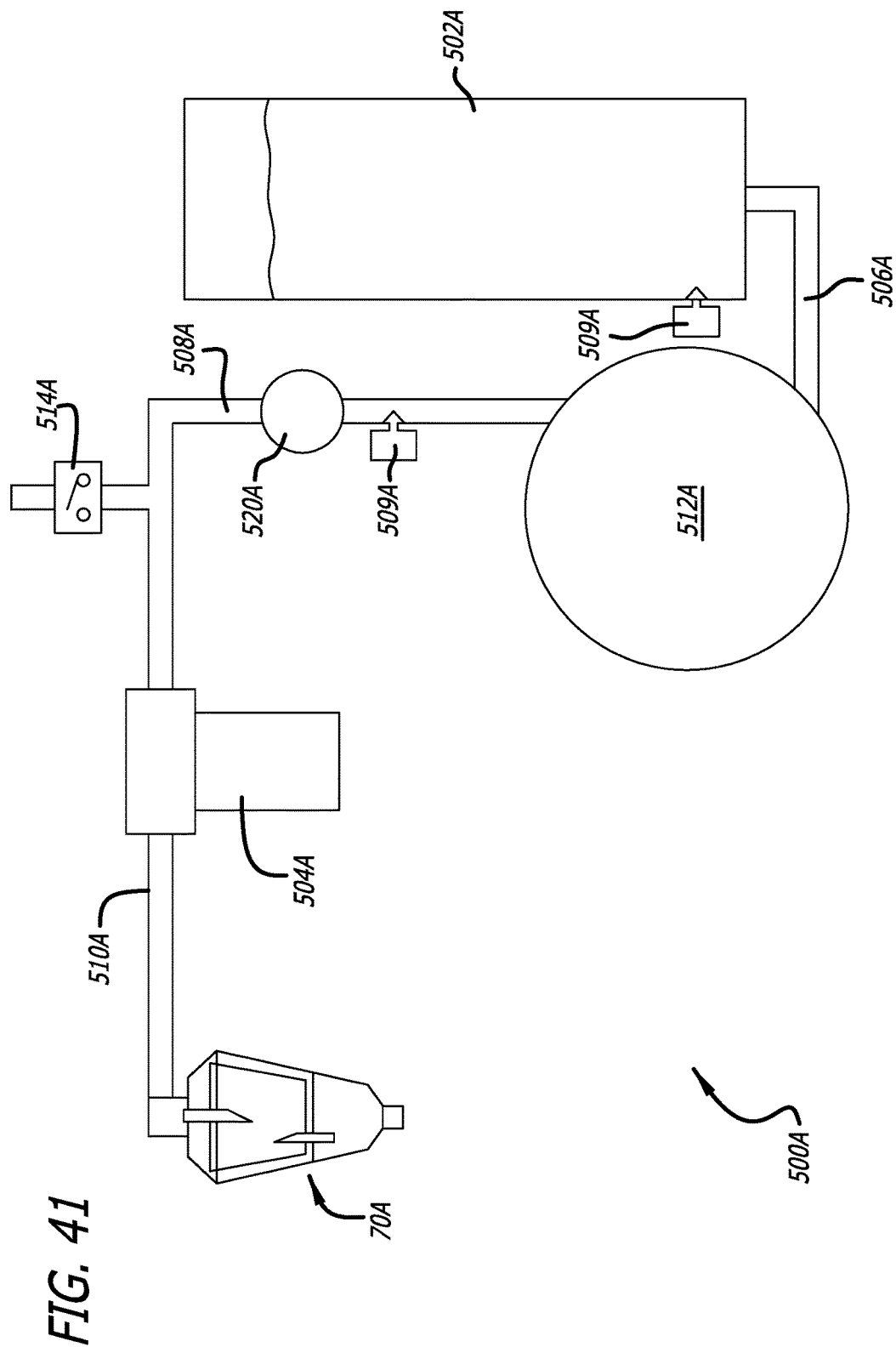
FIG. 41 shows still another beverage brewer system.

FIG. 41 shows a brewer system 500A that is similar to the brewer system 400A shown in FIG. 40 except that the pump 504A and the switch 514A may be positioned between the tube heater 512A and the brewing chamber 70A. The first temperature sensor 509A may be coupled to the reservoir 502A to monitor the temperature of the water entering the tube heater 512A through a first tube 506A. A second temperature sensor 509A may be coupled to the second tube 508A to monitor the outlet water temperature from the heater 512A. The flow meter 520 may be coupled to the second tube 508A to monitor the amount of water passing through the tube. A third tube 510A may be used to couple the pump 504A to the brewing chamber 70A to provide the heated water through the brewing chamber.

Figure 42:
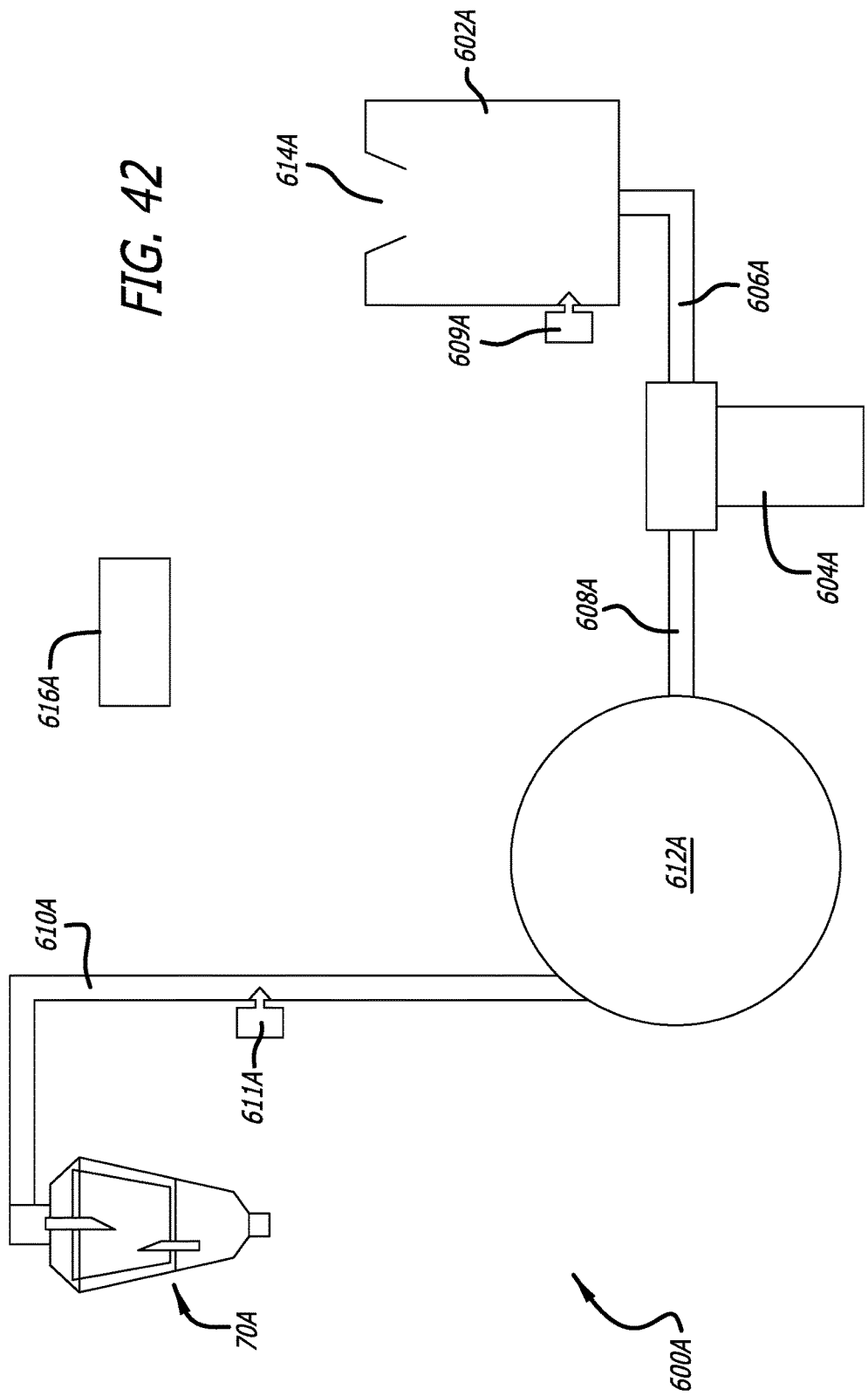
FIG. 42 shows an alternative beverage brewer system.

FIG. 42 shows a beverage brewer system 600A adapted to receive single cup of water and brew a beverage utilizing substantially the entire single cup of water. The brewer system 600A includes a reservoir 602A fluidly coupled to a pump 604A adapted to convey fluid through a first tube 606A and through a second tube 608A. The second tube 608A may be fluidly coupled to a tube heater 612A to heat the water passing therethrough. The heated water from the heater 612A may exit through a third tube 610A to provide heated water to a brewing chamber 70A.

The reservoir 602A may be sized and adapted to receive a single cup of water from about 6 oz to about 16 oz. The reservoir 602A may have an opening 614A adapted to receive water, and the opening may be at least partially opened to the atmosphere. A beverage drinker may pour in a desired amount of water though the opening 614A and into the reservoir 602A. The desired amount of water may be enough to make one cup of beverage or coffee. Once the brewer system 600A is activated, the controller 616A may turn on the pump 604A to convey the water in the reservoir 602A through the heater 612A, and the heated water may be injected through the brewing chamber 70A. Once the water in the reservoir 602A is substantially drained, the pump 602A may pump air through the tubes and the tube heater to purge the brewing chamber 70A to prepare the brewing system 600A for the next brewing cycle.

Figure 43:
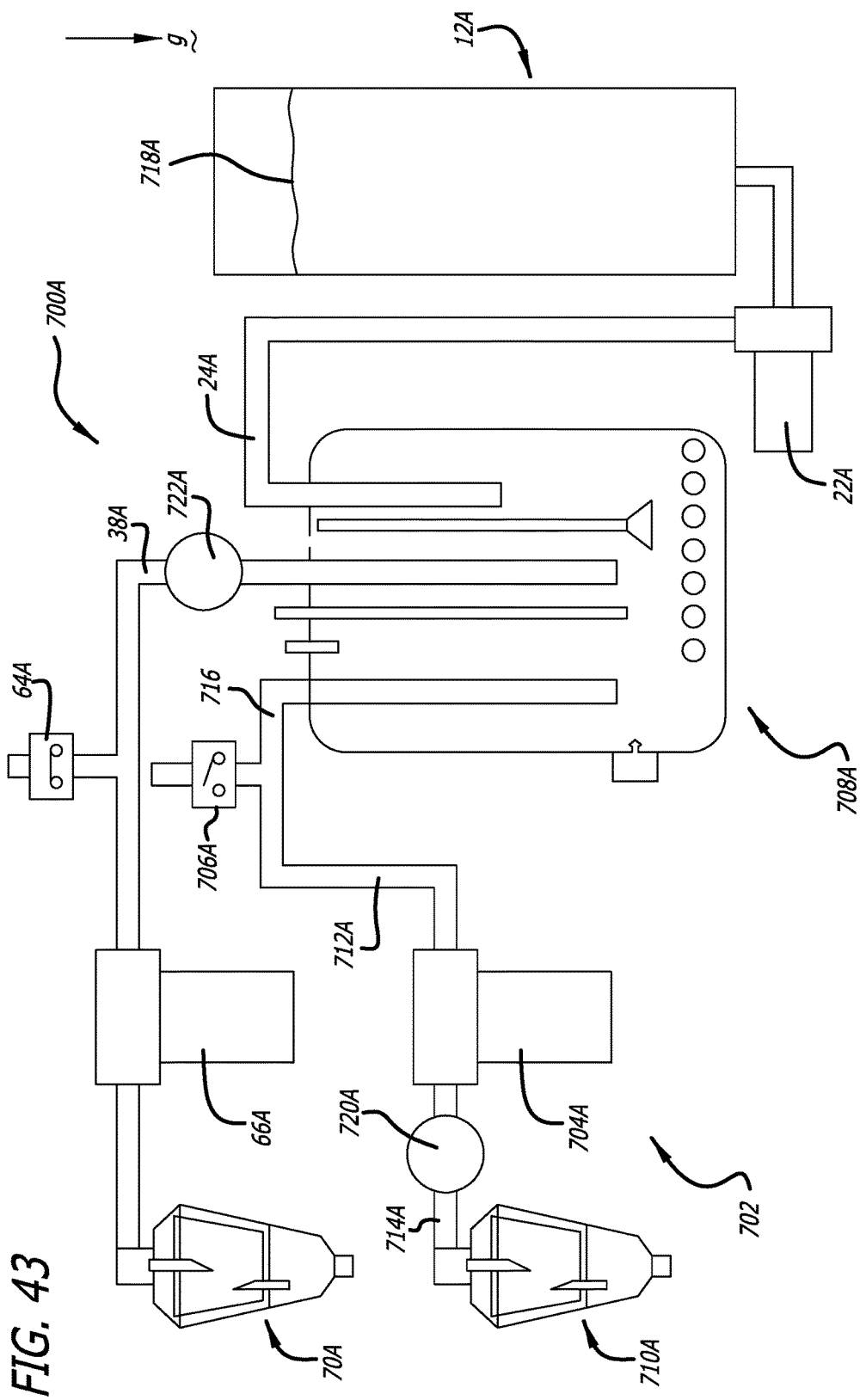
FIG. 43 shows a dual beverage brewer system.

FIG. 43 shows a brewer system 700A substantially similar to the brewer system 10A described above in reference to FIGS. 1 and 2 except that a second chamber system 702A is included. The second chamber system 702A may include a pump 704A and a switch 706A positioned between a heater 708A and a brewing chamber 710A. The pump 704A may draw heated water from the heater 708A through a sixth tube 712A and inject the heated water to the brewing chamber 710A through a seventh tube 714A. The sixth tube 712A may have a portion 716A that is elevated above the top line 718A of the water in the reservoir 12A. The switch 706A may be coupled to the portion 716A of the sixth tube 712A. A flow meter 720A may be coupled to the seventh tube 714A, which is on the outlet side of the pump 704A. However, it is within the scope of the invention to have the flow meter on the inlet side of the pump, as illustrated by a flow meter 722A coupled to the third tube 38A.

The heater 708A may be larger than the heater 26A shown in FIG. 30 to provide additional heated water for the two brewing chambers 70A and 710A. As such, with the heater 708A being open to the atmosphere, a plurality of brewing chambers may draw heated water from the heater 708A for high frequency brewing operations such as in restaurants and in offices with a large number of employees needing frequent beverage service.

Figure 44:
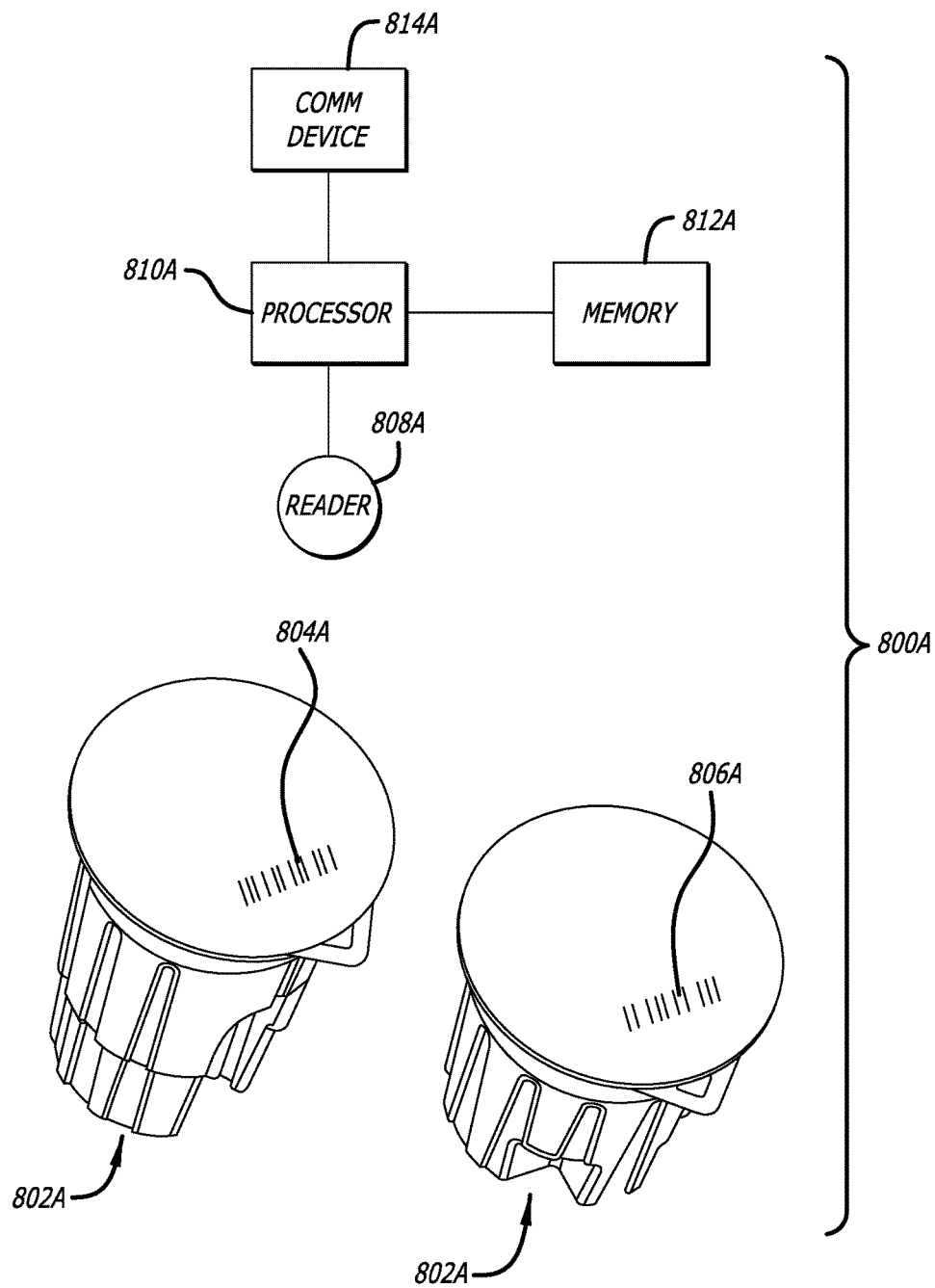
FIG. 44 shows an authentication system.

FIG. 44 shows a management system 800A adapted to monitor inventory of a plurality of cartridges 802A. To appeal to different taste in beverages, a variety of cartridges may be offered with some coffee cartridges being mild, medium, and strong. In addition, different size of cartridges may be offered. The management system 800A may provide a bar code for each type of cartridge. For instance, a large cartridge with medium flavor coffee may have a bar code 804A, while a regular cartridge with strong flavor coffee may have a bar code 806A, and etc. The brewer system, such as the system 10A, may have a bar code reader 808A within the brewing chamber 70A positioned to read the bar codes 804A, 806A, and others on the lid of the cartridges. The reader 808A may be coupled to a processor 810A, which in turn may be coupled to a memory 812A and a communication device 814A. As the processor brews a beverage with a cartridge, the processor 810A may keep track of the inventory of the variety of cartridges used for each cartridge brewed and store the information in the memory 812A. The communication device 814A may be connected to the office network such as the Internet so that the processor 810A may be communicated remotely.

The professional catering service may remotely communicate with the processor 810A to gather the inventory information in the memory 812A prior to visiting the office, and stock the truck and driver with appropriate cartridges to restock the office, thus saving time. Moreover, the data collected may be analyzed to determine which beverages are popular and not popular. The processor may also collect information about the temperature, flow rate, and size so that these data may be analyzed to determine consumers' desired settings. In addition, the processor 810A may not brew unauthorized cartridges without the proper bar code on the lid. It is within the scope of the invention to utilize a variety of indication marks on the cartridges known to one skilled in the art to monitor the inventory of the cartridges and to prevent the unauthorized cartridges without the indication marks to be used with the brewer system.

While various embodiments of the invention have been described, it will be apparent to those of ordinary skill in the art that many more embodiments and implementations are possible within the scope of this invention. For instance, the powder creamer may be provided in a tablet form or in a pouch to easily insert into the cup. The cartridge system may not include a filter such that the cup holds a beverage grind that may be formulated to dissolve in such a way that the beverage does not clog the bottom needle. With the tall cup being able to hold greater amount of the beverage grind, a bigger cup of beverage may be brewed such as milk and soup. Accordingly, the invention is not to be restricted except in light of the attached claims and their equivalents.

What is claimed is:

1. A method of brewing a beverage from a beverage cartridge with a brewer, the beverage cartridge having a cup with a beverage ingredient therein, the cup having a circular base and a side wall that together define a circular edge where the circular base and the side wall meet, and the brewer having a first outlet piercing element that pierces within a first predetermined outlet piercing area within the brewer, and a second outlet piercing element that pierces within a second predetermined outlet piercing area within the brewer that is vertically offset from the first predetermined outlet piercing area, the first outlet piercing element having a base end and a tip end that is higher than the base end and the second outlet piercing element having a base end and a tip end, the base end of the second outlet piercing element being vertically offset from the base end of the first outlet piercing element, the method comprising the step of:
   receiving the beverage cartridge within the brewer in such a manner that the circular edge of the cup is adjacent to the first predetermined outlet piercing area, the beverage cartridge is pierced within the first predetermined outlet piercing area by the first outlet piercing element, and the beverage cartridge is not in contact with or pierced by the second outlet piercing element within the second predetermined outlet piercing area that is vertically offset from the first predetermined outlet piercing area.

2. The method as claimed in claim 1, further comprising the step of:
   injecting liquid into the beverage cartridge with an inlet piercing element and draining beverage from within the beverage cartridge with the first outlet piercing element.

3. The method as claimed in claim 1, wherein
   the circular base of the cup has a center; and
   the beverage cartridge is received such that the center of the circular base is not at either of the first and second predetermined outlet piercing areas.

4. The method as claimed in claim 1, wherein
   the cartridge has a filter within the cup to hold the beverage ingredient; and
   the beverage cartridge is pierced within the first predetermined outlet piercing area by the first outlet piercing element in such a manner that the first outlet piercing element avoids piercing the filter within the cup.

5. The method as claimed in claim 1, wherein
   the beverage cartridge is a frusto-conical single-serving beverage cartridge.

6. The method as claimed in claim 1, wherein
   the side wall extends upwardly from the circular base to a radially outwardly protruding rim surrounding a circular access opening, an outer diameter of the side wall adjacent and below the rim is 40 mm to 47 mm, an outer diameter of the side wall along the circular base is 34 mm to 38 mm, and a height between the rim and the circular base is 43 mm to 46 mm.

7. The method as claimed in claim 1, wherein
   the entire second outlet piercing element is vertically offset from the entire first outlet piercing element.

8. The method as claimed in claim 1, wherein
   the brewer includes cartridge holder that has a top end, a bottom end, and a ledge between the top end and the bottom end; and
   the ledge is above the bottom end of the cartridge holder and supports the first outlet piercing element.

9. The method as claimed in claim 1, wherein
   the first outlet piercing element comprises a first outlet needle; and
   the second outlet piercing element comprises a second outlet needle.

10. A method of brewing a beverage from a beverage cartridge with a brewer, the beverage cartridge having a cup with a beverage ingredient therein, the cup having a circular base and a side wall that together define a circular edge where the circular base and the side wall meet, and the brewer having a first outlet piercing element that pierces within a first predetermined outlet piercing area within the brewer, and a second outlet piercing element that pierces within a second predetermined outlet piercing area within the brewer that is vertically offset from the first predetermined outlet piercing area, the first outlet piercing element having a base end and a tip end that is higher than the base end and the second outlet piercing element having a base end and a tip end, the base end of the second outlet piercing element being vertically offset from the base end of the first outlet piercing element, the method comprising the step of:

while the beverage cartridge is within the brewer and the circular edge of the cup is adjacent to the first predetermined outlet piercing area, piercing the beverage cartridge within the first predetermined outlet piercing area with the first outlet piercing element, and not piercing or contacting the beverage cartridge with the second outlet piercing element within the second predetermined outlet piercing area that is vertically offset from the first predetermined outlet piercing area.

11. The method as claimed in claim 10, further comprising the step of:

injecting liquid into the beverage cartridge with an inlet piercing element and draining beverage from within the beverage cartridge with the first outlet piercing element.

12. The method as claimed in claim 10, wherein
the circular base of the cup has a center; and
the center of the circular base is not at either of the first and second predetermined outlet piercing areas when the beverage cartridge is pierced.

13. The method as claimed in claim 10, wherein
the cartridge has a filter within the cup to hold the beverage ingredient; and
the beverage cartridge is pierced within the first predetermined outlet piercing area by the first outlet piercing element in such a manner that the first outlet piercing element avoids piercing the filter within the cup.

14. The method as claimed in claim 10, wherein
the beverage cartridge is a frusto-conical single-serving beverage cartridge.

15. The method as claimed in claim 10, wherein
the side wall extends upwardly from the circular base to a radially outwardly protruding rim surrounding a circular access opening, an outer diameter of the side wall adjacent and below the rim is 40 mm to 47 mm, an outer diameter of the side wall along the circular base is 34 mm to 38 mm, and a height between the rim and the circular base is 43 mm to 46 mm.

16. The method as claimed in claim 10, wherein
the entire second outlet piercing element is vertically offset from the entire first outlet piercing element.

17. The method as claimed in claim 10, wherein
the brewer includes cartridge holder that has a top end, a bottom end, and a ledge between the top end and the bottom end; and
the ledge is above the bottom end of the cartridge holder and supports the first outlet piercing element.

18. The method as claimed in claim 10, wherein
the first outlet piercing element comprises a first outlet needle; and
the second outlet piercing element comprises a second outlet needle.

19. A method of brewing a beverage from a beverage cartridge with a brewer, the beverage cartridge having a cup with a beverage ingredient therein, the cup having a circular base and a side wall that together define a circular edge where the circular base and the side wall meet, the method comprising the step of:

while the beverage cartridge is within the brewer and the circular edge of the cup is adjacent to the first predetermined outlet piercing area, draining beverage from the beverage cartridge with a first outlet piercing element having a base end and a tip end that is higher than the base end, wherein the first outlet piercing element drains within the first predetermined piercing outlet area, and not draining or contacting the beverage cartridge with a second outlet piercing element, having a base end and a tip end, within a second predetermined outlet piercing area within the brewer that is vertically offset from the first predetermined outlet piercing area, the base end of the second outlet piercing element being vertically offset from the base end of the first outlet piercing element.

20. The method as claimed in claim 19, further comprising the step of:

injecting liquid into the beverage cartridge with an inlet piercing element.

21. The method as claimed in claim 19, wherein
the circular base of the cup has a center; and
the center of the circular base is not at either of the first and second predetermined outlet piercing areas when the beverage is being drained.

22. The method as claimed in claim 19, wherein
the cartridge has a filter within the cup to hold the beverage ingredient; and
the beverage cartridge is pierced within the first predetermined outlet piercing area by the first outlet piercing element in such a manner that the first outlet piercing element avoids piercing the filter within the cup.

23. The method as claimed in claim 19, wherein
the beverage cartridge is a frusto-conical single-serving beverage cartridge.

24. The method as claimed in claim 19, wherein
the side wall extends upwardly from the circular base to a radially outwardly protruding rim surrounding a circular access opening, an outer diameter of the side wall adjacent and below the rim is 40 mm to 47 mm, an outer diameter of the side wall along the circular base is 34 mm to 38 mm, and a height between the rim and the circular base is 43 mm to 46 mm.

25. The method as claimed in claim 19, wherein
the entire second outlet piercing element is vertically offset from the entire first outlet piercing element.

26. The method as claimed in claim 19, wherein
the brewer includes cartridge holder that has a top end, a bottom end, and a ledge between the top end and the bottom end; and
the ledge is above the bottom end of the cartridge holder and supports the first outlet piercing element.

27. The method as claimed in claim 19, wherein
the first outlet piercing element comprises a first outlet needle; and
the second outlet piercing element comprises a second outlet needle.

* * * * *